US011963241B2

(12) United States Patent
Zhang et al.

(10) Patent No.: US 11,963,241 B2
(45) Date of Patent: Apr. 16, 2024

(54) METHODS TO HANDLE SLICING ACCOUNTING FOR EVOLVED PACKET DATA GATEWAY WI-FI ACCESS

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US); Youjun Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/325,832

(22) Filed: May 30, 2023

(65) Prior Publication Data

US 2023/0309159 A1 Sep. 28, 2023

Related U.S. Application Data

(62) Division of application No. 17/230,502, filed on Apr. 14, 2021, now Pat. No. 11,700,650.

(Continued)

(51) Int. Cl.
*H04W 76/10* (2018.01)
*H04L 41/0803* (2022.01)
(Continued)

(52) U.S. Cl.
CPC ......... *H04W 76/10* (2018.02); *H04L 41/0803* (2013.01); *H04W 36/0022* (2013.01);
(Continued)

(58) Field of Classification Search
CPC ............. H04W 76/10; H04W 36/0022; H04W 36/395; H04W 48/08; H04W 48/18; H04W 84/042; H04W 88/16; H04L 41/0803
See application file for complete search history.

(56) References Cited

U.S. PATENT DOCUMENTS 11,160,014 B2    10/2021   Faccin et al.
11,362,955 B2 *   6/2022   Chin ................. H04L 47/20
(Continued)

FOREIGN PATENT DOCUMENTS

WO   WO-2019032972 A1 *  2/2019   ............ H04W 48/18
WO   WO2019079118         4/2019

OTHER PUBLICATIONS

International Search Report and Written Opinion—PCT/US2021/027459—ISA/EPO—dated Aug. 12, 2021.
(Continued)

*Primary Examiner* — Matthew C Sams
(74) *Attorney, Agent, or Firm* — Arun Swain

(57) ABSTRACT

Methods, systems, and devices for wireless communications are described. A user equipment (UE) may establish a cellular connection with a base station associated with a cellular radio network. The UE may receive an access policy of the cellular radio network identifying an access preference rule for the UE to adopt for connections to a core network function of the cellular radio network, the access preference rule indicating for the UE to preferentially connect to the core network function via a non-cellular radio network. The UE may determine that a gateway between the non-cellular radio network and the core network function of the cellular radio network is not configured. The UE may determine that a gateway selection policy of the cellular radio network is not configured. The UE may establish a connection to a legacy core network function of a legacy cellular radio network via a legacy gateway.

20 Claims, 18 Drawing Sheets

Related U.S. Application Data

(60) Provisional application No. 63/011,854, filed on Apr. 17, 2020.

(51) Int. Cl.
| | |
|---|---|
| *H04W 36/00* | (2009.01) |
| *H04W 36/38* | (2009.01) |
| *H04W 48/08* | (2009.01) |
| *H04W 48/18* | (2009.01) |
| *H04W 84/04* | (2009.01) |
| *H04W 88/16* | (2009.01) |

(52) U.S. Cl.
CPC ......... *H04W 36/385* (2013.01); *H04W 48/08* (2013.01); *H04W 48/18* (2013.01); *H04W 84/042* (2013.01); *H04W 88/16* (2013.01)

(56) References Cited

U.S. PATENT DOCUMENTS

| | | | | |
|---|---|---|---|---|
| 11,412,092 | B2* | 8/2022 | Cheng | H04W 8/08 |
| 11,665,530 | B2* | 5/2023 | Kim | H04W 8/26 |
| | | | | 370/254 |
| 11,751,043 | B2* | 9/2023 | Lee | H04W 60/005 |
| | | | | 370/329 |
| 2019/0029065 | A1* | 1/2019 | Park | H04W 8/08 |
| 2019/0116551 | A1 | 4/2019 | Faccin et al. | |
| 2020/0007450 | A1 | 1/2020 | Chin et al. | |
| 2020/0145538 | A1 | 5/2020 | Qiao et al. | |
| 2020/0404107 | A1 | 12/2020 | Cheng et al. | |
| 2021/0329714 | A1 | 10/2021 | Zhang | |
| 2022/0272620 | A1* | 8/2022 | Ninglekhu | H04W 48/18 |
| 2022/0322202 | A1 | 10/2022 | Li et al. | |

OTHER PUBLICATIONS

NTT Docomo, et al., "Clarification on User Preference and URSP", 3GPP Draft, 3GPP TSG-SA2 Meeting #129, S2-1811408-WAS1811252-WAS1810580-CR0164-URSP-Configuration-Precedence-R3, 3rd Generation Partnership Project (3GPP), Mobile Competence Centre, 650, Route Des Lucioles, F-06921 Sophia-Ant, vol. SA WG2, No. Dongguan, China, Oct. 18, 2018 (Oct. 18, 2018), XP051540215, 7 Pages, the whole document.

Qualcomm Incorporated: "Applicability of UE Policies and UE Configuration Parameters Upon Inter-System Change Between N1 Mode and S1 Mode", 3GPP Draft, 3GPP TSG CT WG1 Meeting #111bis, C1-184249, 3rd Generation Partnership Project (3GPP), Mobile Competence Centre, 650, Route Des Lucioles, F-06921, Sophia-Antipolis Cedex, France, vol. CT WG1, No. Sophia-Antipolis (France), Jul. 9, 2018-Jul. 13, 2018 Jul. 6, 2018, XP051465751, Section 2, 5 pages.

* cited by examiner

METHODS TO HANDLE SLICING ACCOUNTING FOR EVOLVED PACKET DATA GATEWAY WI-FI ACCESS

CROSS REFERENCE

The present Application for Patent is a Divisional of U.S. patent application Ser. No. 17/230,502 by Zhang et al., entitled "METHODS TO HANDLE SLICING ACCOUNTING FOR EVOLVED PACKET DATA GATEWAY WI-FI ACCESS" filed Apr. 14, 2021, which claims the benefit of U.S. Provisional Patent Application No. 63/011,854 by Zhang et al., entitled "METHODS TO HANDLE SLICING ACCOUNTING FOR EVOLVED PACKET DATA GATEWAY WI-FI ACCESS," filed Apr. 17, 2020, each of which is assigned to the assignee hereof and expressly incorporated by reference herein.

FIELD OF TECHNOLOGY

The following relates generally to wireless communications and more specifically to methods to handle slicing accounting for evolved packet data gateway Wi-Fi access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support methods to handle slicing accounting for evolved packet data gateway Wi-Fi access. Generally, the described techniques provide various mechanisms that address inconsistencies between legacy cellular radio networks and advanced cellular radio networks being deployed. That is, aspects of the described techniques provide mechanisms that can be implemented by a user equipment (UE) operating in a heterogenous environment that includes at least one of a non-cellular radio network (e.g., Wi-Fi network), a legacy cellular radio network (e.g., such as a 4th generation (4G) cellular radio network, a fifth generation (5G) new radio (NR) non-stand alone (NSA) cellular radio network, etc.), and/or a 5G NR stand-alone (SA) cellular radio network.

For example, a UE may establish a connection with a base station associated with a cellular radio network (e.g., a 5G NR SA connection). Whenever a UE establishes a connection with a base station, the base station may generally configure, indicate, or otherwise convey to the UE various policies, protocols, and the like, for the cellular radio network. Accordingly, the UE may receive an access policy (e.g., a UE route selection policy (URSP)) identifying an access preference rule for the UE to use for connections to a core network function of the cellular radio network (e.g., for connections to a 5G core network (5GC)). That is, the URSP may generally indicate whether the UE is to preferentially route outgoing traffic, e.g., the traffic can be routed to an established protocol data unit (PDU) session (such as to the 5GC via the 5G NR SA base station), can be offloaded to a non-third generation partnership project (3GPP) cellular connection, such as via a Wi-Fi network, or to establish a new PDU session (e.g., a new PDU session to 5GC via the 5G NR SA base station). In this example, the URSP may indicate for the UE to preferentially connect to the 5GC via a non-cellular radio network, e.g., to route the outgoing traffic in the PDU session via a Wi-Fi network. However, the UE may determine that a gateway (e.g., a 3GPP interworking function (N3IWF) gateway) between the Wi-Fi radio network and the 5GC is not configured or is otherwise unavailable. The UE may also determine that a gateway selection policy (e.g., an access network discovery selection policy (ANDSP)) is not configured for the 5G NR SA. Broadly, the ANDSP is used by the UE for selecting a non-3GPP access network, such as a wireless local area network (WLAN), Wi-Fi network, etc. Accordingly, the UE may establish a connection to a legacy core network function (e.g., an evolved packet core (EPC) core network function) of a legacy cellular radio network (e.g., 4G and/or 5G NR NSA cellular radio network) via a legacy gateway (e.g., an evolved packet data gateway (EPDG)). Broadly, the EPDG may be a gateway function between the Wi-Fi network and the EPC. Thus, despite the URSP giving preference to the Wi-Fi network and the fact that the ANDSP and N3IWF are not configured or otherwise available, the UE may still utilize the EPDG to connect to the EPC core network following the URSP access policy when no ANDSP/N3IWF are configured yet for the 5G NR SA cellular radio network.

Additionally, or alternatively, the UE may have established the cellular connection with the base station in the 5G NR SA cellular radio network. However, in this example the URSP received by the UE may give preference to the 3GPP connection, e.g., for the UE to route the outgoing traffic to the 5G NR SA cellular radio network. That is, the URSP may give preference for the UE to connect to 5GC via the 5G NR SA base station. However, the UE may determine that neither the N3IWF gateway nor the ANDSP gateway selection policy are configured for the cellular radio network (e.g., for the 5G NR SA radio network). Subsequently, the UE may determine that its 5G NR SA cellular radio network has become unavailable, but that a Wi-Fi radio network is available. In response, the UE may establish a connection to a legacy core network function (e.g., EPC) of a legacy cellular radio network (e.g., 4G/5G NR NSA) via a legacy gateway (e.g., EPDG). The UE may identify or otherwise determine a legacy access policy (e.g., an access network discovery and selection function (ANDSF) that gives preference for the UE to use a non-cellular radio network (e.g., a Wi-Fi network). That is, broadly the ANDSF helps the UE discover non-3GPP access networks, such as WLAN, Wi-Fi networks, etc. However, the UE may determine that the 5G NR SA cellular radio network has become available again, and therefore may establish a new connection to the cellular radio network. That is, even though the ANDSF instructs the UE to give preference to a Wi-Fi network, the UE will follow the preference given in the URSP and reestablish its connection to the 5G NR NSA cellular radio network when the 5G NR SA network becomes available again. Otherwise the UE may be stuck with the Wi-Fi connection even though a more advanced 5G NR SA network is available.

Additionally, or alternatively, the UE may establish the cellular connection to the 5G NR SA cellular radio network and receive the URSP that, in this example, gives preference to the non-cellular radio network (e.g., gives preference to a non-3GPP network such as a Wi-Fi network). Again, the UE may determine that neither the ANDSP nor the N3IWF are configured for the 5G NR SA cellular radio network, but that a Wi-Fi network is available. Accordingly, the UE may establish a connection to the EPC legacy core network function of the 4G/5G NR NSA legacy cellular radio network via an EPDG gateway. The UE may receive or otherwise identify the ANDSF legacy access policy which, in this example, gives preference to a 3GPP connection. Previously the UE would ping-pong between the 5G NR SA connection and Wi-Fi connection. However, to avoid such ping-pong, the UE may maintain the connection to the EPC legacy core network function via the EPDG legacy gateway. This approach avoids the UE frequently switching between the 5G NR SA network in which the URSP gives preference to a non-3GPP connection and the Wi-Fi network in which the ANDSF gives preference to a 3GPP connection.

Additionally, or alternatively, the UE may establish a connection to an EPC legacy core network function of a 4G/5G NR NSA legacy cellular radio network via the EPDG legacy gateway. The UE may be configured with a set of traffic descriptors (e.g., the UE may have different applications operating on the UE). For each traffic descriptor (e.g., each application), the UE may identify the ANDSF legacy access policy that gives preference to the UE to connect via either a cellular radio network (e.g., 3GPP cellular radio network) or a non-cellular radio network (e.g., a non-3GPP radio network). The UE may also identify or otherwise determine a legacy slice treatment associated with each traffic descriptor, e.g., based at least in part on the connection to the EPC via the EPDG. The UE may establish a connection to a 5GC core network function of a 5G NR SA cellular radio network via an N3IWF gateway. Accordingly, the UE may receive or otherwise identify a URSP access policy for the UE to adopt that also tells the UE whether to preferentially connect via either the cellular radio network or a non-cellular radio network. The UE may also determine or otherwise identify a slice treatment for each traffic descriptor, e.g., based at least in part on the URSP access policy, traffic descriptor identifier, traffic descriptor type, etc. Accordingly, the UE may use the URSP access policy, the legacy slice treatment (from EPC), and/or the slice treatment (from 5GC), to determine whether to transfer the connection for each traffic descriptor from the EPC via the EPDG gateway to the 5GC via the N3IWF or to establish an updated connection with the 5GC via the N3IWF. Accordingly, the UE can ensure that each traffic descriptor is given the proper slice treatment and/or connection preference when switching from an EPC connection to a 5GC connection.

A method of wireless communication at a UE is described. The method may include establishing a cellular connection with a base station associated with a cellular radio network. The method may also include receiving an access policy of the cellular radio network identifying an access preference rule for the UE to adopt for connections to a core network function of the cellular radio network, the access preference rule indicating for the UE to preferentially connect to the core network function via a non-cellular radio network. The method may include determining that a gateway between the non-cellular radio network and the core network function of the cellular radio network is not configured and determining that a gateway selection policy of the cellular radio network is not configured. The method may further include establishing, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

An apparatus for wireless communication at a UE is described. The apparatus may include a processor, memory coupled with the processor, and instructions stored in the memory. The instructions may be executable by the processor to cause the apparatus to establish a cellular connection with a base station associated with a cellular radio network and receive an access policy of the cellular radio network identifying an access preference rule for the UE to adopt for connections to a core network function of the cellular radio network, the access preference rule indicating for the UE to preferentially connect to the core network function via a non-cellular radio network. The instructions may be executable by the processor to cause the apparatus to determine that a gateway between the non-cellular radio network and the core network function of the cellular radio network is not configured and determine that a gateway selection policy of the cellular radio network is not configured. The instructions may also be executable by the processor to cause the apparatus to establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

Another apparatus for wireless communication at a UE is described. The apparatus may include means for establishing a cellular connection with a base station associated with a cellular radio network and means for receiving an access policy of the cellular radio network identifying an access preference rule for the UE to adopt for connections to a core network function of the cellular radio network, the access preference rule indicating for the UE to preferentially connect to the core network function via a non-cellular radio network. The apparatus may also include means for determining that a gateway between the non-cellular radio network and the core network function of the cellular radio network is not configured and means for determining that a gateway selection policy of the cellular radio network is not configured. The apparatus may also include means for establishing, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

A non-transitory computer-readable medium storing code for wireless communication at a UE is described. The code may include instructions executable by a processor to establish a cellular connection with a base station associated with a cellular radio network and to receive an access policy of the cellular radio network identifying an access preference rule for the UE to adopt for connections to a core network function of the cellular radio network, the access preference rule indicating for the UE to preferentially connect to the core network function via a non-cellular radio network. The code may also include instructions executable by the processor to determine that a gateway between the non-cellular radio network and the core network function of the cellular radio network is not configured. The code may also include instructions executable by the processor to determine that a gateway selection policy of the cellular radio network is not configured. The code may also include instructions executable by the processor to establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

Some examples of the method, apparatuses, and non-transitory computer-readable medium described herein may further include operations, features, means, or instructions for receiving a configuration for connections via the non-cellular radio network, the configuration configuring the UE to connect to the legacy core network function or to connect to the core network function via the non-cellular radio network.

Some examples of the method, apparatuses, and non-transitory computer-readable medium described herein may further include operations, features, means, or instructions for receiving a configuration for connections via the non-cellular radio network, the configuration configuring the UE to attempt to connect to the core network function and, if the attempt to connect to the core network may be unsuccessful, to connect to the legacy core network function via the non-cellular radio network.

In some examples of the method, apparatuses, and non-transitory computer-readable medium described herein, the cellular radio network includes a 5G NR SA cellular radio network, the legacy cellular radio network includes at least one of a 4G LTE cellular radio network or a 5G NR NSA cellular radio network, the access policy includes a URSP, the gateway selection policy includes an ANDSP, the gateway includes a N3IWF between the core network function of the 5G NR SA cellular radio network and the non-cellular radio network, and the legacy gateway includes an EPDG between an EPC core network function of the 4G LTE cellular radio network or the 5G NR NSA cellular radio network and the non-cellular radio network.

Another method of wireless communication at a UE is described. The method may include establishing a cellular connection with a base station associated with a cellular radio network and receiving an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function. The method may also include determining that the gateway is not configured, determining that a gateway selection policy of the cellular radio network is not configured, and determining that the non-cellular radio network is available and that the cellular radio network has become unavailable. The method may also include establishing, via the non-cellular radio network, a connection to a legacy core network function of a legacy cellular radio network via a legacy gateway between the legacy core network function and the non-cellular radio network. The method may also include identifying a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network, determining that the cellular radio network has become available to establish a new connection, and establishing, based at least on the access preference rule, the new connection to the cellular radio network.

An apparatus for wireless communication at a UE is described. The apparatus may include a processor, memory coupled with the processor, and instructions stored in the memory. The instructions may be executable by the processor to cause the apparatus to establish a cellular connection with a base station associated with a cellular radio network and receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function. The instructions may also be executable by the processor to cause the apparatus to determine that the gateway is not configured, determine that a gateway selection policy of the cellular radio network is not configured, and determine that the non-cellular radio network is available and that the cellular radio network has become unavailable. The instructions may be executable by the processor to cause the apparatus to establish, via the non-cellular radio network, a connection to a legacy core network function of a legacy cellular radio network via a legacy gateway between the legacy core network function and the non-cellular radio network and identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network. The instructions may be executable by the processor to cause the apparatus to determine that the cellular radio network has become available to establish a new connection and establish, based at least on the access preference rule, the new connection to the cellular radio network.

Another apparatus for wireless communication at a UE is described. The apparatus may include means for establishing a cellular connection with a base station associated with a cellular radio network and means for receiving an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function. The apparatus may also include means for determining that the gateway is not configured, means for determining that a gateway selection policy of the cellular radio network is not configured, and means for determining that the non-cellular radio network is available and that the cellular radio network has become unavailable. The apparatus may further include means for establishing, via the non-cellular radio network, a connection to a legacy core network function of a legacy cellular radio network via a legacy gateway between the legacy core network function and the non-cellular radio network and means for identifying a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network. The apparatus may include means for determining that the cellular radio network has become available to establish a new connection and means for establishing, based at least on the access preference rule, the new connection to the cellular radio network.

A non-transitory computer-readable medium storing code for wireless communication at a UE is described. The code may include instructions executable by a processor to establish a cellular connection with a base station associated with a cellular radio network and receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function. The code may also include instructions executable by the processor to determine that the gateway is not configured, determine that a gateway selection policy of the cellular radio network is not configured, and determine that the non-cellular radio network is available and that the cellular radio network has become unavailable. The code may also include instructions executable by the processor to establish, via the non-cellular radio network, a connection to a legacy core network function of a legacy cellular radio network via a legacy gateway between the legacy core network function and the non-cellular radio network and identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network. The code may also include instructions executable by the processor to determine that the cellular radio network has become available to establish a new connection and establish, based at least on the access preference rule, the new connection to the cellular radio network.

Some examples of the method, apparatuses, and non-transitory computer-readable medium described herein may further include operations, features, means, or instructions for determining, based at least in part on the new connection, that the gateway of the cellular radio network may be configured, and transferring, based at least in part on the access policy, the connection to the legacy core network function of the legacy cellular radio network via the legacy gateway to the core network function of the cellular radio network via the gateway.

Some examples of the method, apparatuses, and non-transitory computer-readable medium described herein may further include operations, features, means, or instructions for receiving a configuration for connections via the non-cellular radio network, the configuration configuring the UE to connect to the legacy core network function or to connect to the core network function via the non-cellular radio network.

Some examples of the method, apparatuses, and non-transitory computer-readable medium described herein may further include operations, features, means, or instructions for receiving a configuration for connections via the non-cellular radio network, the configuration configuring the UE to attempt to connect to the core network function and, if the attempt to connect to the core network may be unsuccessful, to connect to the legacy core network function via the non-cellular radio network.

In some examples of the method, apparatuses, and non-transitory computer-readable medium described herein, the cellular radio network includes a 5G NR SA cellular radio network, the legacy cellular radio network includes at least one of a 4G LTE cellular radio network or a 5G NR NSA cellular radio network, the access policy includes a URSP, the gateway selection policy includes an ANDSP, the legacy access policy includes an ANDSF, the gateway includes a N3IWF between the core network function of the 5G NR SA cellular radio network and the non-cellular radio network, and the legacy gateway includes an EPDG between an EPC core network function of the 4G LTE cellular radio network or the 5G NR NSA cellular radio network and the non-cellular radio network.

Another method of wireless communication at a UE is described. The method may include establishing a cellular connection with a base station associated with a cellular radio network and receiving an access policy of the cellular radio network identifying an access preference rule for the UE to adopt for connections to a core network function of the cellular radio network, the access preference rule indicating for the UE to preferentially connect to the core network function via a non-cellular radio network. The method may also include determining that the non-cellular radio network is available and that a gateway between the non-cellular radio network and the core network function of the cellular radio network is not configured and determining that a gateway selection policy of the cellular radio network is not configured. The method may also include establishing a connection to a legacy core network function of a legacy cellular radio network via a legacy gateway between the legacy core network function and the non-cellular radio network and identifying a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network. The method may also include maintaining, based at least in part on the access preference rule, the connection to the legacy core network function of the legacy radio network via the legacy gateway.

Another apparatus for wireless communication at a UE is described. The apparatus may include a processor, memory coupled with the processor, and instructions stored in the memory. The instructions may be executable by the processor to cause the apparatus to establish a cellular connection with a base station associated with a cellular radio network and receive an access policy of the cellular radio network identifying an access preference rule for the UE to adopt for connections to a core network function of the cellular radio network, the access preference rule indicating for the UE to preferentially connect to the core network function via a non-cellular radio network. The instructions may also be executable by the processor to cause the apparatus to determine that the non-cellular radio network is available and that a gateway between the non-cellular radio network and the core network function of the cellular radio network is not configured, determine that a gateway selection policy of the cellular radio network is not configured, and establish a connection to a legacy core network function of a legacy cellular radio network via a legacy gateway between the legacy core network function and the non-cellular radio network. The instructions may be executable by the processor to cause the apparatus to identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network and maintain, based at least in part on the access preference rule, the connection to the legacy core network function of the legacy radio network via the legacy gateway.

Another apparatus for wireless communication at a UE is described. The apparatus may include means for establishing a cellular connection with a base station associated with a cellular radio network and means for receiving an access policy of the cellular radio network identifying an access preference rule for the UE to adopt for connections to a core network function of the cellular radio network, the access preference rule indicating for the UE to preferentially connect to the core network function via a non-cellular radio network. The apparatus may include means for determining that the non-cellular radio network is available and that a gateway between the non-cellular radio network and the core network function of the cellular radio network is not configured, means for determining that a gateway selection policy of the cellular radio network is not configured, and means for establishing a connection to a legacy core network function of a legacy cellular radio network via a legacy gateway between the legacy core network function and the non-cellular radio network. The apparatus may include means for identifying a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network and means for maintaining, based at least in part on the access preference rule, the connection to the legacy core network function of the legacy radio network via the legacy gateway.

A non-transitory computer-readable medium storing code for wireless communication at a UE is described. The code may include instructions executable by a processor to establish a cellular connection with a base station associated with a cellular radio network and receive an access policy of the cellular radio network identifying an access preference rule for the UE to adopt for connections to a core network function of the cellular radio network, the access preference rule indicating for the UE to preferentially connect to the core network function via a non-cellular radio network. The code may include instructions executable by the processor to determine that the non-cellular radio network is available and that a gateway between the non-cellular radio network and the core network function of the cellular radio network is not configured, determine that a gateway selection policy of the cellular radio network is not configured, and establish a connection to a legacy core network function of a legacy cellular radio network via a legacy gateway between the legacy core network function and the non-cellular radio network. The code may include instructions executable by the processor to identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network and maintain, based at least in part on the access preference rule, the connection to the legacy core network function of the legacy radio network via the legacy gateway.

Some examples of the method, apparatuses, and non-transitory computer-readable medium described herein may further include operations, features, means, or instructions for receiving a configuration for connections via the non-cellular radio network, the configuration configuring the UE to connect to the legacy core network function or to connect to the core network function via the non-cellular radio network.

Some examples of the method, apparatuses, and non-transitory computer-readable medium described herein may further include operations, features, means, or instructions for receiving a configuration for connections via the non-cellular radio network, the configuration configuring the UE to attempt to connect to the core network function and, if the attempt to connect to the core network may be unsuccessful, to connect to the legacy core network function via the non-cellular radio network.

In some examples of the method, apparatuses, and non-transitory computer-readable medium described herein, the cellular radio network includes a 5G NR SA cellular radio network, the access policy includes a URSP, the gateway selection policy includes an ANDSP, the legacy access policy includes an ANDSF, the gateway includes a N3IWF between the core network function of the 5G NR SA cellular radio network and the non-cellular radio network, and the legacy gateway includes an EPDG to an EPC core network function of the 4G LTE cellular radio network or the 5G NR NSA cellular radio network and the non-cellular radio network.

A method of wireless communications at a UE is described. The method may include establishing a connection to a legacy core network function of a legacy cellular radio network via a legacy gateway between the legacy cellular radio network and a non-cellular radio network and identifying, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. The method may include establishing a connection to a core network function of a cellular radio network via a gateway between the cellular radio network and the non-cellular radio network and identifying, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The method may also include determining, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

An apparatus for wireless communications at a UE is described. The apparatus may include a processor, memory coupled with the processor, and instructions stored in the memory. The instructions may be executable by the processor to cause the apparatus to establish a connection to a legacy core network function of a legacy cellular radio network via a legacy gateway between the legacy cellular radio network and a non-cellular radio network and identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. The instructions may be executable by the processor to cause the apparatus to establish a connection to a core network function of a cellular radio network via a gateway between the cellular radio network and the non-cellular radio network and identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The instructions may be executable by the processor to cause the apparatus to determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

Another apparatus for wireless communications at a UE is described. The apparatus may include means for establishing a connection to a legacy core network function of a legacy cellular radio network via a legacy gateway between the legacy cellular radio network and a non-cellular radio network and means for identifying, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. The apparatus may also include means for establishing a connection to a core network function of a cellular radio network via a gateway between the cellular radio network and the non-cellular radio network and means for identifying, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The apparatus may also include means for determining, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

A non-transitory computer-readable medium storing code for wireless communications at a UE is described. The code may include instructions executable by a processor to establish a connection to a legacy core network function of a legacy cellular radio network via a legacy gateway between the legacy cellular radio network and a non-cellular radio network and identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. The code may include instructions executable by the processor to establish a connection to a core network function of a cellular radio network via a gateway between the cellular radio network and the non-cellular radio network and identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The code may include instructions executable by the processor to determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

Some examples of the method, apparatuses, and non-transitory computer-readable medium described herein may further include operations, features, means, or instructions for determining, for at least two traffic descriptors in the set of traffic descriptors, that the legacy traffic descriptor and the traffic descriptor may be a same traffic descriptor, and transferring the connections for the at least two traffic descriptors to the core network function.

Some examples of the method, apparatuses, and non-transitory computer-readable medium described herein may further include operations, features, means, or instructions for determining, for at least two traffic descriptors in the set of traffic descriptors, that the legacy traffic descriptor and the traffic descriptor may be different traffic descriptors, and updating the connection for at least one of the two traffic descriptors with the core network function.

Some examples of the method, apparatuses, and non-transitory computer-readable medium described herein may further include operations, features, means, or instructions for determining, for at least two traffic descriptors in the set of traffic descriptors that may be associated with a same traffic descriptor, that the legacy access policy and the access policy may be a same access policy, and transferring the connections for the at least two traffic descriptors to the core network function.

Some examples of the method, apparatuses, and non-transitory computer-readable medium described herein may further include operations, features, means, or instructions for determining, for at least two traffic descriptors in the set of traffic descriptors that may be associated with a same traffic descriptor, that the legacy access policy and the access policy may be a different access policy, and updating the connection for at least one of the two traffic descriptors with the core network function.

In some examples of the method, apparatuses, and non-transitory computer-readable medium described herein, the cellular radio network includes a 5G NR SA cellular radio network, the legacy cellular radio network includes at least one of a 4G LTE cellular radio network or a 5G NR NSA cellular radio network, the access policy includes a URSP, the legacy access policy includes an ANDSF, the core network function includes a 5G NR SA core network (5GC), the gateway includes a N3IWF between the core network function of the 5G NR SA cellular radio network and the non-cellular radio network, and the legacy gateway includes an EPDG between an EPC core network function of the 4G LTE cellular radio network or the 5G NR NSA cellular radio network and the non-cellular radio network.

DETAILED DESCRIPTION

Figure 1:
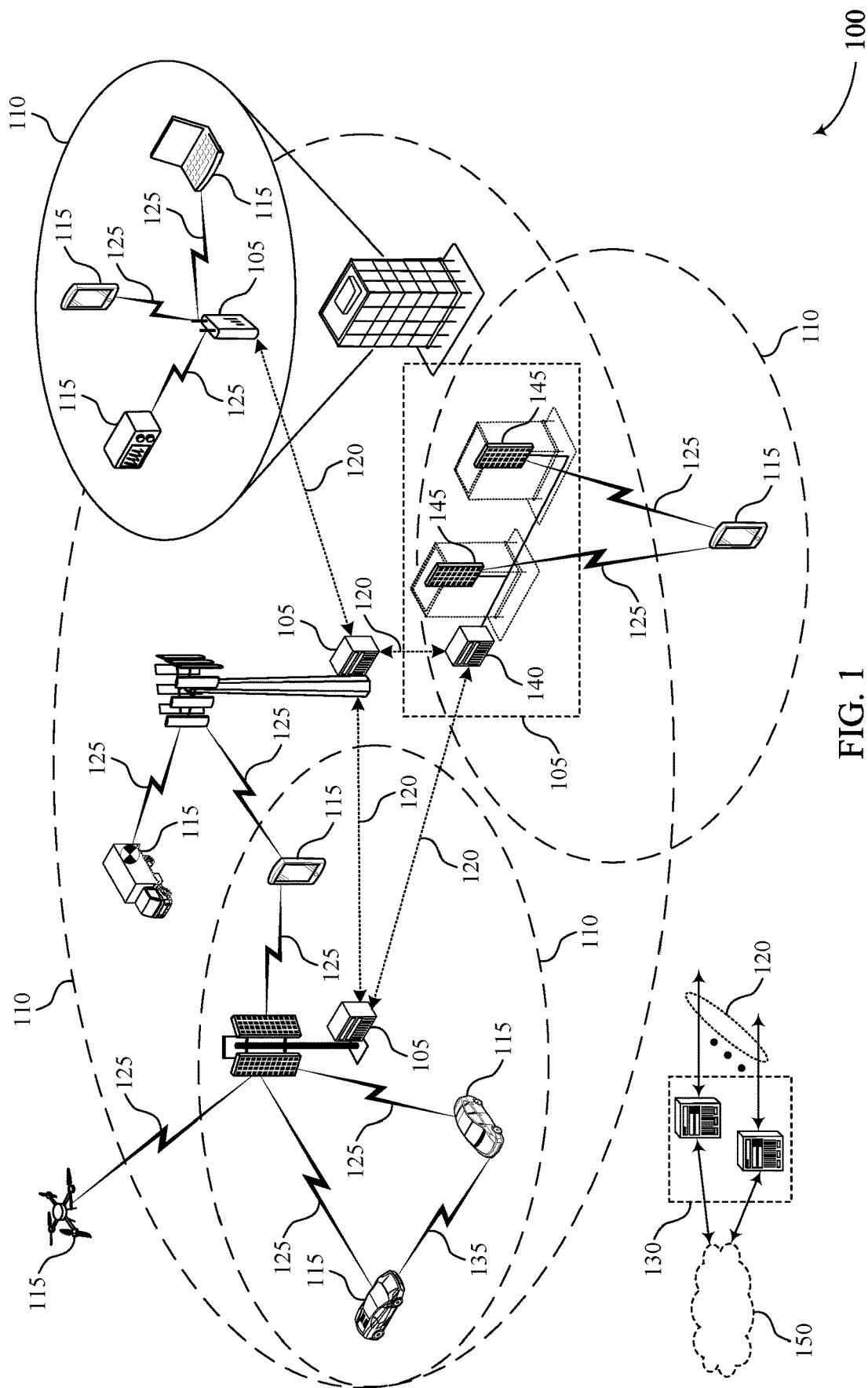
FIG. 1 illustrates an example of a system for wireless communications that supports methods to handle slicing accounting for evolved packet data gateway Wi-Fi access in accordance with aspects of the present disclosure.

Aspects of the described techniques provide mechanisms that can be implemented by a user equipment (UE) operating in a heterogenous environment that includes at least one of a non-cellular radio network (e.g., wireless local area network (WLAN), a Wi-Fi network, and the like), a legacy cellular radio network (e.g., such as a 4th generation (4G) cellular radio network, a fifth generation (5G) new radio (NR) non-stand alone (NSA) cellular radio network, etc.), and/or a 5G NR stand-alone (SA) cellular radio network. Wireless networks continue to evolve such that the UE may, more and more frequently, be located in such a heterogenous network. However, as each generation of wireless network has its own set of rules, policies, protocols, functions, entities, etc., this may create disparities between different wireless networks. This may result in the UE being presented with a situation where it is provided with conflicting and/or absent protocols, entities, etc., with respect to each network. This may disrupt communications between the UE and the associated wireless networks.

Aspects of the disclosure are initially described in the context of wireless communications systems. Generally, the described techniques provide various mechanisms that address inconsistencies between legacy cellular radio networks and advanced cellular radio networks being deployed.

For example, a UE may establish a connection with a base station associated with a cellular radio network (e.g., a 5G NR SA connection). Whenever a UE establishes a connection with a base station, the base station may generally configure, indicate, or otherwise convey to the UE various policies, protocols, and the like, for the cellular radio network. Accordingly, the UE may receive an access policy (e.g., a UE route selection policy (URSP)) identifying an access preference rule for the UE to use for connections to a core network function of the cellular radio network (e.g., for connections to a 5G core network (5GC)). That is, the URSP may generally indicate whether the UE is to preferentially route outgoing traffic, e.g., the traffic can be routed to an established protocol data unit (PDU) session (such as to the 5GC via the 5G NR SA base station), can be offloaded to a non-third generation partnership project (3GPP) cellular connection, such as via a Wi-Fi network, or to establish a new PDU session (e.g., a new PDU session to 5GC via the 5G NR SA base station). In this example, the URSP may indicate for the UE to preferentially connect to the 5GC via a non-cellular radio network, e.g., to route the outgoing traffic in the PDU session via a Wi-Fi network. However, the UE may determine that a gateway between the Wi-Fi radio network and the 5GC is not configured or is otherwise unavailable, e.g., a 3GPP interworking function (N3IWF) gateway. The UE may also determine that a gateway selection policy is not configured for the 5G NR SA, e.g., an access network discovery selection policy (ANDSP). Broadly, the ANDSP is used by the UE for selecting a non-3GPP access network, such as a wireless local area network (WLAN), Wi-Fi network, etc. Accordingly, the UE may establish a connection to a legacy core network function (e.g., an evolved packet core (EPC) core network function) of a legacy cellular radio network (e.g., 4G and/or 5G NR NSA cellular radio network) via a legacy gateway (e.g., an evolved packet data gateway (EPDG)). Broadly, the EPDG may be a gateway function between the Wi-Fi network and the EPC. Thus, despite the URSP giving preference to the Wi-Fi network and the fact that ANDSP and N3IWF are not configured or otherwise available, the UE may still utilize the EPDG to connect to the EPC core network following the URSP access policy when no ANDSP/N3IWF are configured yet for the 5G NR SA cellular radio network.

Additionally, or alternatively, the UE may have established the cellular connection with the base station in the 5G NR SA cellular radio network. However, in this example the URSP received by the UE may give preference to the 3GPP connection, e.g., for the UE to route the outgoing traffic to the 5G NR SA cellular radio network. That is, the URSP may give preference for the UE to connect to 5GC via the 5G NR SA base station. However, the UE may determine that neither the N3IWF gateway nor the ANDSP gateway selection policy are configured for the cellular radio network (e.g., for the 5G NR SA radio network). Subsequently, the UE may determine that its 5G NR SA cellular radio network has become unavailable, but that a Wi-Fi radio network is available. In response, the UE may establish a connection to a legacy core network function (e.g., EPC) of a legacy cellular radio network (e.g., 4G/5G NR NSA) via a legacy gateway (e.g., EPDG). The UE may identify or otherwise determine a legacy access policy (e.g., an access network discovery and selection function (ANDSF)) that gives preference for the UE to use a non-cellular radio network (e.g., a Wi-Fi network). That is, broadly the ANDSF helps the UE discover non-3GPP access networks, such as WLAN, Wi-Fi networks, etc. However, the UE may determine that the 5G NR SA cellular radio network has become available again, and therefore establish a new connection to the cellular radio network. That is, even though the ANDSF instructs the UE to give preference to a Wi-Fi network, the UE may follow the preference given in the URSP and reestablish its connection to the 5G NR NSA cellular radio network when the 5G NR SA network becomes available again. Otherwise the UE may be stuck with the Wi-Fi connection even though a more advanced 5G NR SA network is available.

Additionally, or alternatively, the UE may establish the cellular connection to the 5G NR SA cellular radio network and receive the URSP that, in this example, gives preference to the non-cellular radio network (e.g., gives preference to a non-3GPP network such as a Wi-Fi network). Again, the UE may determine that neither the ANDSP nor the N3IWF are configured for the 5G NR SA cellular radio network, but that a Wi-Fi network is available. Accordingly, the UE may establish a connection to the EPC legacy core network function of the 4G/5G NR NSA legacy cellular radio network via an EPDG gateway. The UE may receive or otherwise identify the ANDSF legacy access policy which, in this example, gives preference to a 3GPP connection. Previously the UE would ping-pong between the 5G NR SA connection and Wi-Fi connection. However, to avoid such ping-pong, the UE may maintain the connection to the EPC legacy core network function via the EPDG legacy gateway. This approach may avoid the UE frequently switching between the 5G NR SA network in which the URSP gives preference to a non-3GPP connection and the Wi-Fi network in which the ANDSF gives preference to a 3GPP connection.

Additionally, or alternatively, the UE may establish a connection to an EPC legacy core network function of a 4G/5G NR NSA legacy cellular radio network via the EPDG legacy gateway. The UE may be configured with a set of traffic descriptors (e.g., the UE may have different applications operating on the UE). For each traffic descriptors (e.g., each application), the UE may identify the ANDSF legacy access policy that gives preference to the UE to connect via either a cellular radio network (e.g., 3GPP cellular radio network) or a non-cellular radio network (e.g., a non-3GPP radio network). The UE may also identify or otherwise determine a legacy slice treatment associated with each traffic descriptor, e.g., based at least in part on the connection to the EPC via the EPDG. The UE may establish a connection to a 5GC core network function of a 5G NR SA cellular radio network via an N3IWF gateway. Accordingly, the UE may receive or otherwise identify a URSP access policy for the UE to adopt that also tells the UE whether to preferentially connect via either the cellular radio network or a non-cellular radio network. The UE may also determine or otherwise identify a slice treatment for each traffic descriptor, e.g., based at least in part on the URSP access policy, traffic descriptor identifier, traffic descriptor type, etc. Accordingly, the UE may use the URSP access policy, the legacy slice treatment (from EPC), and/or the slice treatment (from 5GC), to determine whether to transfer the connection for each traffic descriptor from the EPC via the EPDG gateway to the 5GC via the N3IWF or to establish an updated connection with the 5GC via the N3IWF. Accordingly, the UE can ensure that each traffic descriptor is given the proper slice treatment and/or connection preference when switching from an EPC connection to a 5GC connection.

Aspects of the disclosure are further illustrated by and described with reference to apparatus diagrams, system diagrams, and flowcharts that relate to methods to handle slicing accounting for evolved packet data gateway Wi-Fi access.

FIG. 1 illustrates an example of a wireless communications system 100 that supports methods to handle slicing accounting for evolved packet data gateway Wi-Fi access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may establish a cellular connection with a base station 105 associated with a cellular radio network. The UE 115 may receive an access policy of the cellular radio network identifying an access preference rule for the UE 115 to adopt for connections to a core network function of the cellular radio network, the access preference rule indicating for the UE 115 to preferentially connect to the core network function via a non-cellular radio network. The UE 115 may determine that a gateway between the non-cellular radio network and the core network function of the cellular radio network is not configured. The UE 115 may determine that a gateway selection policy of the cellular radio network is not configured. The UE 115 may establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

A UE 115 may establish a cellular connection with a base station 105 associated with a cellular radio network. The UE 115 may receive an access policy of the cellular radio network identifying an access preference rule for the UE 115 to adopt for connections to a core network function of the cellular radio network, the access preference rule indicating for the UE 115 to preferentially connect to the core network function via the cellular radio network via a gateway between the cellular radio network and the core network function. The UE 115 may determine that the gateway is not configured. The UE 115 may determine that a gateway selection policy of the cellular radio network is not configured. The UE 115 may determine that the non-cellular radio network is available and that the cellular radio network has become unavailable. The UE 115 may establish, via the non-cellular radio network, a connection to a legacy core network function of a legacy cellular radio network via a legacy gateway between the legacy core network function and the non-cellular radio network. The UE 115 may identify a legacy access policy of the legacy cellular radio network identifying a legacy access preference rule for the UE 115 to adopt for connections to the legacy core network function, the legacy access preference rule indicating for the UE 115 to preferentially connect to the legacy core network function via the non-cellular radio network. The UE 115 may determine that the cellular radio network has become available to establish a new connection. The UE 115 may establish, based at least on the access preference rule, the new connection to the cellular radio network.

A UE 115 may establish a cellular connection with a base station 105 associated with a cellular radio network. The UE 115 may receive an access policy of the cellular radio network identifying an access preference rule for the UE 115 to adopt for connections to a core network function of the cellular radio network, the access preference rule indicating for the UE 115 to preferentially connect to the core network function via a non-cellular radio network. The UE 115 may determine that the non-cellular radio network is available and that a gateway between the non-cellular radio network and the core network function of the cellular radio network is not configured. The UE 115 may determine that a gateway selection policy of the cellular radio network is not configured. The UE 115 may establish a connection to a legacy core network function of a legacy cellular radio network via a legacy gateway between the legacy core network function and the non-cellular radio network. The UE 115 may identify a legacy access policy of the legacy cellular radio network identifying a legacy access preference rule for the UE 115 to adopt for connections to the legacy core network function, the legacy access preference rule indicating for the UE 115 to preferentially connect to the legacy core network function via the legacy cellular radio network. The UE 115 may maintain, based at least in part on the access preference rule, the connection to the legacy core network function of the legacy radio network via the legacy gateway.

A UE 115 may establish a connection to a legacy core network function of a legacy cellular radio network via a legacy gateway between the legacy cellular radio network and a non-cellular radio network. The UE 115 may identify, for each traffic descriptor in the set of traffic descriptors, a legacy access policy of the legacy cellular radio network identifying a legacy access preference rule for the UE 115 to adopt for connections to the legacy core network function, each legacy access preference rule indicating for the UE 115 to preferentially connect to the legacy core network function via the legacy cellular radio network or a non-cellular radio network for the traffic descriptor and a legacy slice treatment for the traffic descriptor. The UE 115 may establish a connection to a core network function of a cellular radio network via a gateway between the cellular radio network and the non-cellular radio network. The UE 115 may identify, for each traffic descriptor in the set of traffic descriptors, an access policy of the cellular radio network identifying an access preference rule for the UE 115 to adopt for connections to the core network function of the cellular radio network, each access preference rule indicating for the UE 115 to preferentially connect to the core network function via the cellular radio network or the non-cellular radio network for the traffic descriptor and a slice treatment for the traffic descriptor. The UE 115 may determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

Figure 2:
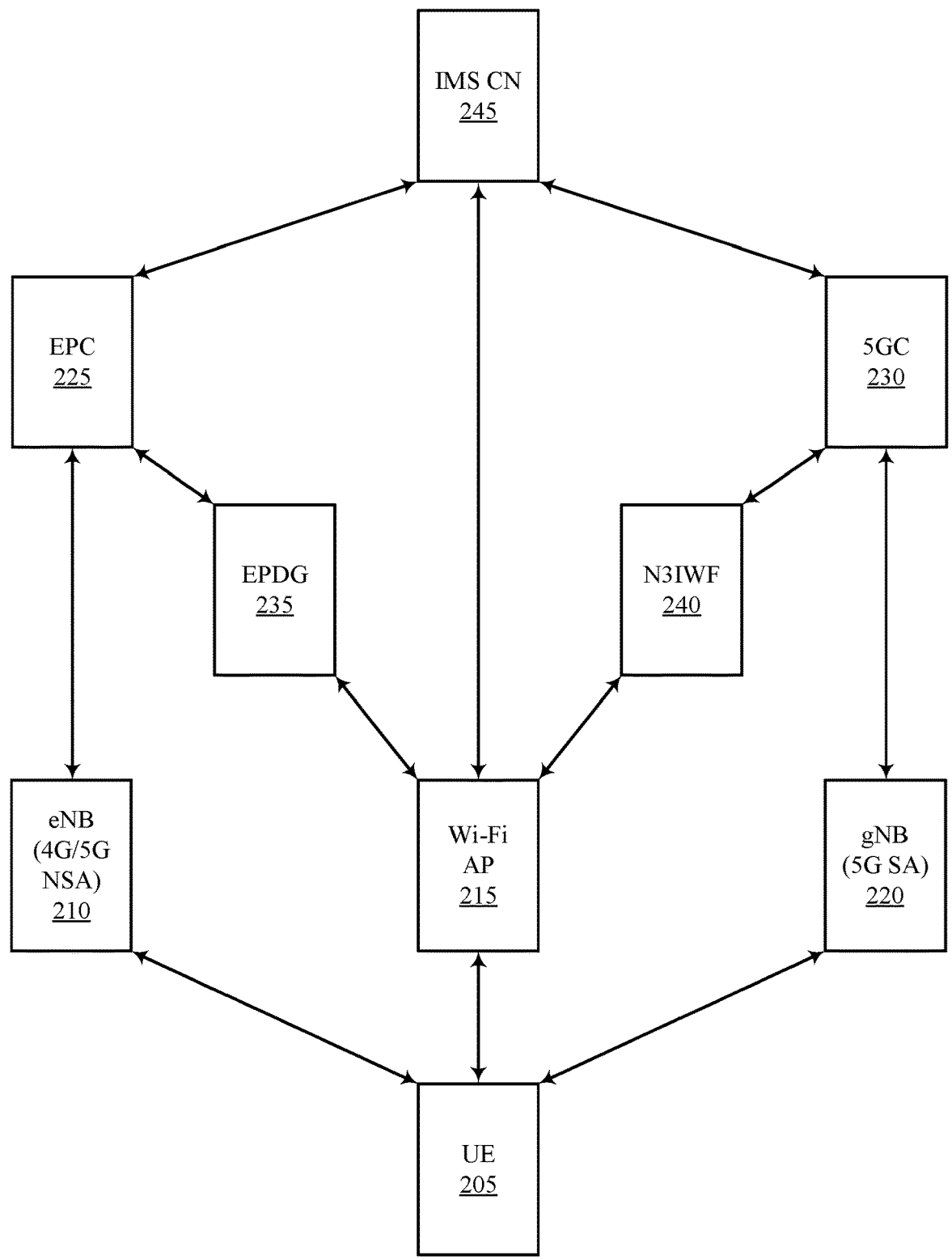
FIG. 2 illustrates an example of a wireless communications system that supports methods to handle slicing accounting for evolved packet data gateway Wi-Fi access in accordance with aspects of the present disclosure.

FIG. 2 illustrates an example of a wireless communications system 200 that supports methods to handle slicing accounting for evolved packet data gateway Wi-Fi access in accordance with aspects of the present disclosure. In some examples, wireless communications system 200 may implement aspects of wireless communications system 100. Wireless communications system 200 may include a UE 205, an eNB 210 (e.g., a base station associated with a legacy cellular radio network), a Wi-Fi access point (AP) 215, a gNB 220, an EPC 225, a 5GC 230, an EPDG 235, an N3IWF 240, and an IP multimedia subsystem (IMS) 245 (e.g., an IMS core network (CN) subsystem), which may be examples of the corresponding devices described herein.

Broadly, eNB 210 may be an example of any base station associated with a legacy cellular radio network, such as a 4G cellular radio network and/or 5G NR NSA cellular radio network. Similarly, gNB 220 may be an example of any base station associated with a cellular radio network, such as a 5G NR SA cellular radio network. The Wi-Fi AP 215 may be an example of an access point in a non-cellular radio network, such as a WLAN, Wi-Fi, or any other non-cellular radio network. EPC 225 may refer to a legacy core network function of the legacy cellular radio network (e.g., a 4G cellular radio network and/or a 5G NR NSA cellular radio network). Similarly, 5GC 230 may refer to a core network function of the cellular radio network (e.g., a 5G NR SA cellular radio network). IMS 245 may generally refer to any device, function, architectural framework, and the like, delivering IP multimedia services (e.g., IP-based traffic) between EPC 225, Wi-Fi AP 215, and/or 5GC 230 and the Internet.

When UE 205 is acting as a Wi-Fi only UE, it may connect to Wi-Fi AP 215 to exchange traffic via the IMS 245 via Wi-Fi AP 215. When UE 205 connects to eNB 210 (e.g., the UE 205 connects to a legacy cellular radio network), it may exchange traffic with IMS 245 via eNB 210 and EPC 225. If UE 205 connects to gNB 220 (e.g., the UE 205 connects to a cellular radio network), it may exchange traffic with IMS 245 via gNB 220 and 5GC 230. However, in some scenarios it may be more beneficial for UE 205 to access IMS 245 via a Wi-Fi network. UE 205 may be configured with various policies, protocols, functions, entities, and the like, that allow UE 205 to route traffic to IMS 245 via a gateway between Wi-Fi AP 215 and the corresponding core network function.

UE 205 may connect to eNB 210 and/or gNB 220 and may be provided with, or otherwise identify, a legacy access policy and/or access policy, respectively. One non-limiting example of a legacy access policy may include an ANDSF. Broadly, the ANDSF may refer to an entity within EPC 225. The purpose of the ANDSF is to assist UE 205 to discover non-3GPP access networks (e.g., to discover non-cellular radio networks, such as a WLAN, Wi-Fi network, and the like) that can be used for data communications in addition to the 3GPP access networks (e.g., 4G/5G NR NSA). Additionally, the ANDSF may provide UE 205 with the rules policing the connection to such non-cellular radio networks. For example, UE 205 may be within the coverage area of both eNB 210 and Wi-Fi AP 215, but may initially connect to eNB 210 to communicate via the legacy cellular radio network. Upon connecting to eNB 210 (and also gNB 220 in some examples), UE 205 may be provided with the ANDSF legacy access policy which identifies or otherwise tells UE 205 to give preference for PDU traffic to a non-3GPP connection. As UE 205 is within the coverage area of Wi-Fi AP 215, it may connect to Wi-Fi AP 215 and then establish a connection to the legacy core network function (e.g., EPC 225) via the EPDG 235 gateway. Of course, ANDSF may tell UE 205 to give preference to PDU traffic to a 3GPP connection, such as the connection to EPC 225 via eNB 210.

As another example, UE 205 may connect to gNB 220 and be provided with, or otherwise identify, an access policy. One non-limiting example of an access policy includes URSP. Broadly, UE 205 may use the URSP to determine how to route outgoing traffic. The traffic can be routed to an established PDU session (e.g., with 5GC via gNB 220), can be offloaded to a non-3GPP access (e.g., offloaded to a non-cellular radio network, such as a Wi-Fi network), or can trigger the establishment of a new PDU session. Similarly, UE 205 may be provided with, or otherwise identify, a gateway selection policy, such as ANDSP. Broadly, ANDSP is used by UE 205 for selecting a non-3GPP access network (e.g., any non-cellular radio network, such as a Wi-Fi network). The ANDSP may include rules that aid UE 205 in selecting the WLAN access network. For example, UE 205 may be within the coverage area of both gNB 220 and Wi-Fi AP 215, but may initially connect to gNB 220 to communicate via the cellular radio network. Upon connecting to gNB 220, UE 205 may be provided with the URSP access policy which identifies or otherwise tells UE 205 to give preference for PDU traffic to a non-3GPP connection (such as a Wi-Fi network). Further, the ANDSP access policy may aid UE 205 in selecting the appropriate non-3GPP access network. As UE 205 is within the coverage area of Wi-Fi AP 215 and ANDSP helps UE 205 identify Wi-Fi AP 215 as an acceptable non-3GPP access network, UE 205 may connect to Wi-Fi AP 215 and then establish a connection to the core network function (e.g., 5GC 230) via the N3IWF 240 gateway. Of course, URSP may tell UE 205 to give preference to PDU traffic to a 3GPP connection, such as the connection to 5GC 230 via gNB 220.

Although such techniques may be agreed to by the relevant governing standards bodies and configured for UE 205, there may be a situation where one or more of the entities and/or policies are not yet implemented or otherwise configured for use. That is, deployment of a heterogenous network, such as wireless communications system 200, may be an ongoing process. For example, the legacy cellular radio network (e.g., 4G radio network) may be deployed separately, but largely at the same time as the non-3 GPP access network (such as the Wi-Fi network). The 5G NR NSA cellular radio network may be deployed after the 4G radio network. The 5G NR SA cellular radio network may be deployed last and, in some aspects, such deployment may continue to be ongoing.

In some situations, this may create disparities between the way connectivity is configured to be implemented and the way in which connectivity can be implemented. As one example, many network operators deploying 5G NR SA cellular radio networks throughout various regions may not include every function, policy, entity, and the like. For example, some network operators deploy the 5G NR SA cellular radio network consisting of gNB 220 and/or 5GC 230, but do not implement ANDSP and/or N3IWF 230. That is, UE 205 may establish a cellular connection with gNB 220 associated with a 5G NR SA cellular radio network. UE 205 may receive the URSP access policy of the 5G NR SA cellular radio network giving an access preference for UE 205 to adopt for connections to a 5GC 230 core network function of the cellular radio network. In the situation where the URSP gives preference for a 3GPP access network, UE 205 may simply access IMS 245 via gNB 220 and 5GC 230. However, in some examples, UE 205 may determine that ANDSP and/or N3IWF 240 are not configured, activated, or are otherwise unavailable for the 5G NR SA cellular radio network. This creates a disparity for UE 205 with regards to how to proceed when the URSP gives preference to a non-3GPP access network. For example, UE 205 may not be able to identify Wi-Fi AP 215 without ANDSP and/or connect to 5GC 230 via Wi-Fi AP 215 and N3IWF 240 when neither ANDSP nor N3IWF 240 are configured for the 5G NR SA cellular radio network. Generally, the described techniques provide various mechanisms that address such disparities or inconsistencies between legacy cellular radio networks and advanced cellular radio networks.

For example, UE 205 may establish a connection with gNB 220 that is associated with a cellular radio network (e.g., a 5G NR SA cellular connection). Accordingly, UE 205 may receive an access policy (e.g., a URSP) identifying an access preference rule for UE 205 to use for connections to a core network function (such as 5GC 230) of the cellular radio network. The URSP may indicate for UE 205 to preferentially connect to the 5GC via a non-cellular radio network, e.g., to route the outgoing traffic in the PDU session via a Wi-Fi network. However, UE 205 may determine that the N3IWF 240 gateway between the Wi-Fi radio network (e.g., Wi-Fi AP 215) and the 5GC 230 is not configured or is otherwise unavailable. UE 205 may also determine that the ANDSP gateway selection policy is not configured for the 5G NR SA. Accordingly, UE 205 may establish a connection to a legacy core network function (e.g., EPC 225 core network function) of a legacy cellular radio network (e.g., 4G and/or 5G NR NSA cellular radio network) via a legacy gateway (e.g., via EPDG 235). Thus, despite the URSP giving preference to the Wi-Fi network and the fact that ANDSP and N3IWF are not configured or otherwise available, UE 205 may still utilize the EPDG 235 gateway to connect to EPC 225 core network following the URSP access policy when no ANDSP/N3IWF 240 are configured for the 5G NR SA cellular radio network. UE 205 may access IMS 245 via EPC 225 to exchange PDU session traffic.

As another example, UE 205 may have established the cellular connection with gNB 220 in the 5G NR SA cellular radio network. However, in this example the URSP received by UE 205 may give preference to the 3GPP connection, e.g., for the UE to route the outgoing traffic in the PDU session to the 5G NR SA cellular radio network via 5GC 230 and gNB 220. The URSP may give preference for UE 205 to connect to 5GC 230 via the 5G NR SA base station (e.g., gNB 220). However, UE 205 may determine that neither the N3IWF 240 gateway nor the ANDSP gateway selection policy are configured for the cellular radio network (e.g., for the 5G NR SA cellular radio network). Subsequently, UE 205 may determine that its 5G NR SA cellular radio network has become unavailable (e.g., UE 205 has lost its connection with gNB 220), but that a Wi-Fi radio network is available (e.g., UE 205 is within the coverage area of Wi-Fi AP 215). In response, UE 205 may establish a connection to a legacy core network function (e.g., EPC 225) of the legacy cellular radio network (e.g., 4G/5G NR NSA) via a legacy gateway (e.g., EPDG 235). UE 205 may identify or otherwise determine a legacy access policy (e.g., ANDSF) that gives preference for UE 205 to use a non-cellular radio network (e.g., a Wi-Fi network). However, UE 205 may determine that the 5G NR SA cellular radio network has become available again, and therefore establish a new connection to the cellular radio network. That is, even though the ANDSF instructs the UE 205 to give preference to a Wi-Fi network, UE 205 will follow the preference given in the URSP and reestablish its connection to the 5G NR NSA cellular radio network via gNB 220 when the 5G NR SA cellular radio network becomes available again. Otherwise UE 205 may have to use the Wi-Fi connection even though a more advanced 5G NR SA network is available.

As another example, UE 205 may establish the cellular connection to the 5G NR SA cellular radio network (e.g., a connection to 5GC 230 via gNB 220) and receive the URSP access policy that, in this example, gives preference to the non-cellular radio network (e.g., gives preference to a non-3GPP network, such as a Wi-Fi network). Again, UE 205 may determine that neither the ANDSP nor N3IWF 240 are configured or otherwise available for the 5G NR SA cellular radio network, but that a Wi-Fi network is available. Accordingly, UE 205 may establish a connection to EPC 225 legacy core network function of the 4G/5G NR NSA legacy cellular radio network via EPDG 235 legacy gateway. UE 205 may receive or otherwise identify the ANDSF legacy access policy which, in this example, gives preference to a 3GPP connection. Previously, UE 205 would ping-pong between the 5G NR SA connection and the Wi-Fi connection when both connections were available. That is, URSP prefers Wi-Fi and ANDSF prefers cellular, which means that UE 205 would connect to URSP, which triggers UE 205 to establish the Wi-Fi connection. Upon connecting to Wi-Fi, UE 205 would be given ANDSF which prefers a cellular connection. UE 205 would ping-pong between the Wi-Fi connection and the cellular radio network connection due to the disparities between the two access policies. However, to avoid such ping-pongs, UE 205 may maintain the connection to EPC 225 legacy core network function via EPDG 235 legacy gateway. As discussed, UE 205 may maintain the connection to EPC 225 legacy core network function via EPDG 235 since N3IWF 240 and ANDSP are not yet configured or otherwise available on the 5G NR SA cellular radio network. This approach may avoid UE 205 constantly or frequently switching between the 5G NR SA network in which the URSP gives preference to a non-3GPP connection and the Wi-Fi network in which the ANDSF gives preference to a 3GPP connection.

Another approach to one or more of the above-described scenarios may include gNB 220 providing UE 205 with out-of-band signaling via open mobile alliance (OMA) device management (DM) signaling identifying the connection preference for UE 205 to adopt. For example, gNB 220 may transmit a configuration signal to UE 205 for connections via the non-cellular radio network. The configuration signal may configure UE 205 to connect to the legacy core network function (e.g., EPC 225) via the non-cellular radio network. For example, the configuration signal may configure UE 205 to try connecting to EPC 225 via EPDG 235 while on Wi-Fi access. The configuration signal may configure UE 205 to try connecting to 5GC 230 via N3IWF 240 while on Wi-Fi access. In one example, the configuration signal may configure UE 205 to try connecting to N3IWF 240 while on Wi-Fi access but, if that attempt is unsuccessful, to try connecting to EPDG 235 while on Wi-Fi access. Thus, the configuration signal may provide more explicit guidance for UE 205 to adopt for connections to a core network function (e.g., either EPC 225 or 5GC 230).

Another disparity that may arise in such a heterogenous network relates to features that are implemented in a 5G NR SA cellular radio network, but not in the legacy cellular radio network or non-3GPP access network. One example of such functions relates to slicing within a 5G NR SA cellular radio network. That is, a cellular radio network may generally support or be a multi-service network supporting a wide range of traffic descriptors with diverse performance and service requirements. Slicing allows network operators to provide portions of their networks for specific customer use cases, such as a smart home, IoE, IoT factory, connected car, etc. Each use case (e.g., slice) generally receives a unique set of optimized resources and network topology that suits the needs of an application (which may also be referred to as an general traffic descriptor), such as connectivity, speed, capacity, throughput, latency, reliability, etc. Accordingly, a user may pay for a certain slice treatment for a particular application/traffic descriptor, which the network operators guarantee to meet for the application/traffic descriptor.

This feature may create disparities for UE 205 when dealing with a heterogenous network, such as wireless communications system 200. For example, while a 5G NR SA cellular radio network may support slicing, a 4G/5G NR NSA legacy cellular radio networks may not "speak" slicing in the same language as the 5G NR SA cellular radio network. That is, the 4G/5G NR NSA cellular radio network may not be provisioned or otherwise support slicing treatment for a traffic descriptor in the same manner as the 5G NR SA cellular radio network. This may result in a user of UE 205 paying for a certain slice treatment, which the network operator may have difficulty providing when UE 205 connects to EPC 225 via EPDG 235 gateway when on a Wi-Fi network.

Accordingly, aspects of the described techniques provide various mechanisms for UE 205 to adopt when dealing with slicing in a heterogeneous network. For example, UE 205 may establish a connection to EPC 225 legacy core network function of a 4G/5G NR NSA legacy cellular radio network via EPDG 235 legacy gateway. UE 205 may be configured with a set of traffic descriptors (e.g., UE 205 may be operating different applications, each application having an associated one or more traffic descriptors). For each traffic descriptor (e.g., each application), UE 205 may identify the ANDSF legacy access policy that gives preference to UE 205 to connect via either a cellular radio network (e.g., 3GPP cellular radio network) or a non-cellular radio network (e.g., a non-3GPP radio network, such as a Wi-Fi network). UE 205 may also identify or otherwise determine a legacy slice treatment associated with each traffic descriptor, e.g., based at least in part on the connection to EPC 225 via EPDG 235. The legacy slice treatment may generally refer to the performance characteristics provided for the traffic descriptor, e.g., latency requirements, priority, reliability requirements, and the like. UE 205 may establish a connection to a 5GC 230 core network function of a 5G NR SA cellular radio network. Accordingly, UE 205 may receive or otherwise identify a URSP access policy for UE 205 to adopt that also tells UE 205 whether to preferentially connect via either the cellular radio network or a non-cellular radio network. UE 205 may also determine or otherwise identify the slice treatment for each traffic descriptor, e.g., based at least in part on the URSP access policy, traffic descriptor identifier, traffic descriptor type, etc. Accordingly, UE 205 may use the URSP access policy, the legacy slice treatment (from EPC 225), and/or the slice treatment (from 5GC 230), to determine whether to transfer the connection for each traffic descriptor from EPC 225 via EPDG 235 gateway to 5GC 230 or to establish an updated connection with 5GC 230 via N3IWF 240 gateway. Accordingly, UE 205 can ensure that each traffic descriptor is given the proper slice treatment and/or connection preference when switching from an EPC 225 connection to a 5GC 230 connection.

Figure 3:
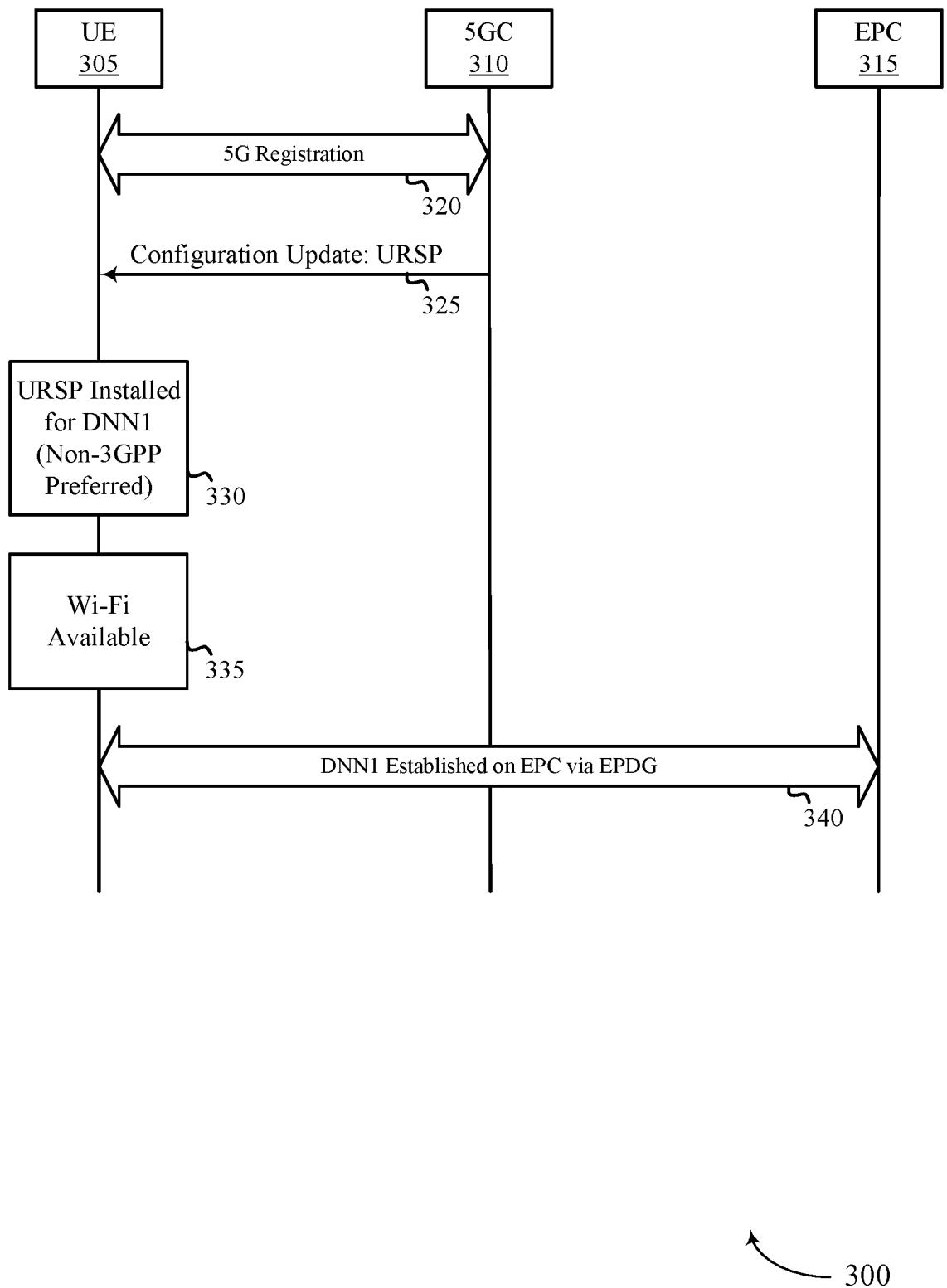
FIG. 3 illustrates an example of a process that supports methods to handle slicing accounting for evolved packet data gateway Wi-Fi access in accordance with aspects of the present disclosure.

FIG. 3 illustrates an example of a process 300 that supports methods to handle slicing accounting for evolved packet data gateway Wi-Fi access in accordance with aspects of the present disclosure. In some examples, process 300 may implement aspects of wireless communications systems 100 and/or 200. Aspects of process 300 may be implemented by UE 305, 5GC 310, and/or EPC 315, which may be examples of the corresponding devices described herein. It is to be understood that UE 305 may be connected to 5GC 310 via a 5G NR SA base station and/or via a Wi-Fi AP and N3IWF gateway when UE 305 is connected to a non-3GPP access network, such as a Wi-Fi network. Similarly, UE 305 may be connected to EPC 315 via a Wi-Fi AP and an EPDG legacy gateway when UE 305 is connected to a non-3GPP access network, such as a Wi-Fi network.

As discussed above, aspects of the described techniques provide mechanisms for UE 305 to address disparities in a heterogenous network. For example, the URSP access policy (e.g., the non-3GPP or Wi-Fi access policy) was originally intended to support UE 305 connecting to 5GC 310 via an N3IWF gateway. The URSP was subsequently modified to include an EPDG for connections to EPC 315 via the EPDG gateway, but to allow the ANDSP gateway selection policy to indicate or otherwise guide UE 305 to pick the node that UE 305 uses. However, neither N3IWF nor ANDSP are deployed or otherwise configured for many 5G NR SA cellular radio networks. This creates a question of how does UE 305 know whether the URSP rules pertaining to non-3GPP (e.g., Wi-Fi) access are even relevant since many operators have not deployed the N3IWF gateway and/or ANDSP. For operators who have deployed ANDSF for legacy cellular radio networks (e.g., 4G/5G NR NSA), the guiding standard indicates that, if UE 305 is registered to 5GC 315 via a 3GPP access and registered to EPC 310 via a non-3GPP access, UE 305 may use the ANDSF rules and the radio access network (RAN) rules, if available at UE 305, for uplink user data sent via EPDG, and apply URSP rules and applicable user preferences, if available at UE 305, to all of their uplink user data.

However, this creates a bootstrapping problem for UE 305. That is, how does UE 305 decide in the first place whether to register to EPC 315 and which uplink user data should be sent via EPDG. This results in a cyclical logical scenario for UE 305. That is, in order to pick the right policy to refer to, UE 305 needs to determine which uplink data should go via the EPDG. However, the guiding standard indicates for UE 305 to use ANDSP to decide between EPDG or N3IWF, but ANDSP may not be deployed. Process 300 illustrates one non-limiting example of how UE 305 may resolve this scenario.

At 320, UE 305 may register with 5GC 310. That is, UE 305 may establish a cellular connection with a base station associated with a cellular radio network, e.g., a 5G NR SA base station. For example, UE 305 may boot up in an area of 5G NR SA radio coverage and connect to 5GC 310 core network using non-access stratum (NAS) signaling.

At 325, UE 305 may be configured with the cellular network's URSP policy. That is, UE 305 may receive, from the network via the base station, an access policy (e.g., URSP) of the cellular radio network that identifies an access preference rule for UE 305 to adopt for connections to a core network function (e.g., 5GC 310) of the cellular radio network. The URSP may indicate for UE 305 to preferentially connect to the core network function via a non-cellular radio network (e.g., prefer a non-3GPP access network, such as a Wi-Fi network). Accordingly, the network may download the URSP policies to UE 305.

At 330, the URSP may be installed for UE 305. That is, the network may have downloaded the URSP policy to UE 305. At this point and per the guiding standards, UE 305 is only supposed to refer to URSP for its policies. One of the rules specified in URSP is for each data network name (DNN), whether the preferred access is 3GPP (e.g., cellular) or non-3GPP (e.g., Wi-Fi). For example, a URSP rule may look like:

Traffic Descriptor : DNN-Name=DNN1
RouteSelectionDescriptor:   Access-Preference=Non-3GPP
                            Access-Preference=3GPP This rule may mean that, when UE 305 is in an area with both 5G and Wi-Fi coverage, the network operator wants DNN1 to be connected over Wi-Fi access if possible. But, if UE 305 is not in an area of Wi-Fi coverage (or has any other problem connecting to the Wi-Fi network), the network operator wants UE 305 to establish its connection to 5GC 310 over 5G.

At 335, UE 305 may determine that it has entered a Wi-Fi coverage area in addition to the 5G NR SA cellular radio network. That is, UE 305 may enter an area where there is also Wi-Fi coverage in addition to 5G NR coverage. However, per the guiding standards for URSP, UE 305 accessing a non-3GPP coverage area included N3IWF or EPDG may assume the ANDSP gateway selection policy would be available for UE 305 to use in order to pick which gateway to use. As discussed though, some 5G NR SA cellular radio networks are not configured with N3IWF and/or ANDSP (e.g., the operator has not deployed or otherwise activated these functions). Accordingly, UE 305 may determine that the N3IWF gateway and/or the ANDSP gateway selection policy are not configured for its 5G NR SA cellular radio network connection. According to the described techniques, UE 305 may consider that non-3GPP access is access via Wi-Fi and EPDG to gain access to EPC 315 (e.g., to gain access to a 4G EPC) to solve the bootstrapping problem discussed above. When UE 305 encounters a URSP rule that prefers non-3GPP access network (e.g., Wi-Fi network), these techniques direct UE 305 to connect to EPC 315 via the EPDG legacy gateway. If this connection is successful, then UE 305 may subsequently follow what is specified in the guiding standards and use the ANDSF legacy access policy going forward.

Accordingly and at 340, UE 305 may establish a connection for DNN1 with EPC 315 via a EPDG gateway. That is, UE 305 may establish a connection with an Wi-Fi AP and then access EPC 315 via the EPDG legacy gateway that is located between the Wi-Fi AP and EPC 315.

As also discussed above, in some examples, the network (e.g., via the base station using out-of-band signaling) may configure UE 305 with values corresponding to:
0—only try connecting to EPDG while on Wi-Fi access
1—only try connecting to N3IWF while on Wi-Fi access
2—try connecting to N3IWF first while on Wi-Fi access, but if that attempt to connect is unsuccessful, try connecting to EPDG For example, the base station may transmit a configuration signal to UE 305 for connections via the non-cellular radio network that configure how UE 305 tries to connect to the N3IWF gateway to the 5GC 310 core network function of the 5G NR SA cellular radio network and/or to the EPDG legacy gateway to the EPC 315 legacy core network function of the 4G/5G NR NSA legacy cellular radio network.

Figure 4:
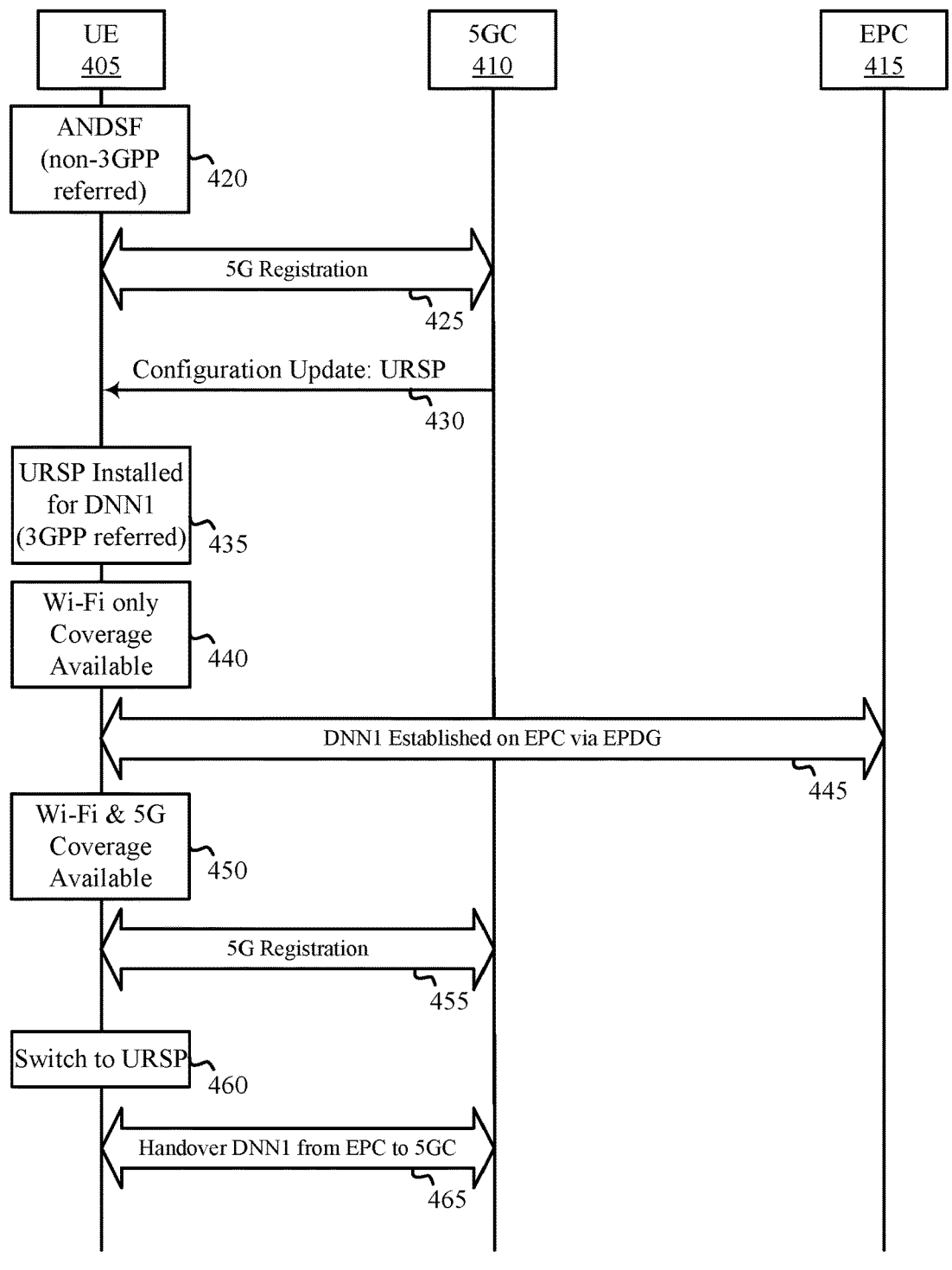
FIG. 4 illustrates an example of a process that supports methods to handle slicing accounting for evolved packet data gateway Wi-Fi access in accordance with aspects of the present disclosure.

FIG. 4 illustrates an example of a process 400 that supports methods to handle slicing accounting for evolved packet data gateway Wi-Fi access in accordance with aspects of the present disclosure. In some examples, process 400 may implement aspects of wireless communications systems 100 and/or 200 and/or process 300. Aspects of process 400 may be implemented by UE 405, 5GC 410, and/or EPC 415, which may be examples of the corresponding devices described herein. It is to be understood that UE 405 may be connected to 5GC 410 via a 5G NR SA base station and/or via a Wi-Fi AP and N3IWF gateway when UE 405 is connected to a non-3GPP access network, such as a Wi-Fi network. Similarly, UE 405 may be connected to EPC 415 via a Wi-Fi AP and an EPDG legacy gateway when UE 405 is connected to a non-3GPP access network, such as a Wi-Fi network.

As discussed above, aspects of the described techniques provide mechanisms for UE 405 to address disparities in a heterogenous network. For example, the URSP access policy (e.g., the non-3GPP or Wi-Fi access policy) was originally intended to support UE 405 connecting to 5GC 410 via an N3IWF gateway. The URSP was subsequently modified to include an EPDG for connections to EPC 415 via the EPDG gateway, but to allow the ANDSP gateway selection policy to indicate or otherwise guide UE 405 to pick the node that UE 405 uses. However, neither N3IWF nor ANDSP are deployed or otherwise configured for many 5G NR SA cellular radio networks. This creates a question of how does UE 405 know whether the URSP rules pertaining to non-3GPP (e.g., Wi-Fi) access are even relevant since many operators have not deployed the N3IWF gateway and/or ANDSP. For operators who have deployed ANDSF for legacy cellular radio networks (e.g., 4G/5G NR NSA), the guiding standard indicates that, if UE 405 is registered to the 5GC 415 via a 3GPP access and registered to EPC 410 via a non-3GPP access, UE 405 may use the ANDSF rules and the RAN rules, if available at UE 405, for uplink user data sent via EPDG, and apply URSP rules and applicable user preferences, if available at UE 405, to all of their uplink user data.

However, this creates a bootstrapping problem for UE 405. That is, UE 405 may not know how to initially decide whether to register to EPC 415 or know which uplink user data should be sent via EPDG. This results in a cyclical logic scenario for UE 405. That is, in order to pick the right policy to refer to, UE 405 may need to determine which uplink data should be communicated via the EPDG and EPC 415. However, the guiding standard indicates for UE 405 to use ANDSP to decide between EPDG or N3IWF, but ANDSP may not be deployed. Process 400 illustrates one non-limiting example of how UE 405 may resolve this scenario.

At 420, UE 405 may be provided or otherwise identify its ANDSF policy. UE 405 may identify the ANDSF legacy access policy based at least in part on a permanent configuration (e.g., preconfigured for UE 405), via RRC signaling, and the like. An example of the ANDSF policy may be:

```
ANDSF inter system routing policy (ISRP) configured as:
   ANDSF/ISRP/<X>/ForServiceBased/access point name one (APN1)/APN
      ANDSF/Policy/<X>PrioritizedAccess/WLAN/AccessTechnology
   ANDSF/ISRP/<X>/ForServiceBased/APN1/APN
      ANDSF/Policy/<X>/PrioritizedAccess/3gpp/AccessTechnology
```

The ANDSF legacy access policy may indicate for UE 405 to give preference to a non-3GPP access network (e.g., a Wi-Fi network). That is, the ANDSF rule indicates that, when UE 405 is in a coverage area of both a 4G/5G NR NSA legacy cellular radio network and a Wi-Fi network, the network operator wants DNN1 to be connected over a Wi-Fi access network if possible. However, if UE 405 is not in an area of Wi-Fi coverage or has any difficulties connecting to the Wi-Fi network, then UE 405 can utilize the legacy cellular radio network to connect to EPC 415 via an EPDG legacy gateway.

At 425, UE 405 may register with 5GC 410. That is, UE 405 may establish a cellular connection with a base station associated with a cellular radio network, e.g., a 5G NR SA base station. For example, UE 405 may boot up in an area of 5G NR SA radio coverage and connect to 5GC 410 core network using NAS signaling.

At 430, UE 405 may be configured with the cellular network's URSP policy. That is, UE 405 may receive, from the network via the base station, an access policy (e.g., URSP) of the cellular radio network that identifies an access preference rule for UE 405 to adopt for connections to a core network function (e.g., 5GC 410) of the cellular radio network. The URSP may indicate for UE 405 to preferentially connect to the core network function via a cellular radio network (e.g., UE 405 may prefer a 3GPP access network, such as the 5G NR SA network). Accordingly, the network may download the URSP policies to UE 405.

At 435, the URSP may be installed for UE 405. That is, the network may have downloaded the URSP policy to UE 405. At this point and per the guiding standards, UE 405 is only supposed to refer to URSP for its policies. One of the rules specified in URSP is for each DNN, whether the preferred access is 3GPP (e.g., cellular) or non-3GPP (e.g., Wi-Fi). For example, a URSP rule may look like:

```
Traffic Descriptor : DNN-Name=DNN1
   RouteSelectionDescriptor:   Access-Preference=3GPP
                               Access-Preference=Non-3GPP
```

This rule may mean that, when UE 405 is in an area with both 5G and Wi-Fi coverage, the network operator wants DNN1 to be connected over 5G access if possible. But, if UE 405 is not in an area of 5G coverage (or has any other problem connecting to the 5G network), the network operator wants UE 405 to establish its connection to 5GC 410 over Wi-Fi.

At 440, UE 405 may determine that it has entered Wi-Fi coverage area, but there is no 5G NR SA cellular radio network coverage. That is, UE 405 may enter an area where there is only Wi-Fi coverage, but no 5G NR coverage (e.g., UE 405 may have dropped its 5G connection). However, and per the guiding standards for URSP, UE 405 accessing a non-3GPP coverage area including N3IWF or EPDG may assume the ANDSP gateway selection policy would be available for UE 405 to use in order to pick which gateway. As discussed though, some 5G NR SA cellular radio networks are not configured with N3IWF and/or ANDSP (e.g., the operator has not deployed or otherwise activated these functions). Accordingly, UE 405 may determine that the N3IWF gateway and/or ANDSP gateway selection policy are not configured for its 5G NR SA cellular radio network connection. According to the described techniques, UE 405 may consider that non-3GPP access is access via Wi-Fi and EPDG to gain access to EPC 415 (e.g., to gain access to a 4G EPC) to solve the bootstrapping problem discussed above. When UE 405 encounters a URSP rule that prefers non-3GPP access network (e.g., Wi-Fi network), these techniques direct UE 405 to connect to EPC 415 via the EPDG legacy gateway. If this connection is successful, then UE 405 may subsequently follow what is specified in the guiding standards and use the ANDSF legacy access policy going forward.

Accordingly, and at 445, UE 405 may establish a connection for DNN1 with EPC 415 via a EPDG gateway. That is, UE 405 may establish a connection with an Wi-Fi AP and then access EPC 415 via the EPDG legacy gateway that is located between the Wi-Fi AP and EPC 415.

Per the rule discussed with respect to process 300, UE 405 may access EPC 415 via its connection using the EPDG legacy gateway according to the second preference provided in the URSP rule installed at 435. However, now UE 405 may begin following the ANDSF rule received at 420, which gives preference to a Wi-Fi connection. At this point, UE 405 is connected to EPC 410 via an EPDG legacy gateway and according to its ANDSF legacy access rule. However, this may create an issue for UE 405 should it enter the 5G NR SA coverage area again.

That is, the intention of the network operator (e.g., per the URSP access policy) was for DNN1 to give preference to 5G when a 5G network was available and only use a Wi-Fi network if the 5G network was unavailable. However, once UE 405 connects to EPC 415 via the EPDG legacy gateway and the 5G coverage area is dropped, UE 405 follows the ANDSF legacy access policy which gives preference to a Wi-Fi network for connections to EPC 415 of the 4G network. UE 405 may follow the guiding standards discussed above which indicate for UE 405 to use the ANDSF rules and RAN rules, if available at UE 405, for uplink user data sent via the EPDG legacy gateway. In the situation where UE 405 once again enters a 5G coverage area, it would not attempt to establish a new connection to the 5G network if it blindly followed the ANDSF legacy access policy. This may deny UE 405 the opportunity to reconnect to the 5G network should it become available.

However, according to the described techniques, UE 405 may establish a new connection to the 5G NR SA cellular radio network once it becomes available again. That is, instead of following the guiding standards discussed above, the described techniques provide for UE 405 to start using the URSP access policy again when a 5G network is available and registered for UE 405. UE 405 may do this even if it has been and is using the EPDG legacy gateway over a Wi-Fi connection for data transfer. If the URSP access policy rules state to give 5G preference, then UE 405 may attempt a handoff of DNN1 to 5GC 410.

Accordingly, and at 450, UE 405 may determine that the cellular radio network (e.g., 5G NR SA cellular radio network) has become available again and may try to establish a new connection with the cellular radio network. Therefore, and at 455, UE 405 may register with 5GC 410 (e.g., UE 405 may connect to a base station associated with the 5G NR SA cellular radio network and connect to 5GC 410 via of the base station). At 460, UE 405 may switch to the URSP access policy which gives preference to a 3GPP access network. Therefore, and at 465, UE 45 may handover the DNN1 connection from EPC 415 to 5GC 410. That is, despite the guiding standards indicating for UE 405 to follow the ANDSF legacy access policy and give preference to a Wi-Fi connection when available, UE 405 may reconnect to a 5G network when the 5G network becomes available again. As the 5G network may have better performance capabilities than a 4G and/or Wi-Fi networks, this may ensure that UE 405 is able to connect to the most capable network available.

In the situation where the N3IWF gateway and ANDSP are configured for the new connection to the 5G NR SA cellular radio network and the updated URSP rule given at 460 gives preference to non-3GPP, UE 405 may transfer the DNN1 connection to 5GC 410 from EPC 415 via the EPDG legacy gateway to 5GC 410 via the N3IWF gateway.

As also discussed above, in some examples the network (e.g., via the base station using out-of-band signaling) may configure UE 405 with values corresponding to:
   0—only try connecting to EPDG while on Wi-Fi access
   1—only try connecting to N3IWF while on Wi-Fi access
   2—try connecting to N3IWF first while on Wi-Fi access, but if that attempt to connect is unsuccessful, try connecting to EPDG For example, the base station may transmit a configuration signal to UE 405 for connections via the non-cellular radio network that configures how UE 405 tries to connect to the N3IWF gateway to the 5GC 410 core network function of the 5G NR SA cellular radio network and/or to the EPDG legacy gateway to the EPC 415 legacy core network function of the 4G/5G NR NSA legacy cellular radio network.

Figure 5:
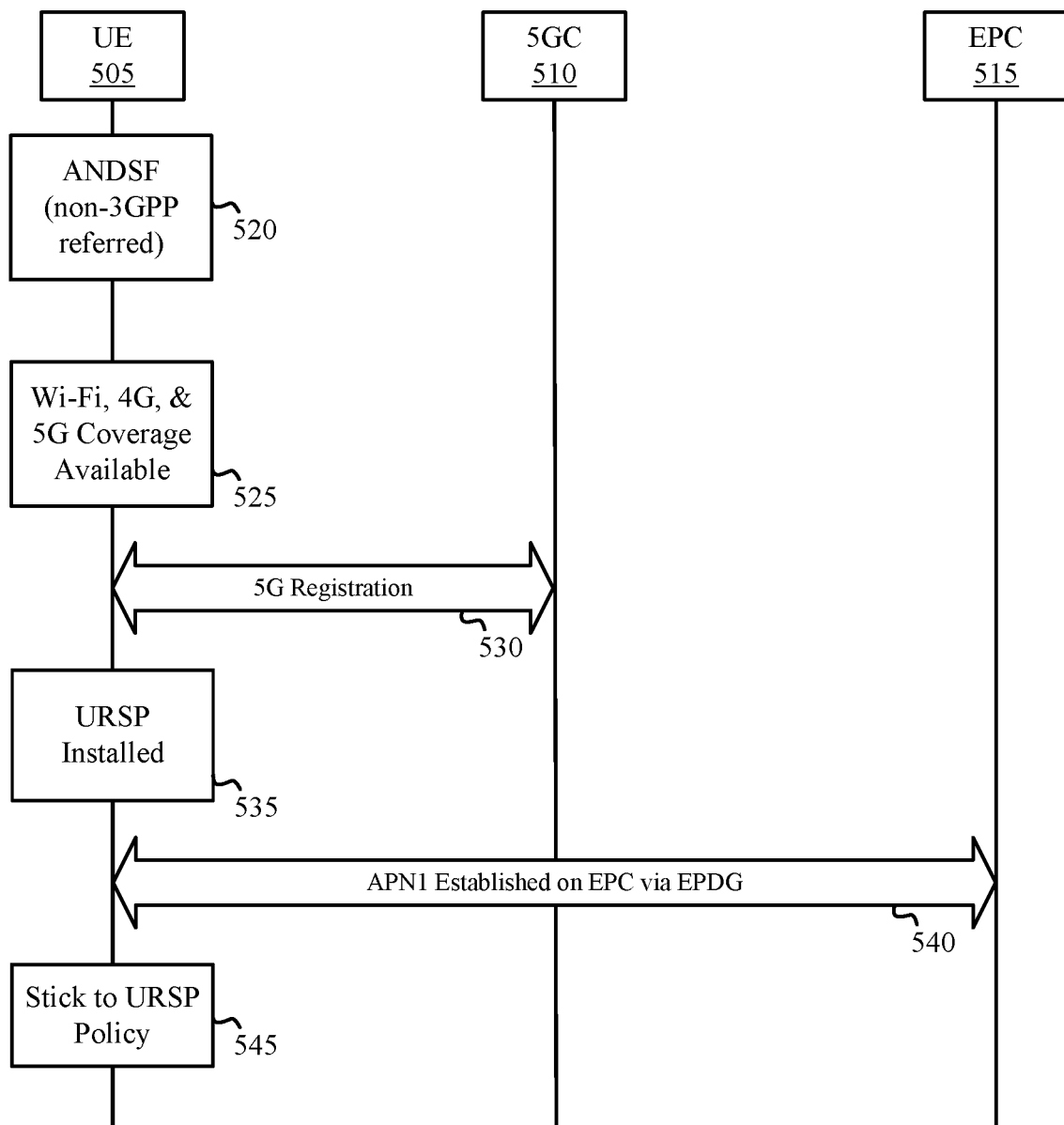
FIG. 5 illustrates an example of a process that supports methods to handle slicing accounting for evolved packet data gateway Wi-Fi access in accordance with aspects of the present disclosure.

FIG. 5 illustrates an example of a process 500 that supports methods to handle slicing accounting for evolved packet data gateway Wi-Fi access in accordance with aspects of the present disclosure. In some examples, process 500 may implement aspects of wireless communications systems 100 and/or 200 and/or processes 300 and/or 400. Aspects of process 500 may be implemented by UE 505, 5GC 510, and/or EPC 515, which may be examples of the corresponding devices described herein. It is to be understood that UE 505 may be connected to 5GC 510 via a 5G NR SA base station and/or via a Wi-Fi AP and N3IWF gateway when UE 505 is connected to a non-3GPP access network, such as a Wi-Fi network. Similarly, UE 505 may be connected to EPC 515 via a Wi-Fi AP and an EPDG legacy gateway when UE 505 is connected to a non-3GPP access network, such as a Wi-Fi network.

As discussed above, aspects of the described techniques provide mechanisms for UE 505 to address disparities in a heterogenous network. For example, the URSP access policy (e.g., the non-3GPP or Wi-Fi access policy) was originally intended to support UE 505 connecting to 5GC 510 via an N3IWF gateway. The URSP was subsequently modified to include an EPDG for connections to EPC 515 via the EPDG gateway, but to allow the ANDSP gateway selection policy to indicate or otherwise guide UE 505 to pick the node that UE 505 uses. However, neither N3IWF nor ANDSP are deployed or otherwise configured for many 5G NR SA cellular radio networks. This creates a question of how does UE 505 know whether the URSP rules pertaining to non-3GPP (e.g., Wi-Fi) access are even relevant since many operators have not deployed the N3IWF gateway and/or ANDSP. For operators who have deployed ANDSF for legacy cellular radio networks (e.g., 4G/5G NR NSA), the guiding standard indicates that, if UE 505 is registered to 5GC 510 via a 3GPP access and registered to EPC 510 via a non-3GPP access, UE 505 may use the ANDSF rules and the RAN rules, if available at UE 505, for uplink user data sent via EPDG, and apply URSP rules and applicable user preferences, if available at UE 505, to all of their uplink user data.

However, this creates a bootstrapping problem for UE 505. That is, how does UE 505 decide in the first place whether to register to EPC 515 and which uplink user data to send via EPDG. This results in a cyclical logic scenario for UE 505. That is, in order to pick the right policy to refer to, UE 405 needs to determine which uplink data should be communicated via the EPDG and EPC 515. However, the guiding standard indicates for UE 505 to use ANDSP to decide between EPDG or N3IWF, but ANDSP may not be deployed.

At 520, UE 505 may be provided or otherwise identify its ANDSF policy. UE 505 may identify the ANDSF legacy access policy based at least in part on a permanent configuration (e.g., preconfigured for UE 505), via RRC signaling, and the like. An example of the ANDSF policy may be:

ANDSF ISRP configured as:
  ANDSF/ISRP/<X>/ForServiceBased/APN1/APN
    ANDSF/Policy/<X>/PrioritizedAccess/3gpp/AccessTechnology
  ANDSF/ISRP/<X>/ForServiceBased/APN1/APN
    ANDSF/Policy/<X>/PrioritizedAccess/WLAN/AccessTechnology The ANDSF legacy access policy may indicate for UE 505 to give preference to a 3GPP access network (e.g., a 5G network). That is, the ANDSF rule may indicate that, when UE 505 is in coverage areas of both a 4G/5G NR NSA legacy cellular radio network and a Wi-Fi network, the network operator wants DNN1 to be connected over a 3GPP access network if possible. However, if UE 505 is not in an area of 5G coverage or has any difficulties connecting to the 5G network, then UE 505 can utilize the non-3GPP access network to connect to EPC 515 via an EPDG legacy gateway.

At 520, UE 505 may determine that it is located in the coverage areas of 5G NR SA, a 4G/5G NR NSA, and a Wi-Fi networks.

Accordingly, and at 530, UE 505 may register with 5GC 510. That is, UE 505 may establish a cellular connection with a base station associated with a cellular radio network, e.g., a 5G NR SA base station. For example, UE 505 may boot up in an area of 5G NR SA radio coverage and connect to 5GC 510 core network using NAS signaling.

At 535, UE 505 may be configured with the cellular network's URSP policy. That is, UE 505 may receive, from the network via the base station, an access policy (e.g., URSP) of the cellular radio network that identifies an access preference rule for UE 505 to adopt for connections to a core network function (e.g., 5GC 510) of the cellular radio network. The URSP may indicate for UE 505 to preferentially connect to the core network function via a non-cellular radio network (e.g., prefer a non-3GPP access network, such as a Wi-Fi network). Accordingly, the network may download the URSP policies to UE 505.

Accordingly, the URSP may be installed for UE 505. That is, the network may have downloaded the URSP policy to UE 505. At this point and per the guiding standards, UE 505 is only supposed to refer to URSP for its policies. One of the rules specified in URSP is for each DNN, whether the preferred access is 3GPP (e.g., cellular) or non-3GPP (e.g., Wi-Fi). For example, a URSP rule may look like:

```
Traffic Descriptor : DNN-Name=DNN1
   RouteSelectionDescriptor:   Access-Preference=Non-3GPP
                               Access-Preference= 3GPP
```

This rule may mean that, when UE 505 is in an area with both 5G and Wi-Fi coverage, the network operator wants DNN1 to be connected over the Wi-Fi access network if possible. But, if UE 505 is not in an area of Wi-Fi coverage (or has any other problem connecting to the Wi-Fi network), the network operator wants UE 505 to establish its connection to 5GC 510 over the 5G access network.

Thus, the network operator may have configured the ANDSF legacy access policy to be the opposite of the URSP policy (e.g., ANDSF prefers 3GPP over Wi-Fi where URSP prefers Wi-Fi over 3GPP). One possible reason for this configuration is that the operator intended the policy to be that if UE 505 has a choice of 5G and WLAN networks, the WLAN chosen as the 5G network may have spotty coverage during early deployment periods. If, however, UE 505 has a choice of 4G/5G NR NSA or WLAN networks, the 4G/5G NR NSA network may be chosen as it is a mature, stable network with a larger coverage area. However, this misconfiguration may lead to the situation where, if UE 505 is in the coverage area of all three networks at the same time, UE 505 keeps ping-ponging from 5G to WLAN and back because URSP prefers Wi-Fi and, once connected to EPC 515 via the EPDG legacy gateway, the ANDSF prefers 3GPP connections. This problem may have been avoided had these network operators deployed the N3IWF gateway and ANDSP within the 5G NR SA cellular radio networks as UE 505 would simply need to rely on the URSP.

Accordingly, and per URSP at 540, UE 505 may establish a connection for DNN1 with EPC 515 via a EPDG gateway. That is, UE 505 may establish a connection with a Wi-Fi AP and then access EPC 515 via the EPDG legacy gateway that is located between the Wi-Fi AP and EPC 515.

According to the described techniques, and at 545, UE 505 may maintain its connection for DNN1 with EPC 515 via the EPDG gateway. That is, despite the ANDSF legacy access policy directing UE 505 to preferentially connect to the 3GPP cellular radio network, UE 505 may continue to follow the URSP access policy and maintain its connection for DNN1 on EPC 515.

As also discussed above, in some examples the network (e.g., via the base station using out-of-band signaling) may configure UE 405 with values corresponding to:

0—only try connecting to EPDG while on Wi-Fi access
1—only try connecting to N3IWF while on Wi-Fi access
2—try connecting to N3IWF first while on Wi-Fi access, but if that attempt to connect is unsuccessful, try connecting to EPDG For example, the base station may transmit a configuration signal to UE 505 for connections via the non-cellular radio network that configure how UE 505 tries to connect to the N3IWF gateway to the 5GC 510 core network function of the 5G NR SA cellular radio network and/or to the EPDG legacy gateway to the EPC 515 legacy core network function of the 4G/5G NR NSA legacy cellular radio network.

Figure 6:
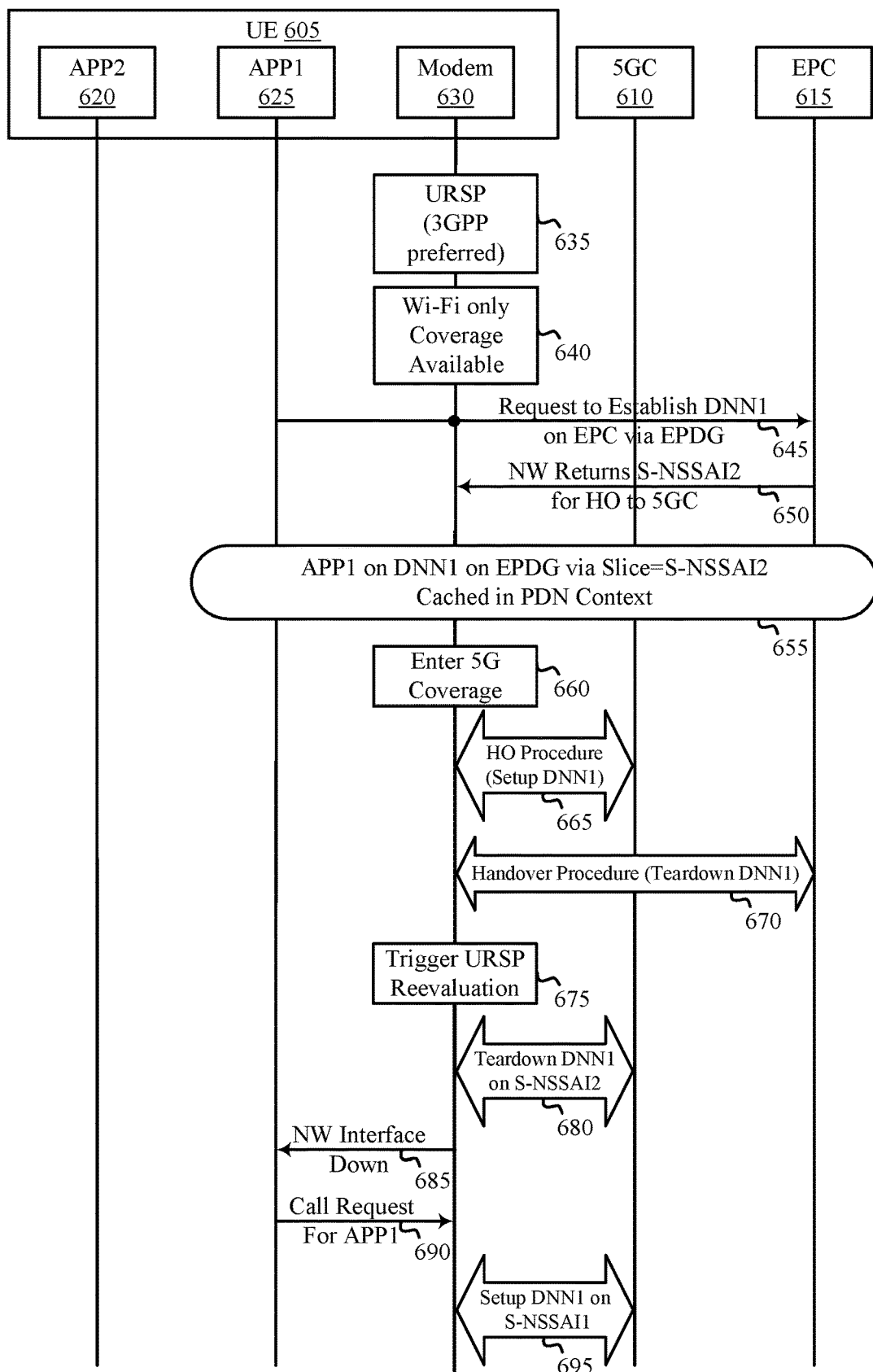
FIG. 6 illustrates an example of a process that supports methods to handle slicing accounting for evolved packet data gateway Wi-Fi access in accordance with aspects of the present disclosure.

FIG. 6 illustrates an example of a process 600 that supports methods to handle slicing accounting for evolved packet data gateway Wi-Fi access in accordance with aspects of the present disclosure. In some examples, process 600 may implement aspects of wireless communications systems 100 and/or 200 and/or processes 300, 400, and/or 500. Aspects of process 600 may be implemented by UE 605, 5GC 610, and/or EPC 615, which may be examples of the corresponding devices described herein. It is to be understood that UE 605 may be connected to 5GC 610 via a 5G NR SA base station and/or via a Wi-Fi AP and N3IWF gateway when UE 605 is connected to a non-3GPP access network, such as a Wi-Fi network. Similarly, UE 605 may be connected to EPC 615 via a Wi-Fi AP and an EPDG legacy gateway when UE 605 is connected to a non-3GPP access network, such as a Wi-Fi network.

In some aspects, UE 605 may include a set of applications, with two applications being shown by way of example only. Generally, each application may refer to any general traffic descriptor. Accordingly, UE 605 may include a first application 625, a second application 620, and a modem 630, which may be examples of the corresponding devices described herein. Modem 630 may monitor, control, or otherwise manage aspects of communications between UE 605 and 5GC 610 and/or EPC 615 (e.g., via one or more base stations, Wi-Fi APs, N3IWF gateways, EPDG legacy gateways, and the like).

As discussed above, aspects of the described techniques may support UE 605 establishing a connection to an EPC 615 legacy core network function of a 4G/5G NR NSA legacy cellular radio network via the EPDG legacy gateway. UE 605 may be configured with a set of traffic descriptors (e.g., UE 605 may have different applications operating on UE 605, such as first application 625 and/or second application 620). For each traffic descriptors (e.g., each application), UE 605 may identify the ANDSF legacy access policy that gives preference to UE 605 to connect via either a cellular radio network (e.g., 3GPP cellular radio network) or a non-cellular radio network (e.g., a non-3GPP radio network), such as a routing selection preference. UE 605 may also identify or otherwise determine a legacy slice treatment associated with each traffic descriptor, e.g., based at least in part on the connection to EPC 615 via the EPDG. UE 605 may establish a connection to a 5GC 610 core network function of a 5G NR SA cellular radio network via an N3IWF gateway. Accordingly, UE 605 may receive or otherwise identify a URSP access policy for UE 605 to adopt that also tells UE 605 whether to preferentially connect via either the cellular radio network or a non-cellular radio network. UE 605 may also determine or otherwise identify a slice treatment for each traffic descriptor, e.g., based at least in part on the URSP access policy, traffic descriptor identifier, traffic descriptor type, etc. Accordingly, UE 605 may use the URSP access policy, the legacy slice treatment (from EPC 615), and/or the slice treatment (from 5GC 610), to determine whether to transfer the connection for each traffic descriptor (e.g., application) from EPC 615 via the EPDG gateway to 5GC 610 via the N3IWF gateway or to establish an updated connection with 5GC 615 via the N3IWF. Accordingly, UE 605 can ensure that each traffic descriptor is given the proper slice treatment and/or connection preference when switching from an EPC 615 connection to a 5GC 610 connection.

Accordingly, and at 635, UE 605 may be configured with the cellular network's URSP policy. That is, UE 605 may receive, from the network via the base station, an access policy (e.g., URSP) of the cellular radio network that identifies an access preference rule for UE 605 to adopt for connections to a core network function (e.g., 5GC 610) of the cellular radio network. The URSP may indicate for UE 605 to preferentially connect to the core network function via a cellular radio network (e.g., prefer a 3GPP access network, such as a 5G NR SA network). Accordingly, the URSP may be installed for UE 605. That is, the network may have downloaded the URSP policy to UE 605. At this point and per the guiding standards, UE 605 is only supposed to refer to URSP for its policies. One of the rules specified in URSP is for each DNN, whether the preferred access is 3GPP (e.g., cellular) or non-3GPP (e.g., Wi-Fi). For example, a URSP rule may look like:

Traffic Descriptor : App-Id = APP1, APP2
   RouteSelectionDescriptor: DNN=DNN1, Access-Preference=3GPP, S-NSSAI=1
                                 DNN=DNN1, Access-Preference=Non-3GPP, S-NSSAI=2 where S-NSSAI refers to the single—network slice selection assistant. This rule may mean that both APP1 and APP2 are supposed to be cellular preferred when there is a choice between cellular and Wi-Fi coverage. This rule may also mean that UE 605 may request slice 1 as long as slice 1 is allowed by the network. If there is no cellular network available, then both APP1 and APP2 may be connected via a Wi-Fi network.

At 640, UE 605 may be located in a Wi-Fi coverage area only, e.g., there is no 5G coverage areas available for which UE 605 may connect. However, at 645, first application 625 (e.g., APP1) may request a connection to modem 630, which requests to establish a connection to EPC 615 via an EPDG legacy gateway and Wi-Fi AP. Since the EPDG legacy gateway belongs to EPC 615, there is no concept of slice treatment. However, for the guiding standards for 5GC 610, EPC 615 may inform UE 605 what S-NSSAI it should store for this connection to EPC 615 via the EPDG legacy gateway so that, if there is a handoff to 5GC 610, UE 605 should request the same S-NSSAI that was signaled to it by EPC 615 via the EPDG legacy gateway. In this example and at 650, EPC 615 assigned S-NSSAI2 to this connection, which may also be referred to as a legacy traffic descriptor and/or slice treatment for this connection.

Accordingly, and at 655, UE 605 may establish a connection to a legacy core network function of the legacy cellular radio network via a legacy gateway. UE 605 may identify the legacy access policy (e.g., ANDSF) that preferentially instructs UE 605 to connect to the legacy core network function via either a 3GPP connection or a non-3GPP connection.

At 660, UE 605 may enter an area with 5G coverage. For example, UE 605 may connect to a 5G NR SA base station and establish a connection with 5GC 610 via the base station. As the URSP access policy gives preference to a 3GPP access network for the DNN1 connection, at 665, this may trigger a handover procedure for S-NSSAI2, which is granted by 5GC 610. Accordingly, and at 670, modem 630 of UE 605 may tear down the connection for DNN1 with EPC 615.

At this point, first application 625 is connected to 5GC 610 using the 5G NR SA cellular radio network. However, should second application 620 ask modem 630 for a connection, UE 605 would refer to the URSP access policy, which indicates that the first choice for the second application 620 is S-NSSAI1. Accordingly, UE 605 would initiate NAS signaling to request a connection for S-NSSAI1, which may be granted by the network (e.g., 5GC 610). Accordingly, UE 605 would establish a connection with 5GC 610 for S-NSSAI1 for second application 620. Now, second application 620 would be connected over the 5G cellular radio network to 5GC 610 with slice one (S-NSSAI1) and first application 625 would be connected over the 5G cellular radio network to 5GC 610 with slice two (S-NSSAI2) as a separate PDU session. Thus, even though the network operator may be intended to give both DNN1 and DNN2 the same slice treatment, this approach would not give the desired result.

Accordingly, at 675, aspects of the described techniques provide for modem 630 of UE 605 to reevaluate the URSP access policy previously provided. That is, whenever there is a handoff from EPC 615 to 5GC 610, UE 605 may go beyond what the guiding standard states and, instead, may not blindly specify the S-NSSAI that was received during EPDG signaling (e.g., the legacy slice treatment indication received from EPC 615 via the EPDG legacy gateway). Instead, UE 605 may reevaluate the URSP access policy to see whether the S-NSSAI received from EPDG is a valid route selection descriptor (RSD) in URSP, even if it is the lower priority RSD and/or whether it is an allowed S-NSSAI. If not, UE 605 may tear down the call and let the application retry (e.g., first application 625). If it is valid, UE 605 may continue using the current connection. If another application under the same rule requests a call (e.g., to establish a connection), UE 605 may latch that application to the same call (e.g., connection).

In this example, the URSP reevaluation may indicate that S-NSSAI2 is not a valid route for first application 625. Accordingly, and at 685, modem 630 of UE 605 may send an indication to the first application 625 that the network interface is down. At 690, first application 625 may send a call request to modem 630 of UE 605 requesting a new connection. At 695, modem 630 of UE 605 may set up a new connection with 5GC 610 for the first application 625.

Accordingly, UE 605 may tear down the original connection for DNN1 on S-NSSAI2 for first application 625 and establish an updated connection on 5GC 610 for DNN1 on S-NSSAI1. This may result in the desired slice treatment/route selection for each application.

Figure 7:
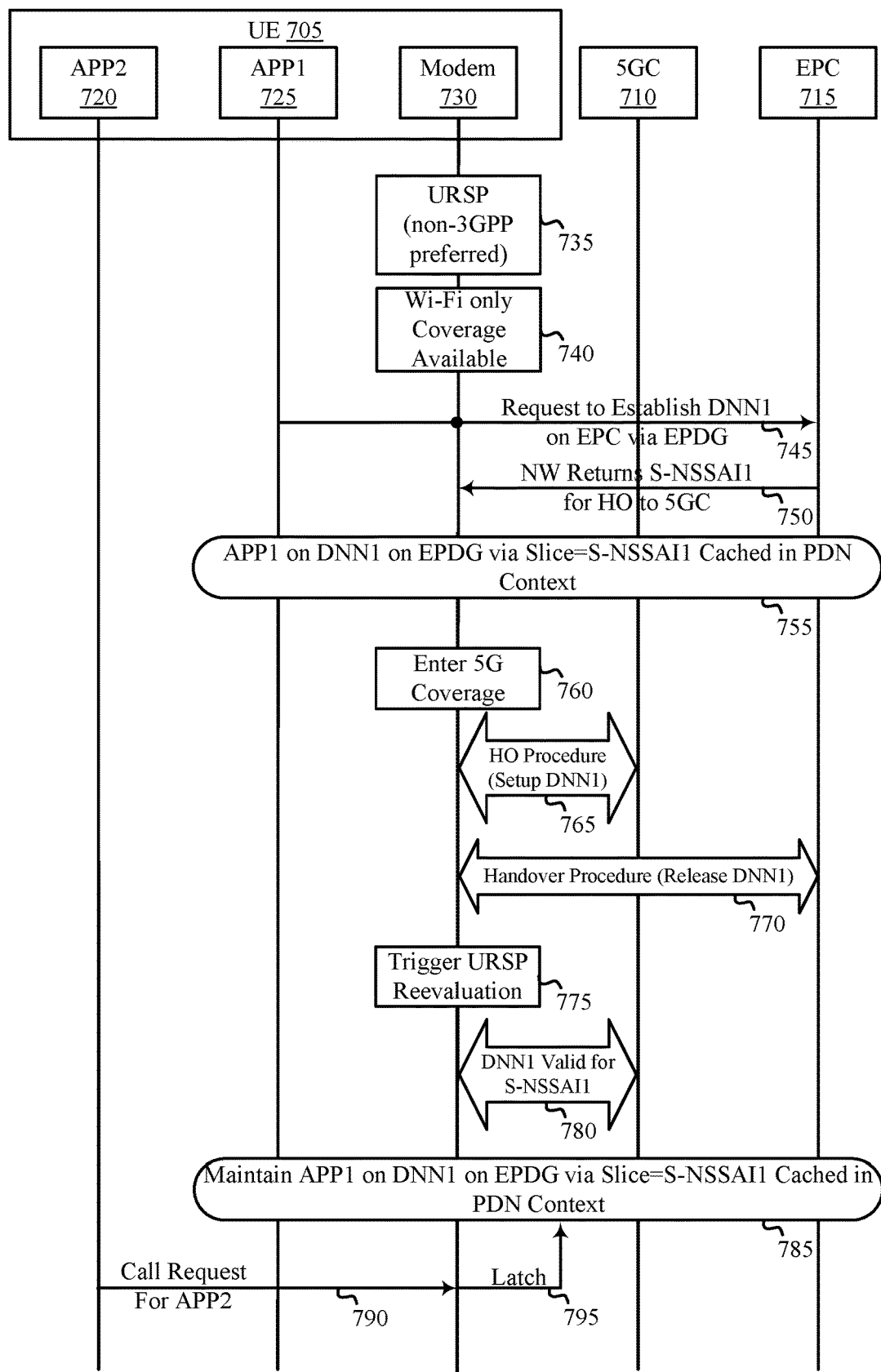
FIG. 7 illustrates an example of a process that supports methods to handle slicing accounting for evolved packet data gateway Wi-Fi access in accordance with aspects of the present disclosure.

FIG. 7 illustrates an example of a process 700 that supports methods to handle slicing accounting for evolved packet data gateway Wi-Fi access in accordance with aspects of the present disclosure. In some examples, process 700 may implement aspects of wireless communications systems 100 and/or 200 and/or processes 300, 400, 500, and/or 600. Aspects of process 700 may be implemented by UE 705, 5GC 710, and/or EPC 715, which may be examples of the corresponding devices described herein. It is to be understood that UE 705 may be connected to 5GC 710 via a 5G NR SA base station and/or via a Wi-Fi AP and N3IWF gateway when UE 705 is connected to a non-3GPP access network, such as a Wi-Fi network. Similarly, UE 705 may be connected to EPC 715 via a Wi-Fi AP and an EPDG legacy gateway when UE 705 is connected to a non-3GPP access network, such as a Wi-Fi network.

In some aspects, UE 705 may include a set of applications, with two applications being shown by way of example only. Generally, each application may refer to any general traffic descriptor. Accordingly, UE 705 may include a first application 725, a second application 720, and a modem 730, which may be examples of the corresponding devices described herein. Modem 730 may monitor, control, or otherwise manage aspects of communications between UE 705 and 5GC 710 and/or EPC 715 (e.g., via one or more base stations, Wi-Fi APs, N3IWF gateways, EPDG legacy gateways, and the like).

As discussed above, aspects of the described techniques may support UE 705 establishing a connection to an EPC 715 legacy core network function of a 4G/5G NR NSA legacy cellular radio network via the EPDG legacy gateway. UE 705 may be configured with a set of traffic descriptors (e.g., UE 705 may have different applications operating on UE 705, such as first application 725 and/or second application 720). For each traffic descriptors (e.g., each application), UE 705 may identify the ANDSF legacy access policy that gives preference to UE 705 to connect via either a cellular radio network (e.g., 3GPP cellular radio network) or a non-cellular radio network (e.g., a non-3GPP radio network), such as a routing selection preference. UE 705 may also identify or otherwise determine a legacy slice treatment associated with each traffic descriptors, e.g., based at least in part on the connection to EPC 715 via the EPDG. UE 705 may establish a connection to a 5GC 710 core network function of a 5G NR SA cellular radio network via an N3IWF gateway. Accordingly, UE 705 may receive or otherwise identify a URSP access policy for UE 705 to adopt that also tells UE 705 whether to preferentially connect via either the cellular radio network or a non-cellular radio network. UE 705 may also determine or otherwise identify a slice treatment for each traffic descriptor, e.g., based at least in part on the URSP access policy, traffic descriptor identifier, traffic descriptor type, etc. Accordingly, UE 705 may use the URSP access policy, the legacy slice treatment (from EPC 715), and/or the slice treatment (from 5GC 710), to determine whether to transfer the connection for each traffic descriptor (e.g., application) from EPC 715 via the EPDG gateway to 5GC 710 or to establish an updated connection with 5GC 715. Accordingly, UE 705 can ensure that each traffic descriptor is given the proper slice treatment and/or connection preference when switching from an EPC 715 connection to a 5GC 710 connection.

Accordingly, and at 735, UE 705 may be configured with the cellular network's URSP policy. That is, UE 705 may receive, from the network via the base station, an access policy (e.g., URSP) of the cellular radio network that identifies an access preference rule for UE 705 to adopt for connections to a core network function (e.g., 5GC 710) of the cellular radio network. The URSP may indicate for UE 705 to preferentially connect to the core network function via a cellular radio network (e.g., prefer a 3GPP access network, such as a 5G NR SA network). Accordingly, the URSP may be installed for UE 705. That is, the network may have downloaded the URSP policy to UE 705. At this point and per the guiding standards, UE 705 is only supposed to refer to URSP for its policies. One of the rules specified in URSP is for each DNN, whether the preferred access is 3GPP (e.g., cellular) or non-3GPP (e.g., Wi-Fi). For example, a URSP rule may look like:

```
Traffic Descriptor : App-Id = APP1
    RouteSelectionDescriptor: DNN=DNN1, Access-Preference=3GPP, S-NSSAI=1
        DNN=DNN1, Access-Preference=Non-3GPP, S-NSSAI=2
    App-Id = App2
    RouteSelectionDescriptor: DNN=DNN1, Access-Preference=Non-3GPP,S-NSSAI=1
        DNN=DNN1, Access-Preference=3GPP, S-NSSAI=2
```

This rule may mean that, both APP1 and APP2 are supposed to be on S-NSSAI1, but first application 725 prefers is cellular preferred and second application 720 is Wi-Fi preferred. That is, the two application or traffic descriptor operating on UE 705 may ask for the same slice treatment, but have different route selection descriptors.

At 740, UE 705 may be located in a Wi-Fi coverage area only, e.g., there is no 5G coverage areas available for UE 705 to connect to. However, at 745, first application 725 (e.g., APP1) may request a connection to modem 730, which requests to establish a connection to EPC 715 via an EPDG legacy gateway and Wi-Fi AP. Since the EPDG legacy gateway belongs to EPC 715, there is no concept of slice treatment. However, for the guiding standards for 5GC 710, EPC 715 may inform UE 705 what S-NSSAI it should store for this connection to EPC 715 via the EPDG legacy gateway so that, if there is a handoff to 5GC 710, UE 705 should request the same S-NSSAI that was signaled to it by EPC 715 via the EPDG legacy gateway. In this example and at 750, EPC 715 assigned S-NSSAI1 to this connection, which may also be referred to as a legacy traffic descriptor and/or slice treatment for this connection.

Accordingly, and at 755, UE 705 may have established a connection to a legacy core network function of the legacy cellular radio network via a legacy gateway. UE 705 may identify the legacy access policy (e.g., ANDSF) that preferentially instructs UE 705 to connect to the legacy core network function via either a 3GPP connection or a non-3GPP connection.

At 760, UE 705 may enter an area with 5G coverage. For example, UE 705 may connect to a 5G NR SA base station and establish a connection with 5GC 710 via the base station. As the URSP access policy gives preference to a 3GPP access network for the DNN1 connection for first application 725, at 765 this may trigger a handover procedure for S-NSSAI1, which is granted by 5GC 710. Accordingly and at 770, modem 730 of UE 705 may tear down the connection for DNN1 with EPC 715.

At this point, first application 725 is connected to 5GC 710 using the 5G NR SA cellular radio network for connection DNN1 and given S-NSSAI1. However, should second application 720 ask modem 730 for a connection, UE 705 would refer to the URSP access policy, which indicates that the first choice for second application 720 is S-NSSAI1 on a Wi-Fi network. Accordingly, UE 705 would initiate a request for a connection on S-NSSAI2. However, the network may reject this connection request because the same DNN1 with slice S-NSSAI1 is already established on 5GC 710 (e.g., by first application 725). Thus, this may prevent UE 705 from establishing a connection for second application 720.

Accordingly, at 775, aspects of the described techniques provide for modem 730 of UE 705 to reevaluate the URSP access policy previously provided. That is, whenever there is a handoff from EPC 715 to 5GC 710, UE 705 may go beyond what the guiding standard states and, instead, may not blindly specify the S-NSSAI that was received during EPDG signaling (e.g., the legacy slice treatment indication received from EPC 715 via the EPDG legacy gateway). Instead, UE 705 may reevaluate the URSP access policy to see whether the S-NSSAI received from EPDG is a valid RSD in URSP, even if it is the lower priority RSD and/or whether it is an allowed S-NSSAI. If not, UE 705 may tear down the call and let the application retry. If it is valid, UE 705 may continue using the current connection. If another application under the same rule requests a call (e.g., to establish a connection), UE 705 may latch that application to the same call (e.g., connection).

In this example, the URSP reevaluation may indicate that S-NSSAI1 is a valid route for first application 725. Accordingly and at 785, modem 730 of UE 705 may maintain the connection on 5GC 710 for first application 725 on DNN1 and given slice S-NSSAI1. At 790, second application 720 may send a call request to modem 730 of UE 705 requesting a new connection. At 795, since the requested slice treatment of S-NSSAI1 is already established on DNN1 for first application 725, modem 730 of UE 705 may latch second application 720 to the connection with 5GC 710 for first application 725. Accordingly, UE 705 may maintain the original connection for DNN1 on S-NSSAI1 for first application 725 and latch the connection on 5GC 710 for DNN1 on S-NSSAI1 for second application 720. This may result in the desired slice treatment/route selection for each application.

Figure 8:
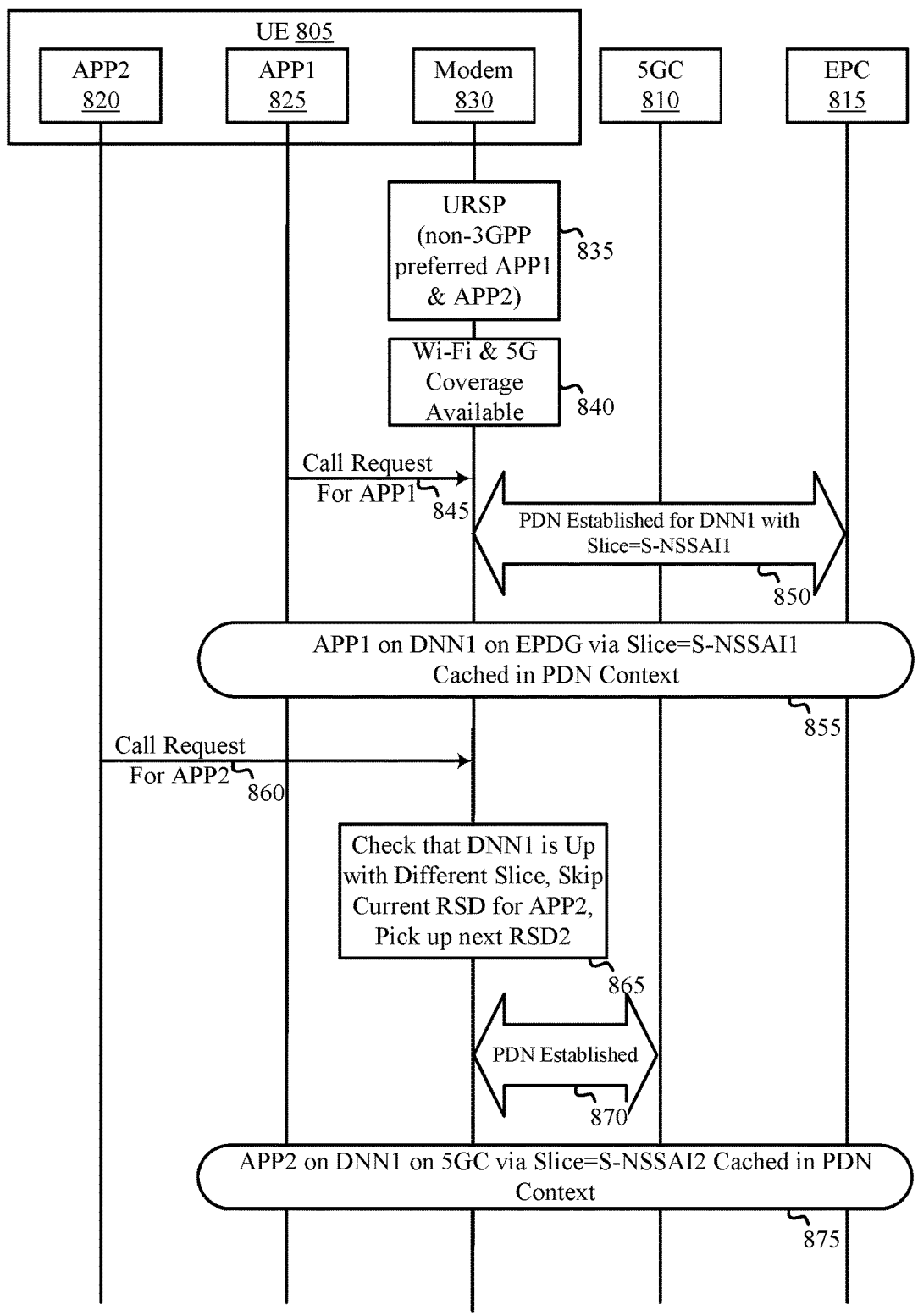
FIG. 8 illustrates an example of a process that supports methods to handle slicing accounting for evolved packet data gateway Wi-Fi access in accordance with aspects of the present disclosure.

FIG. 8 illustrates an example of a process 800 that supports methods to handle slicing accounting for evolved packet data gateway Wi-Fi access in accordance with aspects of the present disclosure. In some examples, process 800 may implement aspects of wireless communications systems 100 and/or 200 and/or processes 300, 400, 500, 600, and/or 700. Aspects of process 800 may be implemented by UE 805, 5GC 810, and/or EPC 815, which may be examples of the corresponding devices described herein. It is to be understood that UE 805 may be connected to 5GC 810 via a 5G NR SA base station and/or via a Wi-Fi AP and N3IWF gateway when UE 805 is connected to a non-3GPP access network, such as a Wi-Fi network. Similarly, UE 805 may be connected to EPC 815 via a Wi-Fi AP and an EPDG legacy gateway when UE 805 is connected to a non-3GPP access network, such as a Wi-Fi network.

In some aspects, UE 805 may include a set of applications, with two applications being shown by way of example only. Generally, each application may refer to any general traffic descriptor. Accordingly, UE 805 may include a first application 825, a second application 820, and a modem 830, which may be examples of the corresponding devices described herein. Modem 830 may monitor, control, or otherwise manage aspects of communications between UE 805 and 5GC 810 and/or EPC 815 (e.g., via one or more base stations, Wi-Fi APs, N3IWF gateways, EPDG legacy gateways, and the like).

As discussed above, aspects of the described techniques may support UE 805 establishing a connection to an EPC 815 legacy core network function of a 4G/5G NR NSA legacy cellular radio network via the EPDG legacy gateway. UE 805 may be configured with a set of traffic descriptors (e.g., UE 805 may have different applications operating on UE 805, such as first application 825 and/or second application 820). For each traffic descriptor (e.g., each application), UE 805 may identify the ANDSF legacy access policy that gives preference to UE 805 to connect via either a cellular radio network (e.g., 3GPP cellular radio network) or a non-cellular radio network (e.g., a non-3GPP radio network), such as a routing selection preference. UE 805 may also identify or otherwise determine a legacy slice treatment associated with each traffic descriptor, e.g., based at least in part on the connection to EPC 815 via the EPDG. UE 805 may establish a connection to a 5GC 810 core network function of a 5G NR SA cellular radio network via an N3IWF gateway. Accordingly, UE 805 may receive or otherwise identify a URSP access policy for UE 805 to adopt that also tells UE 805 whether to preferentially connect via either the cellular radio network or a non-cellular radio network. UE 805 may also determine or otherwise identify a slice treatment for each traffic descriptor, e.g., based at least in part on the URSP access policy, traffic descriptor identifier, traffic descriptor type, etc. Accordingly, UE 805 may use the URSP access policy, the legacy slice treatment (from EPC 815), and/or the slice treatment (from 5GC 810), to determine whether to transfer the connection for each traffic descriptor (e.g., application) from EPC 815 via the EPDG gateway to 5GC 810 or to establish an updated connection with 5GC 815. Accordingly, UE 805 can ensure that each traffic descriptor is given the proper slice treatment and/or connection preference when switching from an EPC 815 connection to a 5GC 810 connection.

Process 800 illustrates an example where two application are supposed to have different slice treatments, but are both non-3GPP access policy preferred. The later coming application (e.g., the last application to send a call request) may not be able to get service because the first application may have already established a connection using the same DNN, but with a different slice treatment under EPDG. Or, on 5GC 810, the application is supposed to get a different slice treatment but ends up getting the same slice treatment.

Accordingly, and at 835, UE 805 may be configured with the cellular network's URSP policy. That is, UE 805 may receive, from the network via the base station, an access policy (e.g., URSP) of the cellular radio network that identifies an access preference rule for UE 805 to adopt for connections to a core network function (e.g., 5GC 810) of the cellular radio network. The URSP may indicate for UE 805 to preferentially connect to the core network function via a cellular radio network (e.g., prefer a 3GPP access network, such as a 5G NR SA network). Accordingly, the URSP may be installed for UE 805. That is, the network may have downloaded the URSP policy to UE 805. At this point and per the guiding standards, UE 805 is only supposed to refer to URSP for its policies. One of the rules specified in URSP is for each DNN, whether the preferred access is 3GPP (e.g., cellular) or non-3GPP (e.g., Wi-Fi). For example, a URSP rule may look like:

```
Traffic Descriptor : App-Id = APP1
    RouteSelectionDescriptor: DNN=DNN1, Access-Preference=Non-3GPP,S-NSSAI=1
        DNN=DNN1, Access-Preference=3GPP, S-NSSAI=1
    App-Id = App2
    RouteSelectionDescriptor: DNN=DNN1, Access-Preference=Non-3GPP,S-NSSAI=2
        DNN=DNN1, Access-Preference=3GPP, S-NSSAI=2
```

This rule may mean that APP1 is supposed to be EPDG preferred when there is a choice between cellular and Wi-Fi network and UE 805 should request slice 1 (e.g., S-NSSAI1) in case of a 5G call. While, for APP2, it prefers EPDG as well, but should use slice S-NSSAI2 in the case of a 5G call. That is, the two applications or traffic descriptors operating on UE 805 may ask for different slice treatments, but have the same route selection descriptors.

At 840, UE 805 may be located in both Wi-Fi and 5G coverage. At 845, first application 825 (e.g., APP1) may request a connection to modem 830, which requests to establish a connection to EPC 815 via an EPDG legacy gateway and Wi-Fi AP. Since the EPDG legacy gateway belongs to EPC 815, there is no concept of slice treatment. However, for the guiding standards for 5GC 810, EPC 815 may inform UE 805 what S-NSSAI it should store for this connection to EPC 815 via the EPDG legacy gateway so that, if there is a handoff to 5GC 810, UE 805 should request the same S-NSSAI that was signaled to it by EPC 815 via the EPDG legacy gateway. In this example and at 850, EPC 815 assigned S-NSSAI1 to this connection, which may also be referred to as a legacy traffic descriptor and/or slice treatment for this connection.

Accordingly, and at 855, UE 805 may have established a connection to a legacy core network function of the legacy cellular radio network via a legacy gateway. UE 805 may identify the legacy access policy (e.g., ANDSF) that preferentially instructs UE 805 to connect to the legacy core network function via either a 3GPP connection or a non-3GPP connection.

However, at 860, second application 820 may send a call request for a data connection. However, this may give rise to at least two issues. In one issue, UE 805 would establish a PDN connection for second application 820 on DNN1 with EPC 815 via the EPDG legacy gateway. However, the network would reject this connection request since DNN1 is already established. In another issue, UE 805 may decide to latch second application 820 onto the DNN1 PDN on S-NSSAI1. However, this approach would end up with both first application 825 and second application 820 being on DNN1 on S-NSSAI1. Second application 820, however, should use S-NSSAI2 per the URSP access policy.

Therefore, and at 865, UE 805 may determine whether the DNN1 connection is already established. That is, even though EPDG is preferred for second application 820, but since there is already a PDN connection up for the same DNN with a different slice, UE 805 may pick RSD2 (e.g., the route selection policy #2 in the URSP for APP2) in this example for second application 820. Accordingly, and at 870, UE 805 may establish a connection with 5GC 810 for second application 820 with slice S-NSSAI2. That is, UE 805 may skip RSD1 (e.g., the non-3GPP connection preferred for APP2 per the URSP) since there is already a PDN connection established for DNN1 (e.g., the same DNN) with a different slice for first application 825. Instead, UE 805 may use RSD2 (e.g., the 3GPP connection preferred for APP2 per the URSP) to establish the PDN connection for second application 820 with 5GC 810.

Accordingly, and at 875, UE 805 may operate with a PDN connection established for second application 820 on DNN1 on 5GC 810 using slice S-NSSAI2 cached in the PDN context. This may allow UE 805 to follow the appropriate slice treatment and route selection preference for both applications.

Figure 9:
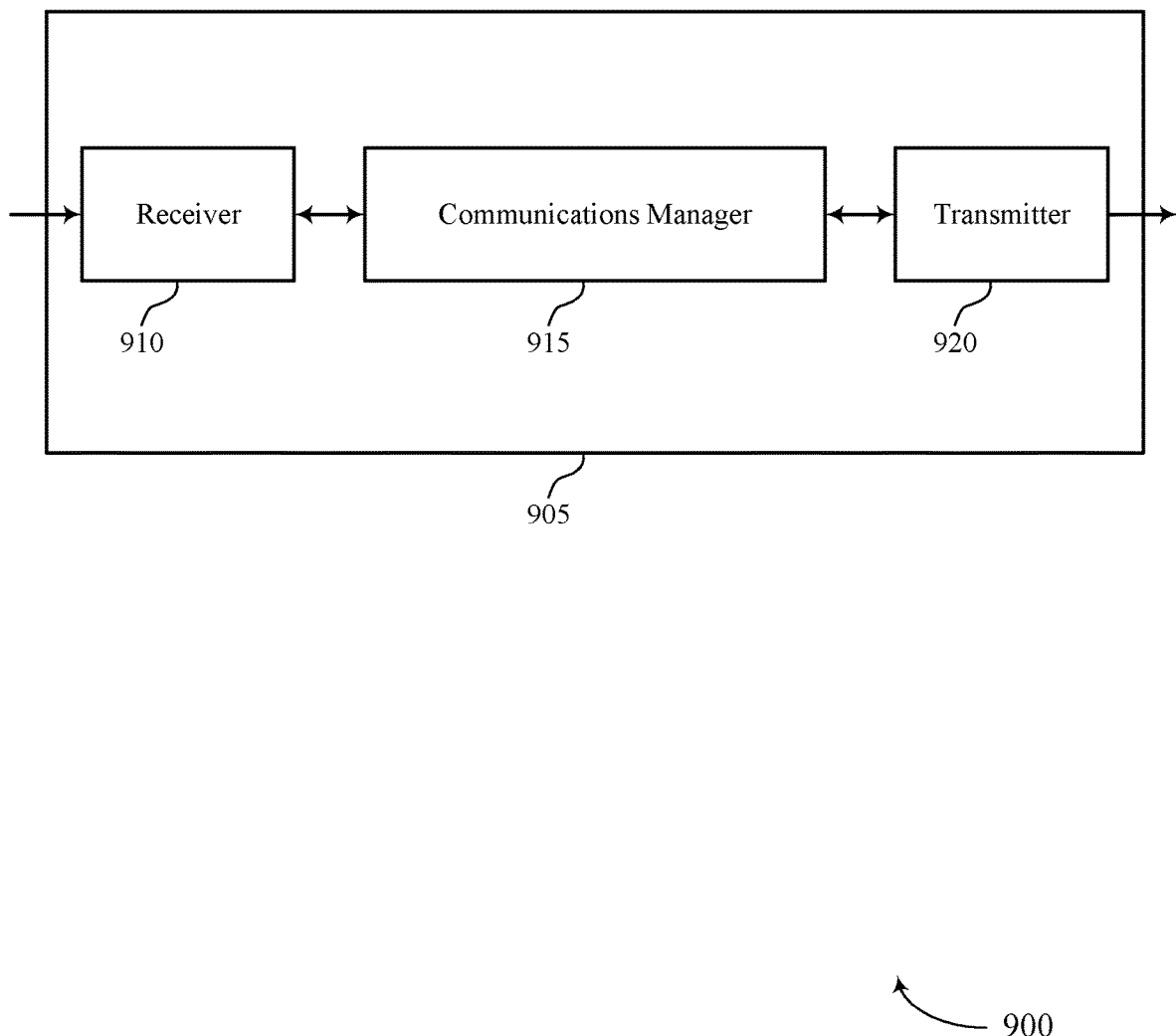
FIGS. 9 and 10 show block diagrams of devices that support methods to handle slicing accounting for evolved packet data gateway Wi-Fi access in accordance with aspects of the present disclosure.

FIG. 9 shows a block diagram 900 of a device 905 that supports methods to handle slicing accounting for evolved packet data gateway Wi-Fi access in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to methods to handle slicing accounting for evolved packet data gateway Wi-Fi access, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a cellular connection with a base station associated with a cellular radio network, establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network, receive an access policy of the cellular radio network identifying an access preference rule for the UE to adopt for connections to a core network function of the cellular radio network, the access preference rule indicating for the UE to preferentially connect to the core network function via a non-cellular radio network, determine that a gateway between the non-cellular radio network and the core network function of the cellular radio network is not configured, and determine that a gateway selection policy of the cellular radio network is not configured.

The communications manager 915 may also establish a cellular connection with a base station associated with a cellular radio network, determine that the non-cellular radio network is available and that the cellular radio network has become unavailable, establish, via the non-cellular radio network, a connection to a legacy core network function of a legacy cellular radio network via a legacy gateway between the legacy core network function and the non-cellular radio network, determine that the cellular radio network has become available to establish a new connection, establish, based at least on the access preference rule, the new connection to the cellular radio network, receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function, identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network, determine that the gateway is not configured, and determine that a gateway selection policy of the cellular radio network is not configured.

The communications manager 915 may also establish a cellular connection with a base station associated with a cellular radio network, determine that the non-cellular radio network is available and that a gateway between the non-cellular radio network and the core network function of the cellular radio network is not configured, establish a connection to a legacy core network function of a legacy cellular radio network via a legacy gateway between the legacy core network function and the non-cellular radio network, maintain, based at least in part on the access preference rule, the connection to the legacy core network function of the legacy radio network via the legacy gateway, receive an access policy of the cellular radio network identifying an access preference rule for the UE to adopt for connections to a core network function of the cellular radio network, the access preference rule indicating for the UE to preferentially connect to the core network function via a non-cellular radio network, identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network, and determine that a gateway selection policy of the cellular radio network is not configured.

The communications manager 915 may also establish a connection to a legacy core network function of a legacy cellular radio network via a legacy gateway between the legacy cellular radio network and a non-cellular radio network, establish a connection to a core network function of a cellular radio network via a gateway between the cellular radio network and the non-cellular radio network, identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor, determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function, and identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
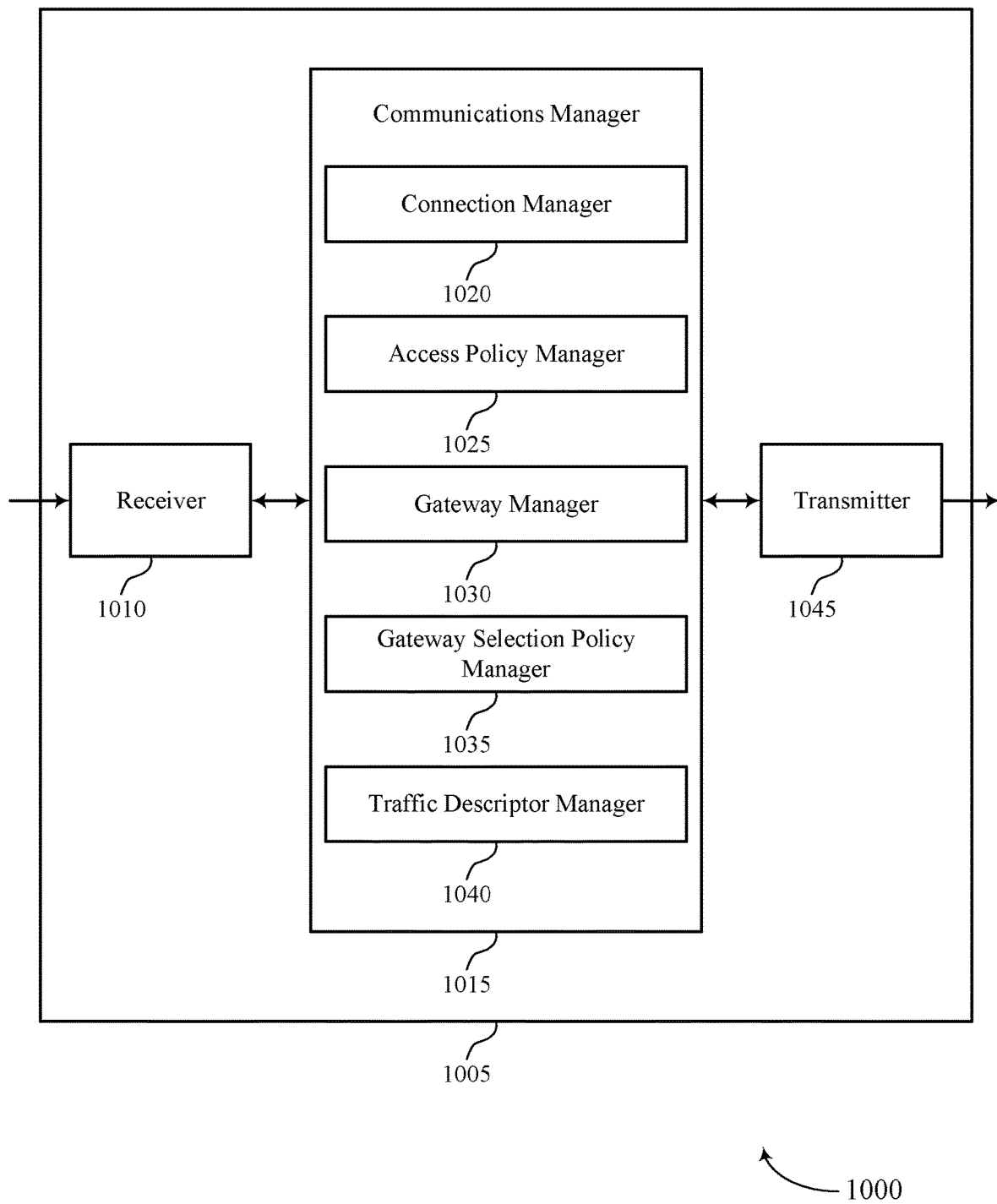

FIG. 10 shows a block diagram 1000 of a device 1005 that supports methods to handle slicing accounting for evolved packet data gateway Wi-Fi access in accordance with aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to methods to handle slicing accounting for evolved packet data gateway Wi-Fi access, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection manager 1020, an access policy manager 1025, a gateway manager 1030, a gateway selection policy manager 1035, and a traffic descriptor manager 1040. The communications manager 1015 may be an example of aspects of the communications manager 1210 described herein.

The connection manager 1020 may establish a cellular connection with a base station associated with a cellular radio network and establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

The access policy manager 1025 may receive an access policy of the cellular radio network identifying an access preference rule for the UE to adopt for connections to a core network function of the cellular radio network, the access preference rule indicating for the UE to preferentially connect to the core network function via a non-cellular radio network.

The gateway manager 1030 may determine that a gateway between the non-cellular radio network and the core network function of the cellular radio network is not configured.

The gateway selection policy manager 1035 may determine that a gateway selection policy of the cellular radio network is not configured.

The connection manager 1020 may establish a cellular connection with a base station associated with a cellular radio network, determine that the non-cellular radio network is available and that the cellular radio network has become unavailable, establish, via the non-cellular radio network, a connection to a legacy core network function of a legacy cellular radio network via a legacy gateway between the legacy core network function and the non-cellular radio network, determine that the cellular radio network has become available to establish a new connection, and establish, based at least on the access preference rule, the new connection to the cellular radio network.

The access policy manager 1025 may receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function and identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network.

The gateway manager 1030 may determine that the gateway is not configured.

The gateway selection policy manager 1035 may determine that a gateway selection policy of the cellular radio network is not configured.

The connection manager 1020 may also establish a cellular connection with a base station associated with a cellular radio network, determine that the non-cellular radio network is available and that a gateway between the non-cellular radio network and the core network function of the cellular radio network is not configured, establish a connection to a legacy core network function of a legacy cellular radio network via a legacy gateway between the legacy core network function and the non-cellular radio network, and maintain, based at least in part on the access preference rule, the connection to the legacy core network function of the legacy radio network via the legacy gateway.

The access policy manager 1025 may also receive an access policy of the cellular radio network identifying an access preference rule for the UE to adopt for connections to a core network function of the cellular radio network, the access preference rule indicating for the UE to preferentially connect to the core network function via a non-cellular radio network and identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network.

The gateway selection policy manager 1035 may determine that a gateway selection policy of the cellular radio network is not configured.

The connection manager 1020 may establish a connection to a legacy core network function of a legacy cellular radio network via a legacy gateway between the legacy cellular radio network and a non-cellular radio network and establish a connection to a core network function of a cellular radio network via a gateway between the cellular radio network and the non-cellular radio network.

The traffic descriptor manager 1040 may identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor and determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

The access policy manager 1025 may identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
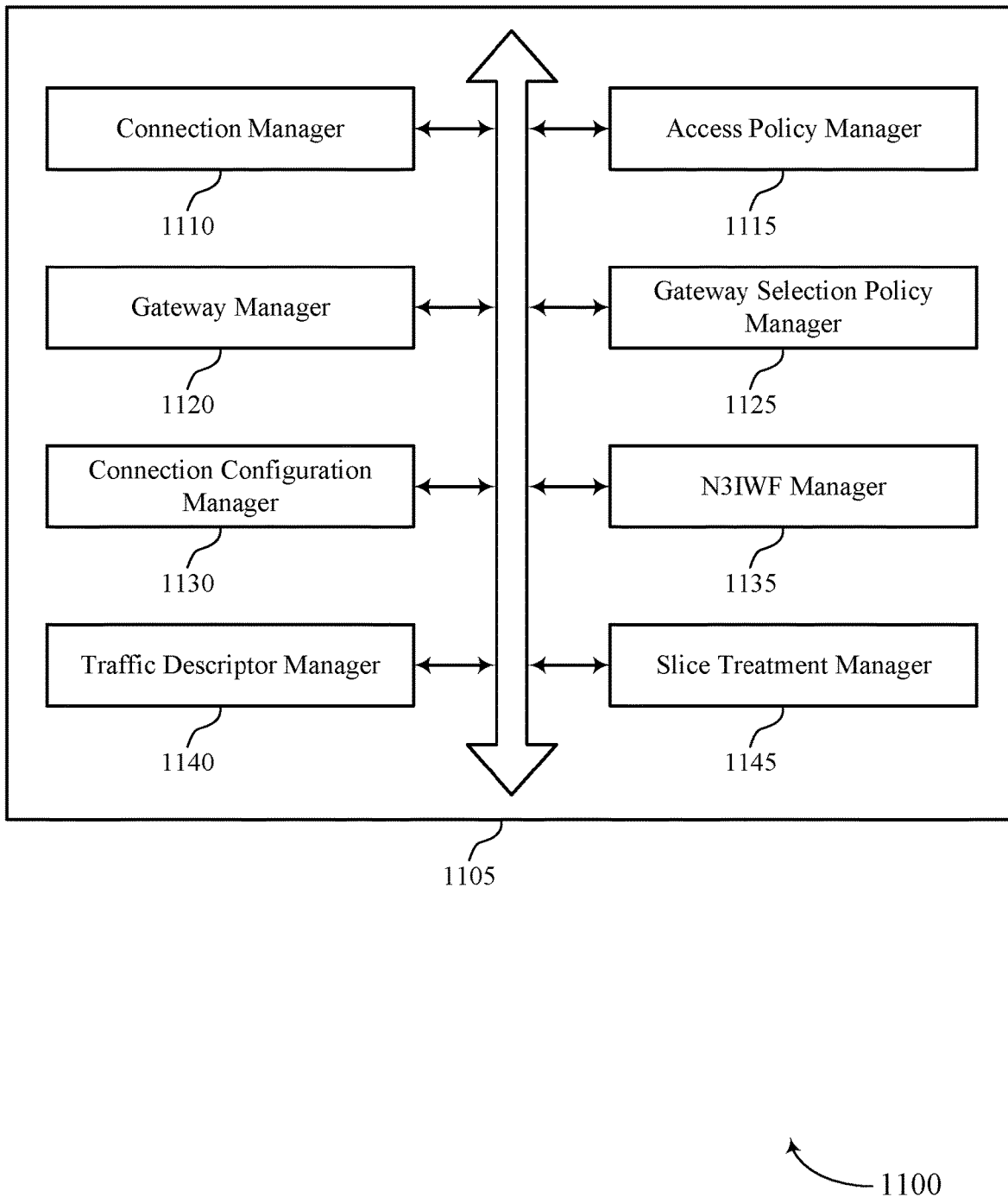
FIG. 11 shows a block diagram of a communications manager that supports methods to handle slicing accounting for evolved packet data gateway Wi-Fi access in accordance with aspects of the present disclosure.

FIG. 11 shows a block diagram 1100 of a communications manager 1105 that supports methods to handle slicing accounting for evolved packet data gateway Wi-Fi access in accordance with aspects of the present disclosure. The communications manager 1105 may be an example of aspects of a communications manager 915, a communications manager 1015, or a communications manager 1210 described herein. The communications manager 1105 may include a connection manager 1110, an access policy manager 1115, a gateway manager 1120, a gateway selection policy manager 1125, a connection configuration manager 1130, a N3IWF manager 1135, a traffic descriptor manager 1140, and a slice treatment manager 1145. Each of these modules may communicate, directly or indirectly, with one another (e.g., via one or more buses).

The connection manager 1110 may establish a cellular connection with a base station associated with a cellular radio network. In some examples, the connection manager 1110 may establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

In some examples, the connection manager 1110 may determine that the non-cellular radio network is available and that the cellular radio network has become unavailable. In some examples, the connection manager 1110 may establish, via the non-cellular radio network, a connection to a legacy core network function of a legacy cellular radio network via a legacy gateway between the legacy core network function and the non-cellular radio network. In some examples, the connection manager 1110 may determine that the cellular radio network has become available to establish a new connection. In some examples, the connection manager 1110 may establish, based at least on the access preference rule, the new connection to the cellular radio network.

In some examples, the connection manager 1110 may determine that the non-cellular radio network is available and that a gateway between the non-cellular radio network and the core network function of the cellular radio network is not configured. In some examples, the connection manager 1110 may establish a connection to a legacy core network function of a legacy cellular radio network via a legacy gateway between the legacy core network function and the non-cellular radio network.

In some examples, the connection manager 1110 may maintain, based at least in part on the access preference rule, the connection to the legacy core network function of the legacy radio network via the legacy gateway. In some examples, the connection manager 1110 may establish a connection to a core network function of a cellular radio network via a gateway between the cellular radio network and the non-cellular radio network.

In some cases, the cellular radio network includes a 5G NR SA cellular radio network. In some cases, the legacy cellular radio network includes at least one of a 4G LTE cellular radio network or a 5G NR NSA cellular radio network. In some cases, the access policy includes a URSP. In some cases, the gateway selection policy includes an ANDSP. In some cases, the gateway includes a N3IWF between the core network function of the 5G NR SA cellular radio network and the non-cellular radio network. In some cases, the legacy gateway includes an EPDG between an EPC core network function of the 4G LTE cellular radio network or the 5G NR NSA cellular radio network and the non-cellular radio network. In some cases, the legacy access policy includes an ANDSF. In some cases, the core network function includes a 5GC.

The access policy manager 1115 may receive an access policy of the cellular radio network identifying an access preference rule for the UE to adopt for connections to a core network function of the cellular radio network, the access preference rule indicating for the UE to preferentially connect to the core network function via a non-cellular radio network.

In some examples, the access policy manager 1115 may receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function.

In some examples, the access policy manager 1115 may identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network.

In some examples, the access policy manager 1115 may receive an access policy of the cellular radio network identifying an access preference rule for the UE to adopt for connections to a core network function of the cellular radio network, the access preference rule indicating for the UE to preferentially connect to the core network function via a non-cellular radio network.

In some examples, the access policy manager 1115 may identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network.

In some examples, the access policy manager 1115 may identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor.

The gateway manager 1120 may determine that a gateway between the non-cellular radio network and the core network function of the cellular radio network is not configured. In some examples, the gateway manager 1120 may determine that the gateway is not configured.

The gateway selection policy manager 1125 may determine that a gateway selection policy of the cellular radio network is not configured. In some examples, the gateway selection policy manager 1125 may determine that a gateway selection policy of the cellular radio network is not configured. In some examples, the gateway selection policy manager 1125 may determine that a gateway selection policy of the cellular radio network is not configured.

The traffic descriptor manager 1140 may identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. In some examples, the traffic descriptor manager 1140 may determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

The connection configuration manager 1130 may receive a configuration for connections via the non-cellular radio network, the configuration configuring the UE to connect to the legacy core network function or to connect to the core network function via the non-cellular radio network. In some examples, the connection configuration manager 1130 may receive a configuration for connections via the non-cellular radio network, the configuration configuring the UE to attempt to connect to the core network function and, if the attempt to connect to the core network function is unsuccessful, to connect to the legacy core network function via the non-cellular radio network.

In some examples, the connection configuration manager 1130 may receive a configuration for connections via the non-cellular radio network, the configuration configuring the UE to connect to the legacy core network function or to connect to the core network function via the non-cellular radio network. In some examples, the connection configuration manager 1130 may receive a configuration for connections via the non-cellular radio network, the configuration configuring the UE to attempt to connect to the core network function and, if the attempt to connect to the core network function is unsuccessful, to connect to the legacy core network function via the non-cellular radio network.

In some examples, the connection configuration manager 1130 may receive a configuration for connections via the non-cellular radio network, the configuration configuring the UE to connect to the legacy core network function or to connect to the core network function via the non-cellular radio network. In some examples, the connection configuration manager 1130 may receive a configuration for connections via the non-cellular radio network, the configuration configuring the UE to attempt to connect to the core network function and, if the attempt to connect to the core network function is unsuccessful, to connect to the legacy core network function via the non-cellular radio network.

The N3IWF manager 1135 may determine, based at least in part on the new connection, that the gateway of the cellular radio network is configured. In some examples, the N3IWF manager 1135 may transfer, based at least in part on the access policy, the connection to the legacy core network function of the legacy cellular radio network via the legacy gateway to the core network function of the cellular radio network via the gateway.

The slice treatment manager 1145 may determine, for at least two traffic descriptors in the set of traffic descriptors, that the legacy traffic descriptor and the traffic descriptor are a same traffic descriptor. In some examples, the slice treatment manager 1145 may transfer the connections for the at least two traffic descriptors to the core network function. In some examples, the slice treatment manager 1145 may determine, for at least two traffic descriptors in the set of traffic descriptors, that the legacy traffic descriptor and the traffic descriptor are different traffic descriptors. In some examples, the slice treatment manager 1145 may update the connection for at least one of the two traffic descriptors with the core network function. In some examples, the slice treatment manager 1145 may determine, for at least two traffic descriptors in the set of traffic descriptors that are associated with a same traffic descriptor, that the legacy access policy and the access policy are a same access policy. In some examples, the slice treatment manager 1145 may determine, for at least two traffic descriptors in the set of traffic descriptors that are associated with a same traffic descriptor, that the legacy access policy and the access policy are a different access policy.

Figure 12:
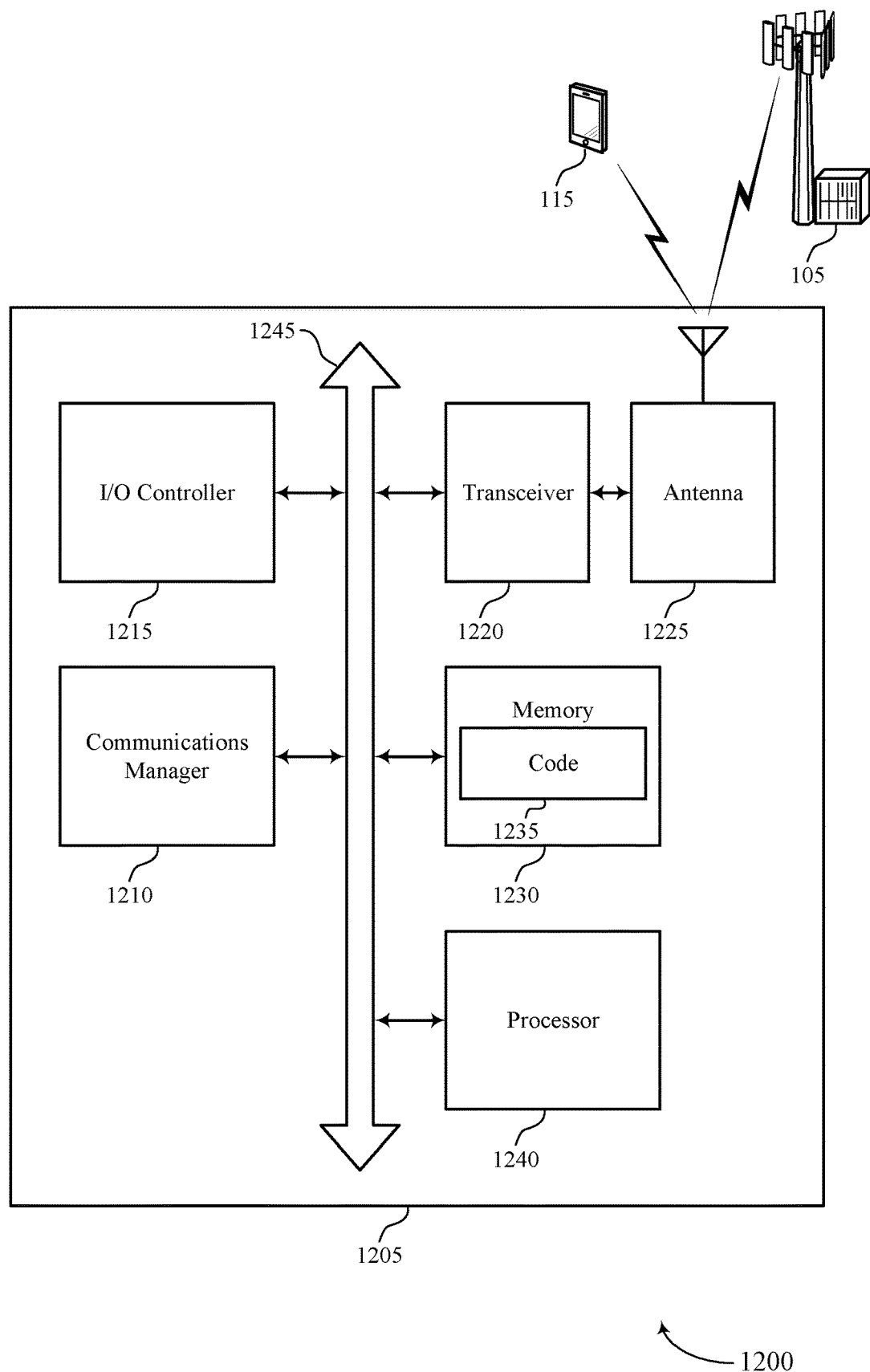
FIG. 12 shows a diagram of a system including a device that supports methods to handle slicing accounting for evolved packet data gateway Wi-Fi access in accordance with aspects of the present disclosure.

FIG. 12 shows a diagram of a system 1200 including a device 1205 that supports methods to handle slicing accounting for evolved packet data gateway Wi-Fi access in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may establish a cellular connection with a base station associated with a cellular radio network, establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network, receive an access policy of the cellular radio network identifying an access preference rule for the UE to adopt for connections to a core network function of the cellular radio network, the access preference rule indicating for the UE to preferentially connect to the core network function via a non-cellular radio network, determine that a gateway between the non-cellular radio network and the core network function of the cellular radio network is not configured, and determine that a gateway selection policy of the cellular radio network is not configured.

The communications manager 1210 may also establish a cellular connection with a base station associated with a cellular radio network, determine that the non-cellular radio network is available and that the cellular radio network has become unavailable, establish, via the non-cellular radio network, a connection to a legacy core network function of a legacy cellular radio network via a legacy gateway between the legacy core network function and the non-cellular radio network, determine that the cellular radio network has become available to establish a new connection, establish, based at least on the access preference rule, the new connection to the cellular radio network, receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function, identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network, determine that the gateway is not configured, and determine that a gateway selection policy of the cellular radio network is not configured.

The communications manager 1210 may also establish a cellular connection with a base station associated with a cellular radio network, determine that the non-cellular radio network is available and that a gateway between the non-cellular radio network and the core network function of the cellular radio network is not configured, establish a connection to a legacy core network function of a legacy cellular radio network via a legacy gateway between the legacy core network function and the non-cellular radio network, maintain, based at least in part on the access preference rule, the connection to the legacy core network function of the legacy radio network via the legacy gateway, receive an access policy of the cellular radio network identifying an access preference rule for the UE to adopt for connections to a core network function of the cellular radio network, the access preference rule indicating for the UE to preferentially connect to the core network function via a non-cellular radio network, identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network, and determine that a gateway selection policy of the cellular radio network is not configured.

The communications manager 1210 may also establish a connection to a legacy core network function of a legacy cellular radio network via a legacy gateway between the legacy cellular radio network and a non-cellular radio network, establish a connection to a core network function of a cellular radio network via a gateway between the cellular radio network and the non-cellular radio network, identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor, determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function, and identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting methods to handle slicing accounting for evolved packet data gateway Wi-Fi access).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
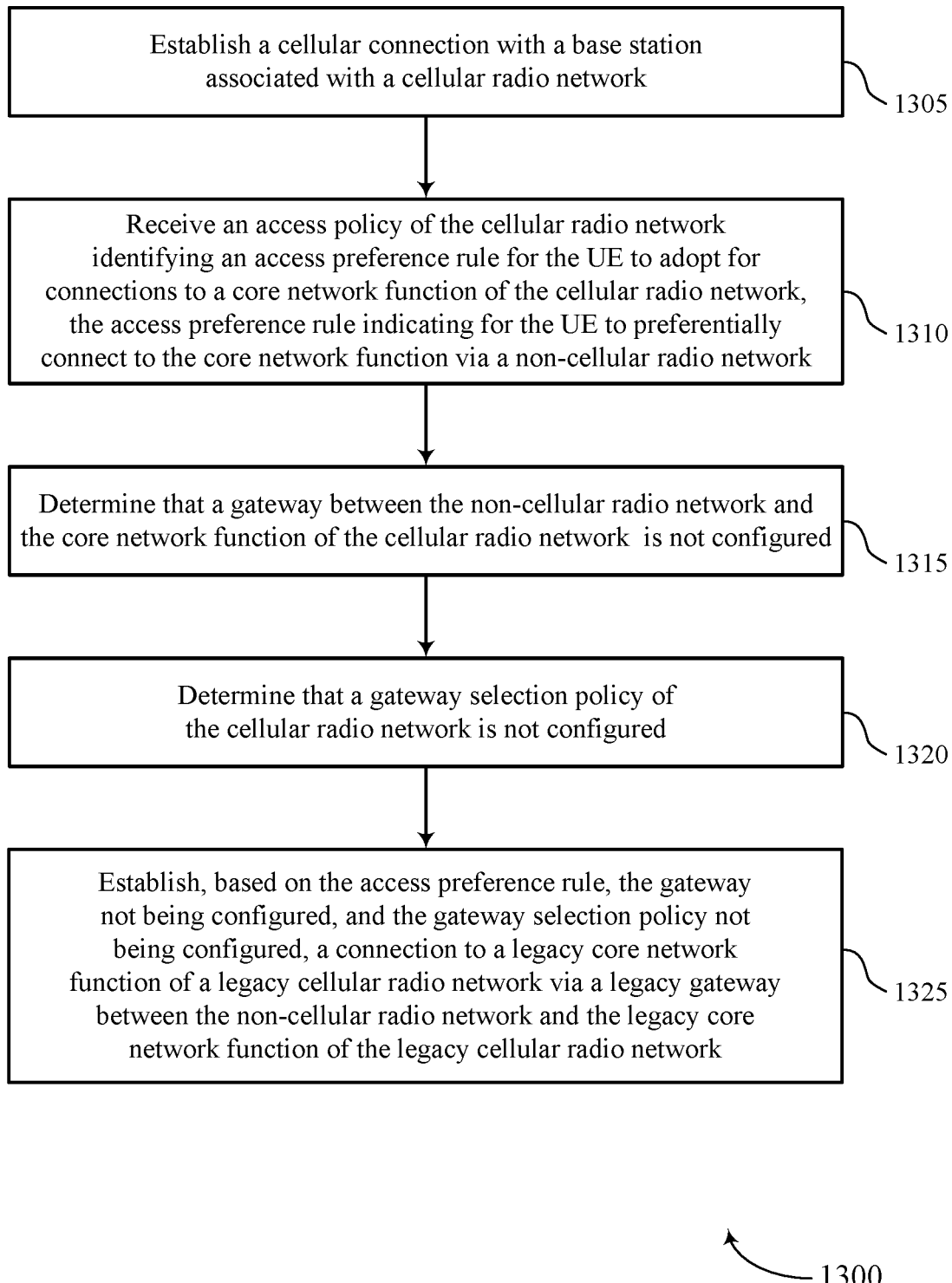
FIGS. 13 through 18 show flowcharts illustrating methods to handle slicing accounting for evolved packet data gateway Wi-Fi access in accordance with aspects of the present disclosure.

FIG. 13 shows a flowchart illustrating a method 1300 that supports methods to handle slicing accounting for evolved packet data gateway Wi-Fi access in accordance with aspects of the present disclosure. The operations of method 1300 may be implemented by a UE 115 or its components as described herein. For example, the operations of method 1300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1305, the UE may establish a cellular connection with a base station associated with a cellular radio network. The operations of 1305 may be performed according to the methods described herein. In some examples, aspects of the operations of 1305 may be performed by a connection manager as described with reference to FIGS. 9 through 12.

At 1310, the UE may receive an access policy of the cellular radio network identifying an access preference rule for the UE to adopt for connections to a core network function of the cellular radio network, the access preference rule indicating for the UE to preferentially connect to the core network function via a non-cellular radio network. The operations of 1310 may be performed according to the methods described herein. In some examples, aspects of the operations of 1310 may be performed by an access policy manager as described with reference to FIGS. 9 through 12.

At 1315, the UE may determine that a gateway between the non-cellular radio network and the core network function of the cellular radio network is not configured. The operations of 1315 may be performed according to the methods described herein. In some examples, aspects of the operations of 1315 may be performed by a gateway manager as described with reference to FIGS. 9 through 12.

At 1320, the UE may determine that a gateway selection policy of the cellular radio network is not configured. The operations of 1320 may be performed according to the methods described herein. In some examples, aspects of the operations of 1320 may be performed by a gateway selection policy manager as described with reference to FIGS. 9 through 12.

At 1325, the UE may establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network. The operations of 1325 may be performed according to the methods described herein. In some examples, aspects of the operations of 1325 may be performed by a connection manager as described with reference to FIGS. 9 through 12.

Figure 14:
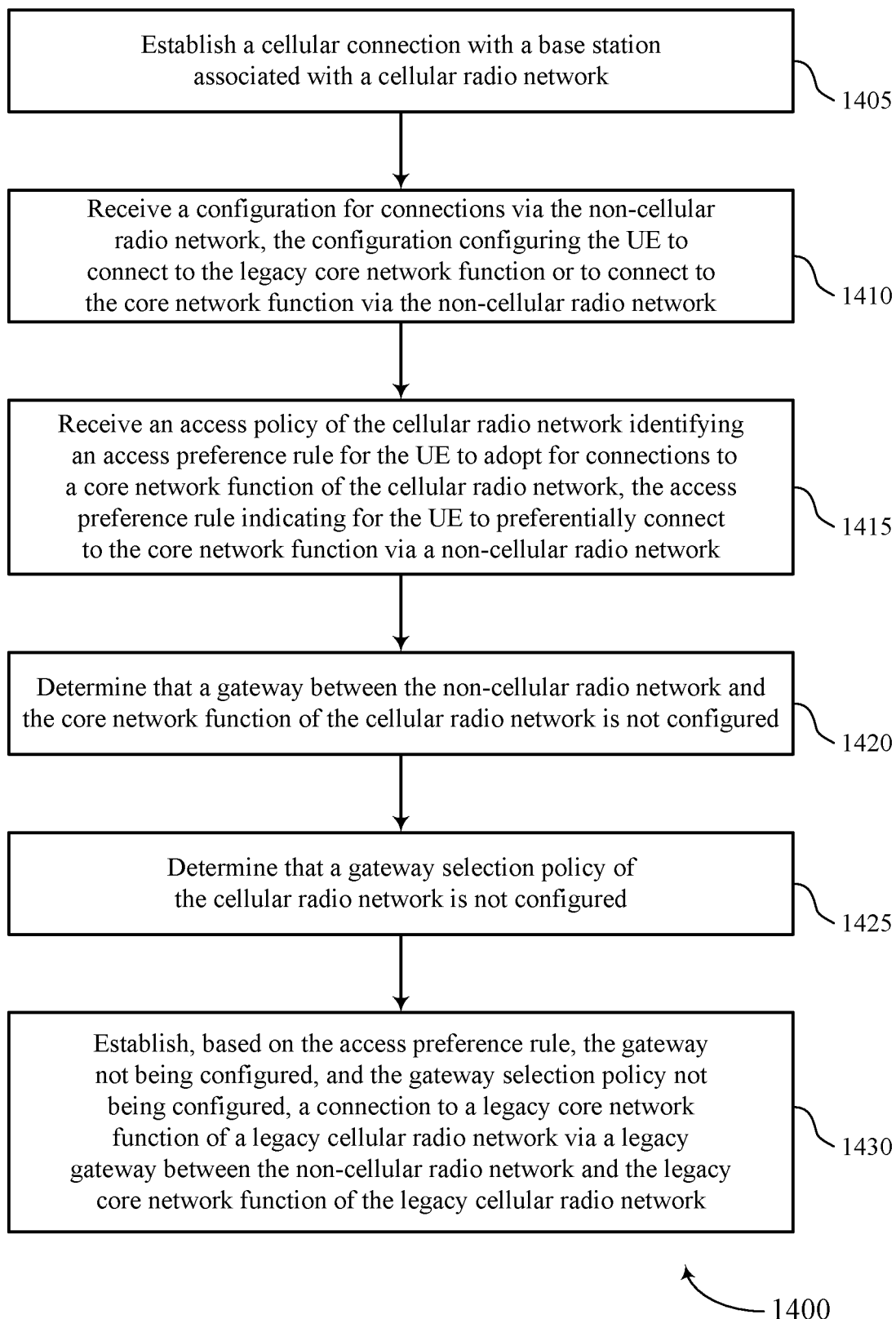

FIG. 14 shows a flowchart illustrating a method 1400 that supports methods to handle slicing accounting for evolved packet data gateway Wi-Fi access in accordance with aspects of the present disclosure. The operations of method 1400 may be implemented by a UE 115 or its components as described herein. For example, the operations of method 1400 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1405, the UE may establish a cellular connection with a base station associated with a cellular radio network. The operations of 1405 may be performed according to the methods described herein. In some examples, aspects of the operations of 1405 may be performed by a connection manager as described with reference to FIGS. 9 through 12.

At 1410, the UE may receive a configuration for connections via the non-cellular radio network, the configuration configuring the UE to connect to the legacy core network function or to connect to the core network function via the non-cellular radio network. The operations of 1410 may be performed according to the methods described herein. In some examples, aspects of the operations of 1410 may be performed by a connection configuration manager as described with reference to FIGS. 9 through 12.

At 1415, the UE may receive an access policy of the cellular radio network identifying an access preference rule for the UE to adopt for connections to a core network function of the cellular radio network, the access preference rule indicating for the UE to preferentially connect to the core network function via a non-cellular radio network. The operations of 1415 may be performed according to the methods described herein. In some examples, aspects of the operations of 1415 may be performed by an access policy manager as described with reference to FIGS. 9 through 12.

At 1420, the UE may determine that a gateway between the non-cellular radio network and the core network function of the cellular radio network is not configured. The operations of 1420 may be performed according to the methods described herein. In some examples, aspects of the operations of 1420 may be performed by a gateway manager as described with reference to FIGS. 9 through 12.

At 1425, the UE may determine that a gateway selection policy of the cellular radio network is not configured. The operations of 1425 may be performed according to the methods described herein. In some examples, aspects of the operations of 1425 may be performed by a gateway selection policy manager as described with reference to FIGS. 9 through 12.

At 1430, the UE may establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network. The operations of 1430 may be performed according to the methods described herein. In some examples, aspects of the operations of 1430 may be performed by a connection manager as described with reference to FIGS. 9 through 12.

Figure 15:
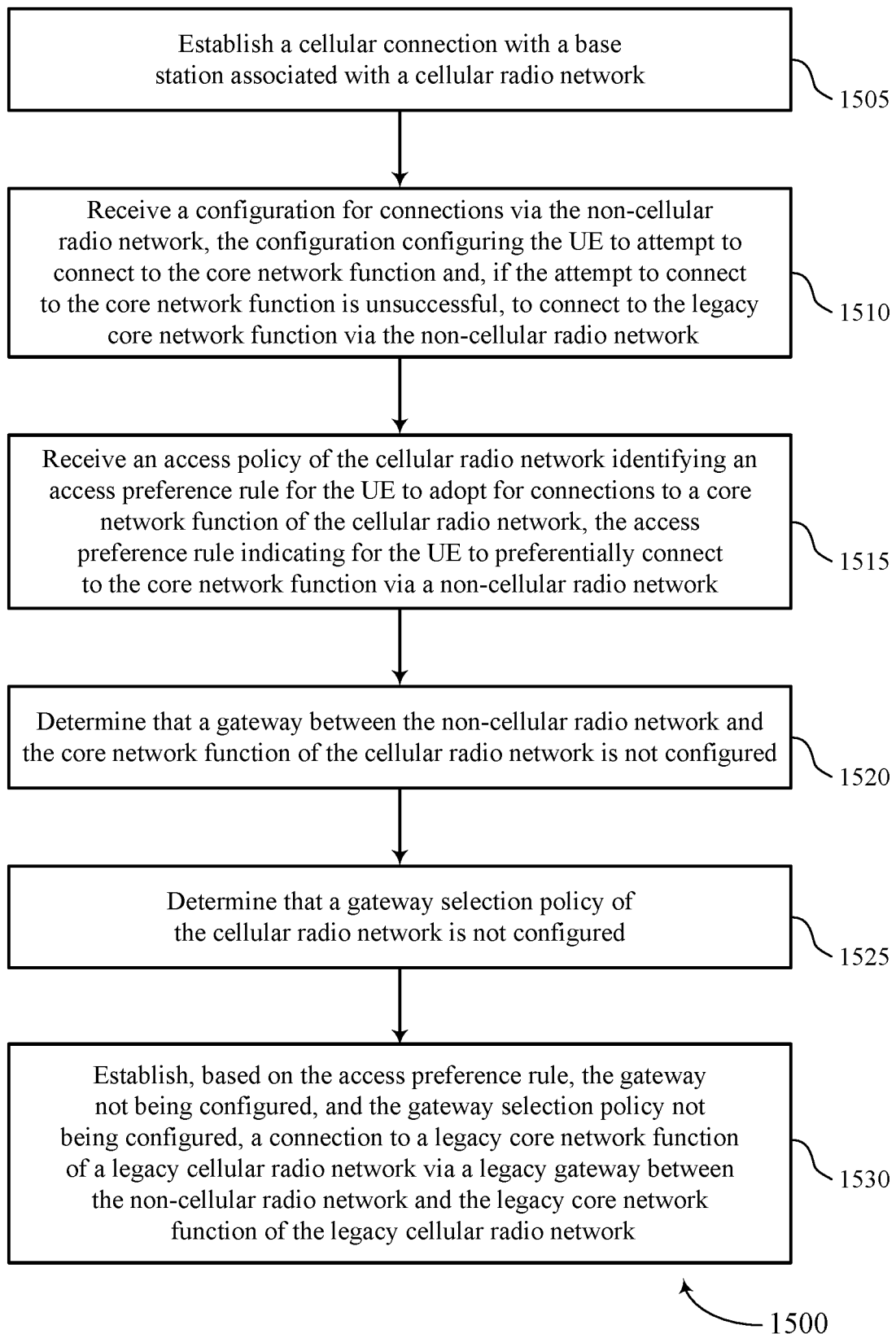

FIG. 15 shows a flowchart illustrating a method 1500 that supports methods to handle slicing accounting for evolved packet data gateway Wi-Fi access in accordance with aspects of the present disclosure. The operations of method 1500 may be implemented by a UE 115 or its components as described herein. For example, the operations of method 1500 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1505, the UE may establish a cellular connection with a base station associated with a cellular radio network. The operations of 1505 may be performed according to the methods described herein. In some examples, aspects of the operations of 1505 may be performed by a connection manager as described with reference to FIGS. 9 through 12.

At 1510, the UE may receive a configuration for connections via the non-cellular radio network, the configuration configuring the UE to attempt to connect to the core network function and, if the attempt to connect to the core network function is unsuccessful, to connect to the legacy core network function via the non-cellular radio network. The operations of 1510 may be performed according to the methods described herein. In some examples, aspects of the operations of 1510 may be performed by a connection configuration manager as described with reference to FIGS. 9 through 12.

At 1515, the UE may receive an access policy of the cellular radio network identifying an access preference rule for the UE to adopt for connections to a core network function of the cellular radio network, the access preference rule indicating for the UE to preferentially connect to the core network function via a non-cellular radio network. The operations of 1515 may be performed according to the methods described herein. In some examples, aspects of the operations of 1515 may be performed by an access policy manager as described with reference to FIGS. 9 through 12.

At 1520, the UE may determine that a gateway between the non-cellular radio network and the core network function of the cellular radio network is not configured. The operations of 1520 may be performed according to the methods described herein. In some examples, aspects of the operations of 1520 may be performed by a gateway manager as described with reference to FIGS. 9 through 12.

At 1525, the UE may determine that a gateway selection policy of the cellular radio network is not configured. The operations of 1525 may be performed according to the methods described herein. In some examples, aspects of the operations of 1525 may be performed by a gateway selection policy manager as described with reference to FIGS. 9 through 12.

At 1530, the UE may establish, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network. The operations of 1530 may be performed according to the methods described herein. In some examples, aspects of the operations of 1530 may be performed by a connection manager as described with reference to FIGS. 9 through 12.

Figure 16:
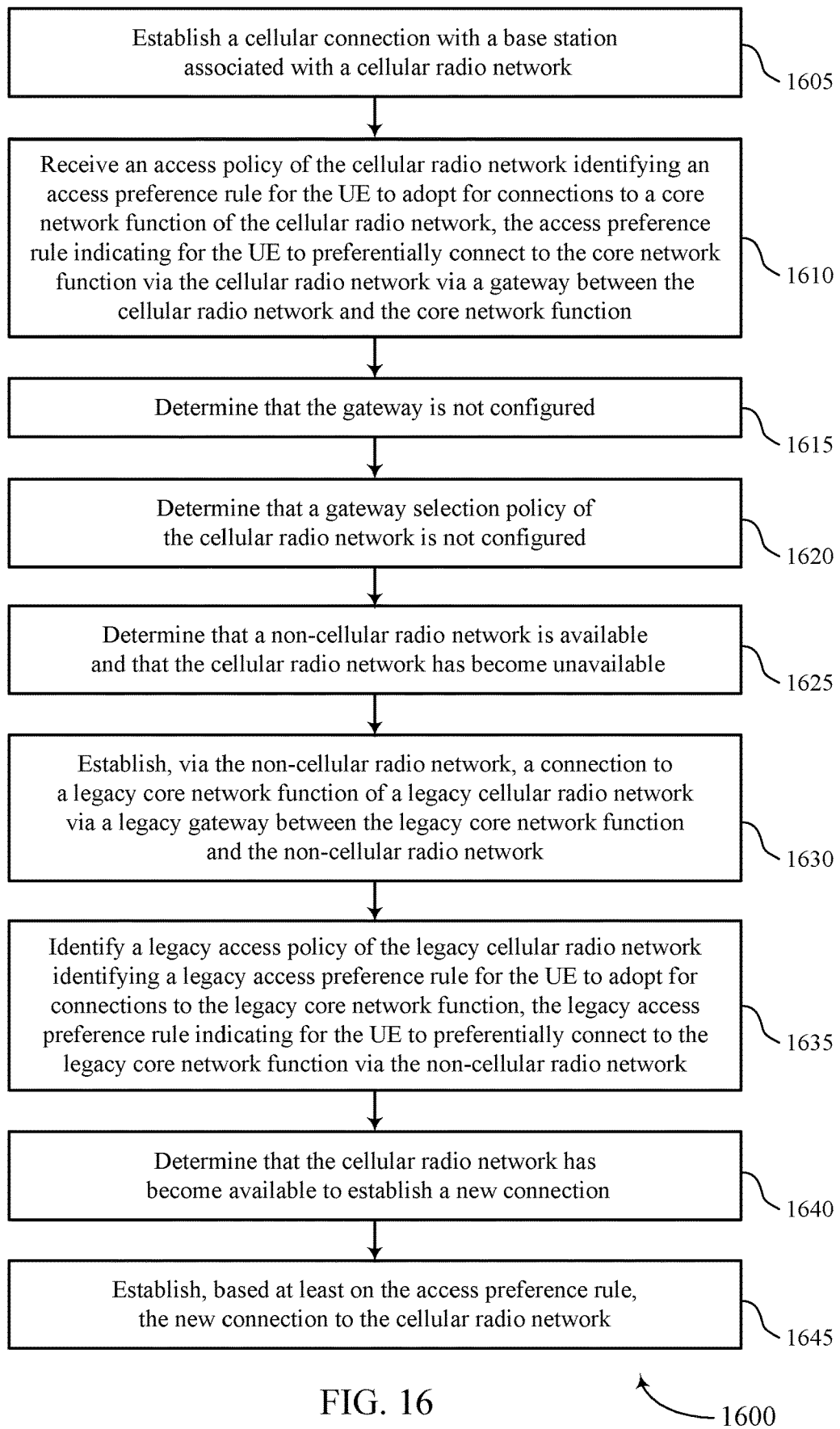

FIG. 16 shows a flowchart illustrating a method 1600 that supports methods to handle slicing accounting for evolved packet data gateway Wi-Fi access in accordance with aspects of the present disclosure. The operations of method 1600 may be implemented by a UE 115 or its components as described herein. For example, the operations of method 1600 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1605, the UE may establish a cellular connection with a base station associated with a cellular radio network. The operations of 1605 may be performed according to the methods described herein. In some examples, aspects of the operations of 1605 may be performed by a connection manager as described with reference to FIGS. 9 through 12.

At 1610, the UE may receive an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function. The operations of 1610 may be performed according to the methods described herein. In some examples, aspects of the operations of 1610 may be performed by an access policy manager as described with reference to FIGS. 9 through 12.

At 1615, the UE may determine that the gateway is not configured. The operations of 1615 may be performed according to the methods described herein. In some examples, aspects of the operations of 1615 may be performed by a gateway manager as described with reference to FIGS. 9 through 12.

At 1620, the UE may determine that a gateway selection policy of the cellular radio network is not configured. The operations of 1620 may be performed according to the methods described herein. In some examples, aspects of the operations of 1620 may be performed by a gateway selection policy manager as described with reference to FIGS. 9 through 12.

At 1625, the UE may determine that the non-cellular radio network is available and that the cellular radio network has become unavailable. The operations of 1625 may be performed according to the methods described herein. In some examples, aspects of the operations of 1625 may be performed by a connection manager as described with reference to FIGS. 9 through 12.

At 1630, the UE may establish, via the non-cellular radio network, a connection to a legacy core network function of a legacy cellular radio network via a legacy gateway between the legacy core network function and the non-cellular radio network. The operations of 1630 may be performed according to the methods described herein. In some examples, aspects of the operations of 1630 may be performed by a connection manager as described with reference to FIGS. 9 through 12.

At 1635, the UE may identify a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network. The operations of 1635 may be performed according to the methods described herein. In some examples, aspects of the operations of 1635 may be performed by an access policy manager as described with reference to FIGS. 9 through 12.

At 1640, the UE may determine that the cellular radio network has become available to establish a new connection. The operations of 1640 may be performed according to the methods described herein. In some examples, aspects of the operations of 1640 may be performed by a connection manager as described with reference to FIGS. 9 through 12.

At 1645, the UE may establish, based at least on the access preference rule, the new connection to the cellular radio network. The operations of 1645 may be performed according to the methods described herein. In some examples, aspects of the operations of 1645 may be performed by a connection manager as described with reference to FIGS. 9 through 12.

Figure 17:
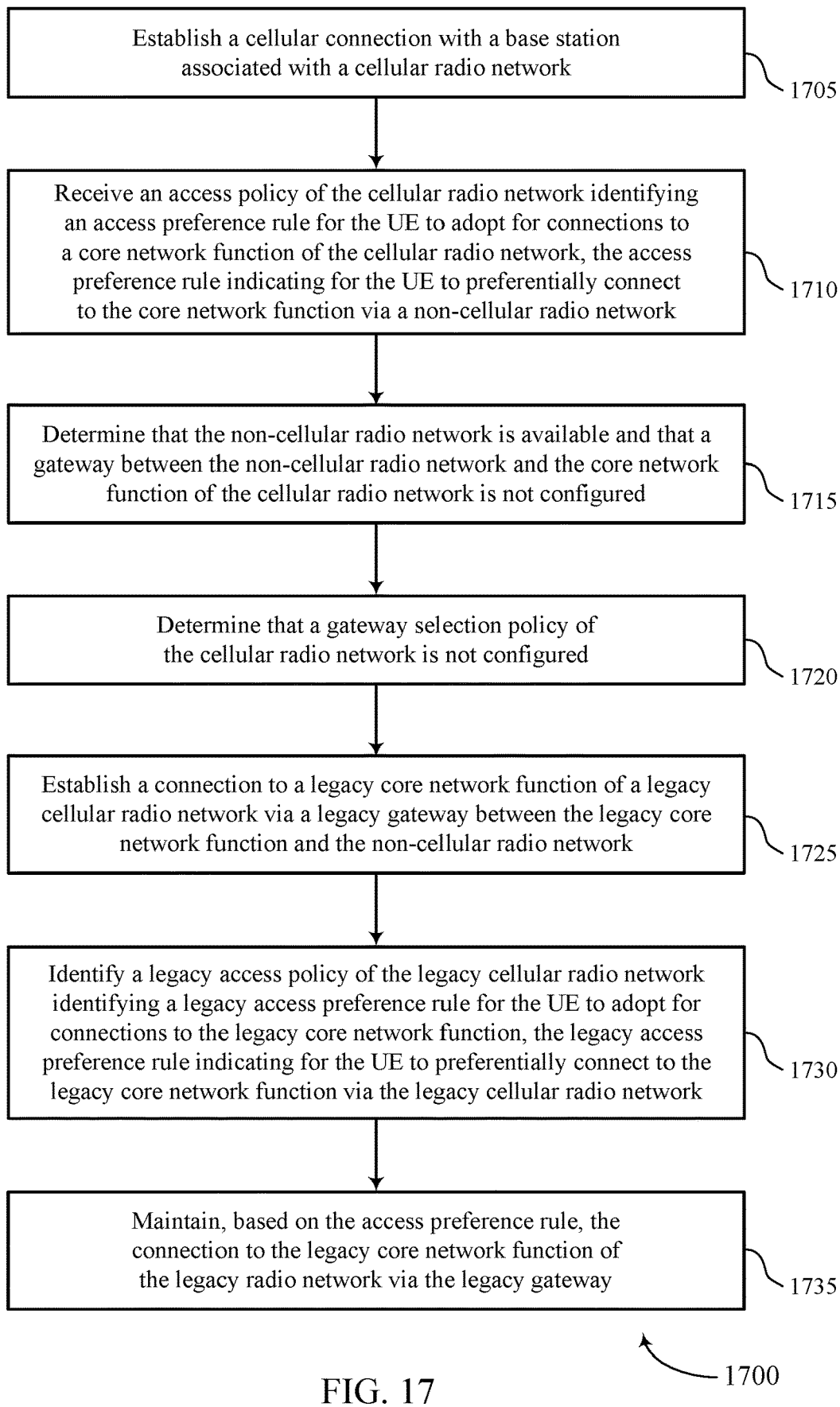

FIG. 17 shows a flowchart illustrating a method 1700 that supports methods to handle slicing accounting for evolved packet data gateway Wi-Fi access in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may establish a cellular connection with a base station associated with a cellular radio network. The operations of 1705 may be performed according to the methods described herein. In some examples, aspects of the operations of 1705 may be performed by a connection manager as described with reference to FIGS. 9 through 12.

At 1710, the UE may receive an access policy of the cellular radio network identifying an access preference rule for the UE to adopt for connections to a core network function of the cellular radio network, the access preference rule indicating for the UE to preferentially connect to the core network function via a non-cellular radio network. The operations of 1710 may be performed according to the methods described herein. In some examples, aspects of the operations of 1710 may be performed by an access policy manager as described with reference to FIGS. 9 through 12.

At 1715, the UE may determine that the non-cellular radio network is available and that a gateway between the non-cellular radio network and the core network function of the cellular radio network is not configured. The operations of 1715 may be performed according to the methods described herein. In some examples, aspects of the operations of 1715 may be performed by a connection manager as described with reference to FIGS. 9 through 12.

At 1720, the UE may determine that a gateway selection policy of the cellular radio network is not configured. The operations of 1720 may be performed according to the methods described herein. In some examples, aspects of the operations of 1720 may be performed by a gateway selection policy manager as described with reference to FIGS. 9 through 12.

At 1725, the UE may establish a connection to a legacy core network function of a legacy cellular radio network via a legacy gateway between the legacy core network function and the non-cellular radio network. The operations of 1725 may be performed according to the methods described herein. In some examples, aspects of the operations of 1725 may be performed by a connection manager as described with reference to FIGS. 9 through 12.

At 1730, the UE may identify a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network. The operations of 1730 may be performed according to the methods described herein. In some examples, aspects of the operations of 1730 may be performed by an access policy manager as described with reference to FIGS. 9 through 12.

At 1735, the UE may maintain, based at least in part on the access preference rule, the connection to the legacy core network function of the legacy radio network via the legacy gateway. The operations of 1735 may be performed according to the methods described herein. In some examples, aspects of the operations of 1735 may be performed by a connection manager as described with reference to FIGS. 9 through 12.

Figure 18:
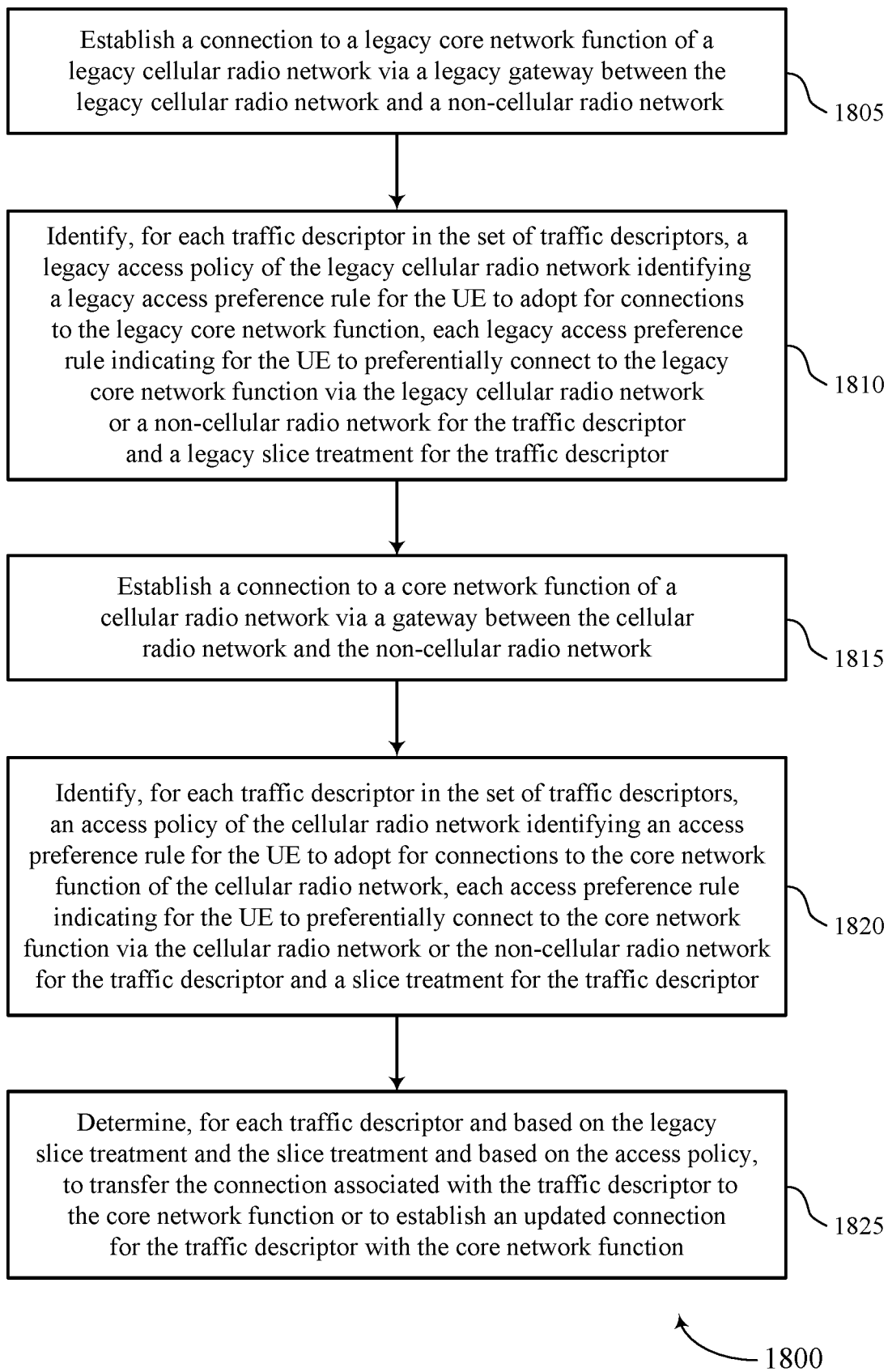

FIG. 18 shows a flowchart illustrating a method 1800 that supports methods to handle slicing accounting for evolved packet data gateway Wi-Fi access in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may establish a connection to a legacy core network function of a legacy cellular radio network via a legacy gateway between the legacy cellular radio network and a non-cellular radio network. The operations of 1805 may be performed according to the methods described herein. In some examples, aspects of the operations of 1805 may be performed by a connection manager as described with reference to FIGS. 9 through 12.

At 1810, the UE may identify, for each traffic descriptor in the set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor. The operations of 1810 may be performed according to the methods described herein. In some examples, aspects of the operations of 1810 may be performed by a traffic descriptor manager as described with reference to FIGS. 9 through 12.

At 1815, the UE may establish a connection to a core network function of a cellular radio network via a gateway between the cellular radio network and the non-cellular radio network. The operations of 1815 may be performed according to the methods described herein. In some examples, aspects of the operations of 1815 may be performed by a connection manager as described with reference to FIGS. 9 through 12.

At 1820, the UE may identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor. The operations of 1820 may be performed according to the methods described herein. In some examples, aspects of the operations of 1820 may be performed by an access policy manager as described with reference to FIGS. 9 through 12.

At 1825, the UE may determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function. The operations of 1825 may be performed according to the methods described herein. In some examples, aspects of the operations of 1825 may be performed by a traffic descriptor manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: establishing a cellular connection with a base station associated with a cellular radio network; receiving an access policy of the cellular radio network identifying an access preference rule for the UE to adopt for connections to a core network function of the cellular radio network, the access preference rule indicating for the UE to preferentially connect to the core network function via a non-cellular radio network; determining that a gateway between the non-cellular radio network and the core network function of the cellular radio network is not configured; determining that a gateway selection policy of the cellular radio network is not configured; and establishing, based at least in part on the access preference rule, the gateway not being configured, and the gateway selection policy not being configured, a connection to a legacy core network function of a legacy cellular radio network via a legacy gateway between the non-cellular radio network and the legacy core network function of the legacy cellular radio network.

Aspect 2: The method of aspect 1, further comprising: receiving a configuration for connections via the non-cellular radio network, the configuration configuring the UE to connect to the legacy core network function or to connect to the core network function via the non-cellular radio network.

Aspect 3: The method of any of aspects 1 through 2, further comprising: receiving a configuration for connections via the non-cellular radio network, the configuration configuring the UE to attempt to connect to the core network function and, if the attempt to connect to the core network function is unsuccessful, to connect to the legacy core network function via the non-cellular radio network.

Aspect 4: The method of any of aspects 1 through 3, wherein the cellular radio network comprises a fifth generation (5G) new radio (NR) stand alone (SA) cellular radio network; the legacy cellular radio network comprises at least one of a fourth generation (4G) long term evolution (LTE) cellular radio network or a 5G NR non-stand alone (NSA) cellular radio network; the access policy comprises a UE route selection policy (URSP); the gateway selection policy comprises an access network discovery selection policy (ANDSP); the gateway comprises a non-third generation partnership project (3GPP) interworking function (N3IWF) between the core network function of the 5G NR SA cellular radio network and the non-cellular radio network; and the legacy gateway comprises an evolved packet data gateway (EPDG) between an evolved packet core (EPC) core network function of the 4G LTE cellular radio network or the 5G NR NSA cellular radio network and the non-cellular radio network.

Aspect 5: A method for wireless communication at a UE, comprising: establishing a cellular connection with a base station associated with a cellular radio network; receiving an access policy of the cellular radio network identifying an access preference rule for the UE to adopt for connections to a core network function of the cellular radio network, the access preference rule indicating for the UE to preferentially connect to the core network function via the cellular radio network via a gateway between the cellular radio network and the core network function; determining that the gateway is not configured; determining that a gateway selection policy of the cellular radio network is not configured; determining that a non-cellular radio network is available and that the cellular radio network has become unavailable; establishing, via the non-cellular radio network, a connection to a legacy core network function of a legacy cellular radio network via a legacy gateway between the legacy core network function and the non-cellular radio network; identifying a legacy access policy of the legacy cellular radio network identifying a legacy access preference rule for the UE to adopt for connections to the legacy core network function, the legacy access preference rule indicating for the UE to preferentially connect to the legacy core network function via the non-cellular radio network; determining that the cellular radio network has become available to establish a new connection; and establishing, based at least on the access preference rule, the new connection to the cellular radio network.

Aspect 6: The method of aspect 5, further comprising: determining, based at least in part on the new connection, that the gateway of the cellular radio network is configured; and transferring, based at least in part on the access policy, the connection to the legacy core network function of the legacy cellular radio network via the legacy gateway to the core network function of the cellular radio network via the gateway.

Aspect 7: The method of any of aspects 5 through 6, further comprising: receiving a configuration for connections via the non-cellular radio network, the configuration configuring the UE to connect to the legacy core network function or to connect to the core network function via the non-cellular radio network.

Aspect 8: The method of any of aspects 5 through 7, further comprising: receiving a configuration for connections via the non-cellular radio network, the configuration configuring the UE to attempt to connect to the core network function and, if the attempt to connect to the core network function is unsuccessful, to connect to the legacy core network function via the non-cellular radio network.

Aspect 9: The method of any of aspects 5 through 8, wherein the cellular radio network comprises a fifth generation (5G) new radio (NR) stand alone (SA) cellular radio network; the legacy cellular radio network comprises at least one of a fourth generation (4G) long term evolution (LTE) cellular radio network or a 5G NR non-stand alone (NSA) cellular radio network; the access policy comprises a UE route selection policy (URSP); the gateway selection policy comprises an access network discovery selection policy (ANDSP); the legacy access policy comprises an access network discovery and selection function (ANDSF); the gateway comprises a non-third generation partnership project (3GPP) interworking function (N3IWF) between the core network function of the 5G NR SA cellular radio network and the non-cellular radio network; and the legacy gateway comprises an evolved packet data gateway (EPDG) between an evolved packet core (EPC) core network function of the 4G LTE cellular radio network or the 5G NR NSA cellular radio network and the non-cellular radio network.

Aspect 10: A method for wireless communication at a UE, comprising: establishing a cellular connection with a base station associated with a cellular radio network; receiving an access policy of the cellular radio network identifying an access preference rule for the UE to adopt for connections to a core network function of the cellular radio network, the access preference rule indicating for the UE to preferentially connect to the core network function via a non-cellular radio network; determining that the non-cellular radio network is available and that a gateway between the non-cellular radio network and the core network function of the cellular radio network is not configured; determining that a gateway selection policy of the cellular radio network is not configured; establishing a connection to a legacy core network function of a legacy cellular radio network via a legacy gateway between the legacy core network function and the non-cellular radio network; identifying a legacy access policy of the legacy cellular radio network identifying a legacy access preference rule for the UE to adopt for connections to the legacy core network function, the legacy access preference rule indicating for the UE to preferentially connect to the legacy core network function via the legacy cellular radio network; and maintaining, based at least in part on the access preference rule, the connection to the legacy core network function of the legacy radio network via the legacy gateway.

Aspect 11: The method of aspect 10, further comprising: receiving a configuration for connections via the non-cellular radio network, the configuration configuring the UE to connect to the legacy core network function or to connect to the core network function via the non-cellular radio network.

Aspect 12: The method of any of aspects 10 through 11, further comprising: receiving a configuration for connections via the non-cellular radio network, the configuration configuring the UE to attempt to connect to the core network function and, if the attempt to connect to the core network function is unsuccessful, to connect to the legacy core network function via the non-cellular radio network.

Aspect 13: The method of any of aspects 10 through 12, wherein the cellular radio network comprises a fifth generation (5G) new radio (NR) stand alone (SA) cellular radio network; the access policy comprises a UE route selection policy (URSP); the gateway selection policy comprises an access network discovery selection policy (ANDSP); the legacy access policy comprises an access network discovery and selection function (ANDSF); the gateway comprises a non-third generation partnership project (3GPP) interworking function (N3IWF) between the core network function of the 5G NR SA cellular radio network and the non-cellular radio network; and the legacy gateway comprises an evolved packet data gateway (EPDG) to an evolved packet core (EPC) core network function of the 4G LTE cellular radio network or the 5G NR NSA cellular radio network and the non-cellular radio network.

Aspect 14: A method for wireless communications at a UE, comprising: establishing a connection to a legacy core network function of a legacy cellular radio network via a legacy gateway between the legacy cellular radio network and a non-cellular radio network; identifying, for each traffic descriptor in a set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor; establishing a connection to a core network function of a cellular radio network via a gateway between the cellular radio network and the non-cellular radio network; identifying, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor; and determining, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

Aspect 15: The method of aspect 14, further comprising: determining, for at least two traffic descriptors in the set of traffic descriptors, that the legacy traffic descriptor and the traffic descriptor are a same traffic descriptor; and transferring the connections for the at least two traffic descriptors to the core network function.

Aspect 16: The method of any of aspects 14 through 15, further comprising: determining, for at least two traffic descriptors in the set of traffic descriptors, that the legacy traffic descriptor and the traffic descriptor are different traffic descriptors; and updating the connection for at least one of the two traffic descriptors with the core network function.

Aspect 17: The method of any of aspects 14 through 16, further comprising: determining, for at least two traffic descriptors in the set of traffic descriptors that are associated with a same traffic descriptor, that the legacy access policy and the access policy are a same access policy; and transferring the connections for the at least two traffic descriptors to the core network function.

Aspect 18: The method of any of aspects 14 through 17, further comprising: determining, for at least two traffic descriptors in the set of traffic descriptors that are associated with a same traffic descriptor, that the legacy access policy and the access policy are a different access policy; and updating the connection for at least one of the two traffic descriptors with the core network function.

Aspect 19: The method of any of aspects 14 through 18, wherein the cellular radio network comprises a fifth generation (5G) new radio (NR) stand alone (SA) cellular radio network; the legacy cellular radio network comprises at least one of a fourth generation (4G) long term evolution (LTE) cellular radio network or a 5G NR non-stand alone (NSA) cellular radio network; the access policy comprises a UE route selection policy (URSP); the legacy access policy comprises an access network discovery and selection function (ANDSF); the core network function comprises a 5G NR SA core network (5GC); the gateway comprises a non-third generation partnership project (3GPP) interworking function (N3IWF) between the core network function of the 5G NR SA cellular radio network and the non-cellular radio network; and the legacy gateway comprises an evolved packet data gateway (EPDG) between an evolved packet core (EPC) core network function of the 4G LTE cellular radio network or the 5G NR NSA cellular radio network and the non-cellular radio network.

Aspect 20: An apparatus for wireless communication at a UE, comprising a processor; memory coupled with the processor; and instructions stored in the memory and executable by the processor to cause the apparatus to perform a method of any of aspects 1 through 4.

Aspect 21: An apparatus for wireless communication at a UE, comprising at least one means for performing a method of any of aspects 1 through 4.

Aspect 22: A non-transitory computer-readable medium storing code for wireless communication at a UE, the code comprising instructions executable by a processor to perform a method of any of aspects 1 through 4.

Aspect 23: An apparatus for wireless communication at a UE, comprising a processor; memory coupled with the processor; and instructions stored in the memory and executable by the processor to cause the apparatus to perform a method of any of aspects 5 through 9.

Aspect 24: An apparatus for wireless communication at a UE, comprising at least one means for performing a method of any of aspects 5 through 9.

Aspect 25: A non-transitory computer-readable medium storing code for wireless communication at a UE, the code comprising instructions executable by a processor to perform a method of any of aspects 5 through 9.

Aspect 26: An apparatus for wireless communication at a UE, comprising a processor; memory coupled with the processor; and instructions stored in the memory and executable by the processor to cause the apparatus to perform a method of any of aspects 10 through 13.

Aspect 27: An apparatus for wireless communication at a UE, comprising at least one means for performing a method of any of aspects 10 through 13.

Aspect 28: A non-transitory computer-readable medium storing code for wireless communication at a UE, the code comprising instructions executable by a processor to perform a method of any of aspects 10 through 13.

Aspect 29: An apparatus for wireless communications at a UE, comprising a processor; memory coupled with the processor; and instructions stored in the memory and executable by the processor to cause the apparatus to perform a method of any of aspects 14 through 19.

Aspect 30: An apparatus for wireless communications at a UE, comprising at least one means for performing a method of any of aspects 14 through 19.

Aspect 31: A non-transitory computer-readable medium storing code for wireless communications at a UE, the code comprising instructions executable by a processor to perform a method of any of aspects 14 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based at least in part on" shall not be construed as a reference to a closed set of conditions. For example, an example step that is described as "based at least in part on condition A" may be based at least in part on both a condition A and a condition B without departing from the scope of the present disclosure. In other words, as used herein, the phrase "based at least in part on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    establishing a connection to a legacy core network function of a legacy cellular radio network via a legacy gateway between the legacy cellular radio network and a non-cellular radio network;
    identifying, for each traffic descriptor in a set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor;
    establishing a connection to a core network function of a cellular radio network via a gateway between the cellular radio network and the non-cellular radio network;
    identifying, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor; and
    determining, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

2. The method of claim 1, further comprising:
    determining, for at least two traffic descriptors in the set of traffic descriptors, that the legacy traffic descriptor and the traffic descriptor are a same traffic descriptor; and
    transferring the connections for the at least two traffic descriptors to the core network function.

3. The method of claim 1, further comprising:
    determining, for at least two traffic descriptors in the set of traffic descriptors, that the legacy traffic descriptor and the traffic descriptor are different traffic descriptors; and
    updating the connection for at least one of the two traffic descriptors with the core network function.

4. The method of claim 1, further comprising:
    determining, for at least two traffic descriptors in the set of traffic descriptors that are associated with a same traffic descriptor, that the legacy access policy and the access policy are a same access policy; and
    transferring the connections for the at least two traffic descriptors to the core network function.

5. The method of claim 1, further comprising:
    determining, for at least two traffic descriptors in the set of traffic descriptors that are associated with a same traffic descriptor, that the legacy access policy and the access policy are different access policies; and
    updating the connection for at least one of the two traffic descriptors with the core network function.

6. The method of claim 1, wherein:
    the cellular radio network comprises a fifth generation (5G) new radio (NR) stand alone (SA) cellular radio network;
    the legacy cellular radio network comprises at least one of a fourth generation (4G) long term evolution (LTE) cellular radio network or a 5G NR non-stand alone (NSA) cellular radio network;
    the access policy comprises a user equipment (UE) route selection policy (URSP);
    the legacy access policy comprises an access network discovery and selection function (ANDSF);
    the core network function comprises a 5G NR SA core network (5GC);
    the gateway comprises a non-third generation partnership project (3GPP) interworking function (N3IWF) between the core network function of the 5G NR SA cellular radio network and the non-cellular radio network; and
    the legacy gateway comprises an evolved packet data gateway (EPDG) between an evolved packet core (EPC) core network function of the 4G LTE cellular radio network or the 5G NR NSA cellular radio network and the non-cellular radio network.

7. The method of claim 1, further comprising:
    receiving a configuration for connections via the non-cellular radio network, the configuration configuring the UE to connect to the legacy core network function or to connect to the core network function via the non-cellular radio network.

8. An apparatus for wireless communications at a user equipment (UE), comprising:
    a processing system that includes one or more processors and one or more memories coupled with the one or more processors, the processing system configured to cause the apparatus to:
        establish a connection to a legacy core network function of a legacy cellular radio network via a legacy gateway between the legacy cellular radio network and a non-cellular radio network;
        identify, for each traffic descriptor in a set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor;
        establish a connection to a core network function of a cellular radio network via a gateway between the cellular radio network and the non-cellular radio network;
        identify, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor; and determine, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

9. The apparatus of claim 8, wherein the processing system is further configured to:
determine, for at least two traffic descriptors in the set of traffic descriptors, that the legacy traffic descriptor and the traffic descriptor are a same traffic descriptor; and
transfer the connections for the at least two traffic descriptors to the core network function.

10. The apparatus of claim 8, wherein the processing system is further configured to:
determine, for at least two traffic descriptors in the set of traffic descriptors, that the legacy traffic descriptor and the traffic descriptor are different traffic descriptors; and
update the connection for at least one of the two traffic descriptors with the core network function.

11. The apparatus of claim 8, wherein the processing system is further configured to:
determine, for at least two traffic descriptors in the set of traffic descriptors that are associated with a same traffic descriptor, that the legacy access policy and the access policy are a same access policy; and
transfer the connections for the at least two traffic descriptors to the core network function.

12. The apparatus of claim 8, wherein the processing system is further configured to:
determine, for at least two traffic descriptors in the set of traffic descriptors that are associated with a same traffic descriptor, that the legacy access policy and the access policy are different access policies; and
update the connection for at least one of the two traffic descriptors with the core network function.

13. The apparatus of claim 8, wherein:
the cellular radio network comprises a fifth generation (5G) new radio (NR) stand alone (SA) cellular radio network;
the legacy cellular radio network comprises at least one of a fourth generation (4G) long term evolution (LTE) cellular radio network or a 5G NR non-stand alone (NSA) cellular radio network;
the access policy comprises a user equipment (UE) route selection policy (URSP);
the legacy access policy comprises an access network discovery and selection function (ANDSF);
the core network function comprises a 5G NR SA core network (5GC);
the gateway comprises a non-third generation partnership project (3GPP) interworking function (N3IWF) between the core network function of the 5G NR SA cellular radio network and the non-cellular radio network; and
the legacy gateway comprises an evolved packet data gateway (EPDG) between an evolved packet core (EPC) core network function of the 4G LTE cellular radio network or the 5G NR NSA cellular radio network and the non-cellular radio network.

14. The apparatus of claim 8, wherein the processing system is further configured to:
receive a configuration for connections via the non-cellular radio network, the configuration configuring the UE to connect to the legacy core network function or to connect to the core network function via the non-cellular radio network.

15. An apparatus for wireless communications at a user equipment (UE), comprising:
means for establishing a connection to a legacy core network function of a legacy cellular radio network via a legacy gateway between the legacy cellular radio network and a non-cellular radio network;
means for identifying, for each traffic descriptor in a set of traffic descriptors, a legacy access policy of the legacy cellular radio network identifying a legacy access preference rule for the UE to adopt for connections to the legacy core network function, each legacy access preference rule indicating for the UE to preferentially connect to the legacy core network function via the legacy cellular radio network or a non-cellular radio network for the traffic descriptor and a legacy slice treatment for the traffic descriptor;
means for establishing a connection to a core network function of a cellular radio network via a gateway between the cellular radio network and the non-cellular radio network;
means for identifying, for each traffic descriptor in the set of traffic descriptors, an access policy of the cellular radio network identifying an access preference rule for the UE to adopt for connections to the core network function of the cellular radio network, each access preference rule indicating for the UE to preferentially connect to the core network function via the cellular radio network or the non-cellular radio network for the traffic descriptor and a slice treatment for the traffic descriptor; and
means for determining, for each traffic descriptor and based at least in part on the legacy slice treatment and the slice treatment and based at least in part on the access policy, to transfer the connection associated with the traffic descriptor to the core network function or to establish an updated connection for the traffic descriptor with the core network function.

16. The apparatus of claim 15, further comprising:
means for determining, for at least two traffic descriptors in the set of traffic descriptors, that the legacy traffic descriptor and the traffic descriptor are a same traffic descriptor; and
means for transferring the connections for the at least two traffic descriptors to the core network function.

17. The apparatus of claim 15, further comprising:
means for determining, for at least two traffic descriptors in the set of traffic descriptors, that the legacy traffic descriptor and the traffic descriptor are different traffic descriptors; and
means for updating the connection for at least one of the two traffic descriptors with the core network function.

18. The apparatus of claim 15, further comprising:
means for determining, for at least two traffic descriptors in the set of traffic descriptors that are associated with a same traffic descriptor, that the legacy access policy and the access policy are a same access policy; and
means for transferring the connections for the at least two traffic descriptors to the core network function.

19. The apparatus of claim 15, further comprising:
means for determining, for at least two traffic descriptors in the set of traffic descriptors that are associated with a same traffic descriptor, that the legacy access policy and the access policy are different access policies; and means for updating the connection for at least one of the two traffic descriptors with the core network function.

20. The apparatus of claim 15, wherein:

the cellular radio network comprises a fifth generation (5G) new radio (NR) stand alone (SA) cellular radio network;

the legacy cellular radio network comprises at least one of a fourth generation (4G) long term evolution (LTE) cellular radio network or a 5G NR non-stand alone (NSA) cellular radio network;

the access policy comprises a user equipment (UE) route selection policy (URSP);

the legacy access policy comprises an access network discovery and selection function (ANDSF);

the core network function comprises a 5G NR SA core network (5GC);

the gateway comprises a non-third generation partnership project (3GPP) interworking function (N3IWF) between the core network function of the 5G NR SA cellular radio network and the non-cellular radio network; and the legacy gateway comprises an evolved packet data gateway (EPDG) between an evolved packet core (EPC) core network function of the 4G LTE cellular radio network or the 5G NR NSA cellular radio network and the non-cellular radio network.

\* \* \* \* \*